(12) United States Patent
Sakata et al.

(10) Patent No.: US 6,593,938 B1
(45) Date of Patent: *Jul. 15, 2003

(54) IMAGE PROCESSING APPARATUS, METHOD AND COMPUTER-READABLE RECORDING MEDIUM WITH PROGRAM RECORDED THEREON, FOR JOINING IMAGES TOGETHER BY USING VISIBLE JOINING POINTS AND CORRECTING IMAGE DISTORTION EASILY

(75) Inventors: Norihiko Sakata, Yokohama; Toshinori Takaki, Chofu; Minoru Hasegawa, Chiba-ken, all of (JP)

(73) Assignee: Ricoh Company, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/290,553

(22) Filed: Apr. 12, 1999

(30) Foreign Application Priority Data

Apr. 10, 1998 (JP) .......... 10-114413
Jul. 10, 1998 (JP) .......... 10-196278
Jul. 10, 1998 (JP) .......... 10-196280

(51) Int. Cl.$^7$ .......... G09G 5/00; G06K 9/36; H04N 9/74
(52) U.S. Cl. .......... 345/629; 382/284; 348/584
(58) Field of Search .......... 345/435, 629; 348/584; 382/284

(56) References Cited

U.S. PATENT DOCUMENTS 5,469,536 A * 11/1995 Blank .......... 345/431
5,982,951 A * 11/1999 Katayama et al. .......... 382/284
5,986,670 A * 11/1999 Dries et al. .......... 345/435
6,064,399 A * 5/2000 Teo .......... 345/435
6,078,701 A * 6/2000 Hsu et al. .......... 345/435
6,128,108 A * 10/2000 Teo .......... 358/1.9
6,157,747 A * 12/2000 Szeliski et al. .......... 345/435
6,167,167 A * 12/2000 Matsugu et al. .......... 345/435

FOREIGN PATENT DOCUMENTS

JP 9294225 11/1997

* cited by examiner

Primary Examiner—Jeffery Brier
Assistant Examiner—Anthony Blackman
(74) Attorney, Agent, or Firm—Oblon, Spivak, McClelland, Maier & Neustadt, P.C.

(57) ABSTRACT

An image processing apparatus is provided with a display device to display images on a display screen so that the images displayed on the display device can be edited and processed for joining of the images. The image processing apparatus includes an image specifying device to specify two or more images to be joined together on the display device. An image arranging device arranges the images specified by the image specifying device in such an order as to join the images together, and a display control device controls the display device to display the images arranged by the image arranging device. A joining point specifying device specifies any one joining point for each image so that vertically or laterally adjacent images displayed by the display control device can be joined together by referring to the joining points. A joining device joins adjacent images together by referring to the joining points specified by the joining point specifying device. This makes it possible to easily join the images together by such a way as to merely specify one joining point for each image, and hence to execute image joining easily and efficiently.

63 Claims, 48 Drawing Sheets

IMAGE PROCESSING APPARATUS, METHOD AND COMPUTER-READABLE RECORDING MEDIUM WITH PROGRAM RECORDED THEREON, FOR JOINING IMAGES TOGETHER BY USING VISIBLE JOINING POINTS AND CORRECTING IMAGE DISTORTION EASILY

BACKGROUND OF THE INVENTION

1. Field of the Invention

The present invention relates to image processing apparatus and method to display images on a display screen, edit and process the images displayed, and retrieve the images edited and processed, and a computer-readable recording medium with a program thereon for making the computer execute the method. In particular, the invention relates to a technique for joining plural images and correcting distortion of the images.

2. Discussion of the Background

There has conventionally been known a technique for joining plural images together to form an image picture. Such a technique would be used in a case where two or more images are necessary to photograph a panoramic view, such as the entire image of a tall building or an event hall, an aerial photograph or a case where the distance from an object to be photographed is too near for a normal digital still camera to put the entire image in a picture, such as an interior photo. In these cases, two or more pictures need to be joined with each other to form the panoramic view. A method of joining two images has been known in which two images are joined with each other by moving and putting either of the images in position by hand while viewing the joining part on a screen.

It is known that an image photographed by a digital still camera or video camera generally contains geometrical distortion produced by distortion aberration of the lens system forming the image in a position deviated from the original position. To correct distortion of such an image, a method is known such as one disclosed in Japanese patent application laid-open publication No. 9-294225, entitled "Method for Deciding Parameter for Image Distortion Correction and Image Pickup Device." This publication discloses a technique in which plural images including a common pattern picked up from one point are used to detect plural sets of corresponding observing points from these images and measure angles of the observation points with respect to an optical axis of the image pickup system, thus estimating a parameter for distortion correction based on the angle information obtained.

The above method of joining plural images together to form an image picture may be useful for skilled persons who are specialized in this work, but it is very hard for beginners to do these jobs efficiently. If two or more images are joined together to form an image picture, adjacent images need to be adjusted one after the other, respectively, and this makes it difficult even for skilled persons to do this work efficiently. It is also necessary to perform additional image correction so as to make the joining part inconspicuous. When the images are joined by hand, the image correction must also be performed by hand, and this results in a reduction in operation efficiency.

Image distortion correction requires detection of plural sets of corresponding observing points from images, the distortion of which should be corrected. It may be possible for skilled persons to detect observing points and input data related to the observing points, but it is very hard for beginners to do these jobs efficiently. When image distortion correction needs to be performed for a large number of images, detection of observing points and data input of the observing points are required for each image. This makes it difficult even for skilled persons to do these jobs efficiently.

SUMMARY OF THE INVENTION

In order to solve the above conventional problems, an object of the present invention is to provide an image processing apparatus and method capable of joining plural images in an easy operation even for beginners, and a computer-readable recording medium with a program recorded thereon for making the computer execute the method.

Another object of the present invention is to provide image processing apparatus and method capable of correcting distortion of images in an easy operation even for beginners, and a computer-readable recording medium with a program recorded thereon for making the computer execute the method.

In one aspect of the present invention, an image processing apparatus is provided with a display device to display images on a display screen so that the images displayed on the display device can be edited and processed for smooth joining of the images. The image processing apparatus includes an image specifying device to specify two or more images to be joined together on the display device. An image arranging device arranges the images specified by the image specifying device in such an order as to join the images together, and a display control device controls the display device to display the images arranged by the image arranging device. A joining point specifying device specifies a joining point for each image so that vertically or laterally adjacent images displayed by the display control device can be joined together by referring to the joining points. A joining device joins adjacent images together by referring to the joining points specified by the joining point specifying device. According to the present invention, the specified images are arranged in such an order as to be joined together, and the arranged images are so displayed that a joining point can be specified for each image while viewing both images displayed adjacent to each other. This makes it possible to easily join the images together by merely specifying one joining point for each image, and hence to execute editing and processing of the images such as image joining easily and efficiently.

In another aspect of the present invention, the image processing apparatus further includes a connection line drawing device to draw a connection line between joining points specified by the joining point specifying device, and the display control device controls the display device to display both the images arranged by the image arranging device and the connection line drawn by the connection line drawing device. According to the present invention, a connection line is drawn between the joining points specified, so that the operator can both specify the joining points as if he or she drew a line by hand, and recognize instantaneously whether the joining points are specified or not.

In still another aspect of the present invention, the image processing apparatus further includes a joining-point specification releasing device to release specification of the previously specified set of joining points when a given set of joining points is specified for a pair of adjacent images. According to the invention, when a set of joining points is specified for a pair of adjacent images for which another set of joining points has already been specified, specification of the previous set of joining points is released, so that when specifying a new set of joining points, the operator can change the specification of joining points easily and efficiently in the same operation as when specifying a set of joining points for the first time, without the need to release the specification of the previous set of joining points.

In yet another aspect of the present invention, the image processing apparatus further includes a focal length setting device to set the focal length with which an image has been input, and an image correcting device to correct the image based on the focal length set by the focal length setting device. According to the invention, the focal length with which an image has been input is set to correct the image based on the focal length set for joining the image with another. This makes it possible to join images without distortion, even if the images have been input by input devices with different focal lengths.

In still another aspect of the present invention, a method for controlling an image processing apparatus for joining of images includes steps of displaying images on a display screen, specifying two or more images to be joined together, arranging the specified images in such an order as to be joined together, displaying the arranged images, specifying a joining point for each image so that adjacent images displayed can be joined by referring to the joining points, and joining adjacent images together by referring to the specified joining point. According to the invention, the specified images are arranged in such an order as to be joined together, and the arranged images are so displayed that a joining point can be specified for each image while viewing both images displayed adjacent to each other. This makes it possible to join the images by a simple operation of specifying one joining point for each image, and hence to execute editing and processing of the images, such as image joining, easily and efficiently.

In still another aspect of the present invention, the method for joining of images further includes steps of drawing a connection line between the specified joining points, and displaying not only the arranged images but also the drawn connection line. According to the invention, a connection line is drawn between the joining points specified, so that the operator can specify both the joining points as if he or she drew a line by hand, and recognize instantaneously whether the joining points are specified or not.

In yet another aspect of the present invention, the method for joining of images further includes a step of releasing specification of the previously specified set of joining points when a new set of joining points is specified. According to the invention, when a set of joining points is specified for a pair of adjacent images for which another set of joining points has already been specified. specification of the previous set of joining points is released, so that when specifying a new set of joining points, the operator can change the specification of joining points easily and efficiently in the same operation as when specifying a set of joining points for the first time, without the need to release the specification of the previous set of joining points.

In yet another aspect of the present invention, the method for joining of images further includes a step of setting the focal length with which an image has been input, and a step of correcting the image based on the focal length set for use in joining the image with another. According to the invention, the focal length with which an image has been input is set to correct the image based on the focal length set for joining the image with another. This makes it possible to join images without occurrence of distortion even if the images have been input by input devices with different focal lengths.

In yet another aspect of the present invention, a computer readable recording medium stores computer instructions for controlling an image processing apparatus for joining of images by performing the above-described steps. This makes it possible for a computer to read the computer instructions, and hence for the computer to carry out the method for controlling an image processing apparatus for the joining of images.

In still another aspect of the present invention, an image processing apparatus is provided with a display device for displaying images on a display screen so that the images displayed on the display device can be edited and processed for correction of image distortion. An image specifying device specifies at least two images which are photographed at slightly different photographing positions for correcting distortion of the images. An image arranging device arranges the images specified by the image specifying device, and a display control device controls the display device to display the images arranged by the image arranging device. An identical point specifying device specifies an identical point for each image displayed by the display control device, and a distortion correcting device corrects distortion of images by referring to the identical points specified by the identical point specifying device. According to the invention, image distortion can be corrected by a simple operation to merely specify one identical point for each image displayed, thus editing and processing the images easily and efficiently.

In yet another aspect of the present invention, the image processing apparatus for correction of image distortion further includes a connection line drawing device to draw a connection line between identical points specified by the identical point specifying device, and the display control device controls the display device to display both the images arranged by the image arranging device and the connection line drawn by the connection line drawing device. According to the invention, a connection line is drawn between the identical points specified, so that the operator can specify the identical points as if he or she drew a line by hand, and recognize instantaneously whether the identical points are specified or not.

In still another aspect of the present invention, the image processing apparatus for correction of image distortion further includes an identical point specification releasing device to release specification of the previously set of identical points when a new set of identical points is specified for images for which another set of identical points has already been specified. According to the invention, when a set of identical points is specified for images for which another set of identical points has already been specified specification of the previous set of identical points is released, so that when specifying a new set of identical points, the operator can change the specification of identical points easily and efficiently in the same operation as when specifying a set of identical points for the first time without the need to release the specification of the previous set of identical points.

In still another aspect of the present invention the image processing apparatus for correction of image distortion further includes a focal length setting device to set a focal length with which an image has been input, and the distortion correcting device corrects distortion of the image based on the focal length set by the focal length setting device.

According to the invention, the focal length with which an image has been input is set to correct distortion of the image based on the focal length set. This makes it possible to perform proper distortion correction of images even if the images have been input by input devices with different focal lengths.

In yet another aspect of the present invention, a method for controlling an image processing apparatus for correction of image distortion includes steps of displaying images on a display screen, specifying at least two images photographed at slightly different photographing positions, for correcting distortion of the images, arranging the images specified in the image specifying step, controlling display of the images arranged in the image arranging step, specifying an identical point for each image displayed in the display control step, and correcting distortion of the images by referring to the identical points specified in the identical point specifying step. According to the invention, image distortion can be corrected by a simple operation to merely specify one identical point for each image displayed, thus editing and processing the images easily and efficiently.

In yet another aspect of the present invention, the method for correction of image distortion further includes a step of drawing a connection line between identical points specified in the identical point specifying step, and the display control step controls display of both the images arranged in the image arranging step and the connection line drawn in the connection line drawing step. According to the invention, a connection line is drawn between the identical points specified, so that the operator can both specify the identical points as if he or she drew a line by hand, and recognize instantaneously whether the identical points are specified or not.

In still another aspect of the present invention, the method for correction of image distortion further includes a step of releasing specification of the previous set of identical points when a set of identical points is specified for images for which another set of identical points has already been specified. According to the invention, when a set of identical points is specified for images for which another set of identical points has already been specified, specification of the previous set of identical points is released, so that when specifying a new set of identical points, the operator can change the specification of identical points easily and efficiently in the same operation as when specifying a set of identical points for the first time without the need to release the specification of the previous set of identical points.

In still another aspect of the present invention, the image processing method for image distortion correction further includes a step of setting a focal length with which an image has been input, and the distortion correcting step corrects distortion of the image based on the focal length set in the focal length setting step. According to the invention, the focal length with which an image has been input is set to correct distortion of the image based on the focal length set. This makes it possible to perform proper distortion correction of images even if the images have been input by input devices with different focal lengths.

In still another aspect of the present invention, a computer readable recording medium stores computer instructions for controlling an image processing apparatus for image distortion correction by performing the above-described steps. This makes it possible for a computer to read the instructions mechanically, and hence for the computer to carry out the method for controlling an image processing apparatus for the image distortion correction.

DETAILED DESCRIPTION OF THE PREFERRED EMBODIMENTS

Referring to appended drawings, the present invention will be described in detail below with respect to preferred embodiments of an image processing apparatus, an image processing method and a computer-readable recording medium with a program recorded thereon for making the computer execute the method.

First, description is made to the general structure of an illustrated-document creating system including an image processing apparatus according to the present invention commonly used for joining and joining plural images together and correcting distortion of the images.

Figure 1:
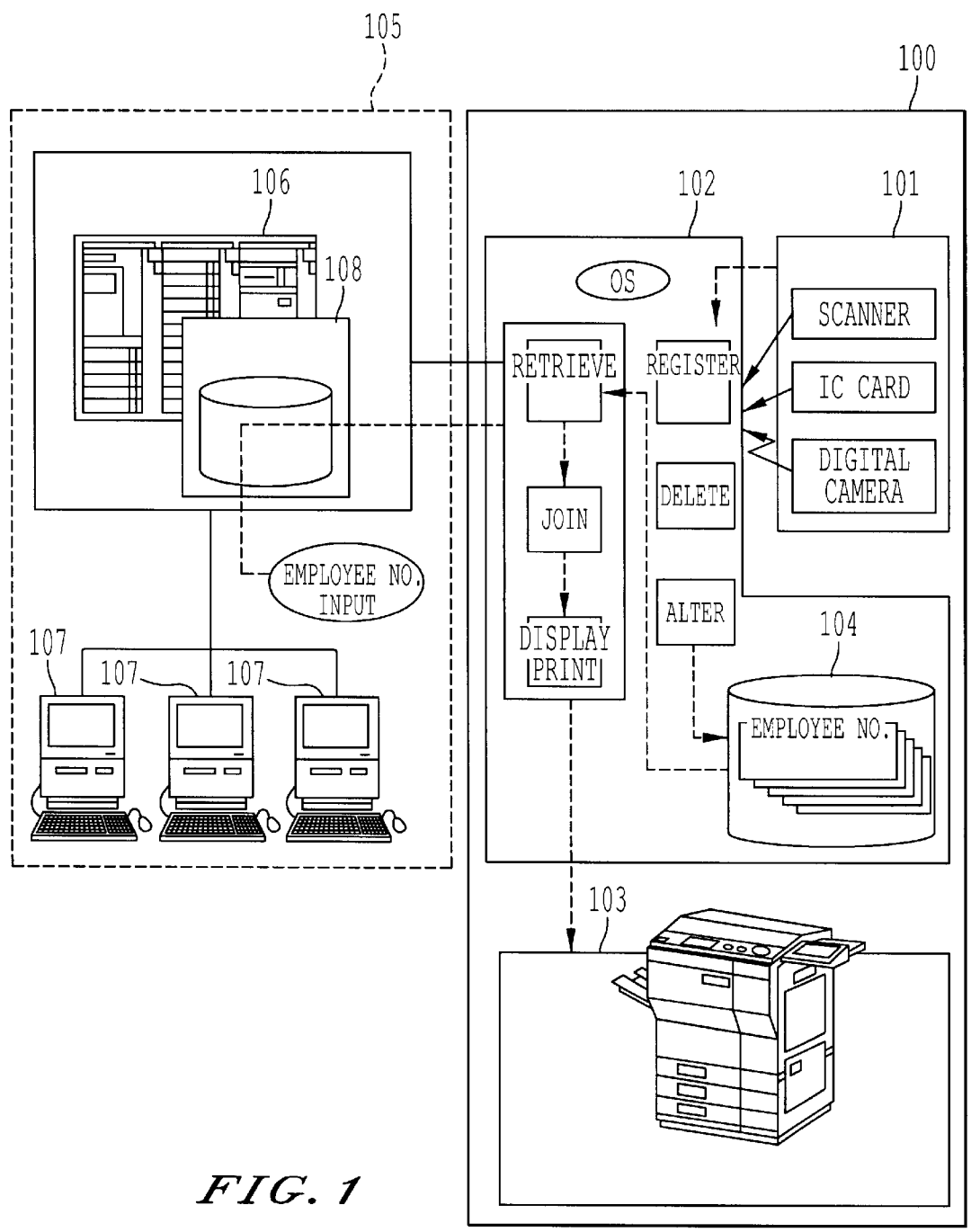
FIG. 1 is an illustration functionally showing the general structure of an illustrated document creating system including an image processing apparatus according to the present invention commonly used for joining plural images together and correcting distortion of the images.

FIG. 1 is an illustration functionally showing the general structure of an illustrated document creating system including an image processing apparatus according to the present invention. As functionally shown in FIG. 1, the illustrated-document creating system is such that a host computer system 105 is connected by a network such as LAN to an image processing apparatus 100 including an input part 101, a processing part 102 and an output part 103.

The input part 101 performs read processing of images, which may include a scanner, an IC card, a digital still camera or a photo CD reader. The input part 101 reads or takes in images, and converts the read images into a predetermined file form before transmission to the processing part 102.

The processing part 102 performs read processing of images, such as to register, delete and alter the images. For example, a personal computer (PC) may be used for the processing part 102. An image data storage part 104, incorporated in the processing part 102 or externally connected to the processing part 102 stores processed image data, which may include an internal hard disk of the PC, a floppy disk, a rewritable CD-ROM, an MO or a DVD. The processing part 102 also retrieves image data stored in the image data storage part 104, pastes the retrieved image data on another document and controls a display to indicate the document or controls the output part 103 to print out the document.

The output part 103 performs the printing processing of image data and documents containing the image data to be printed out under control of the processing part 102. The output part 103 may include a monochrome or full-color laser printer or a digital copying machine. The output part 103 may also include a printer having such a function as to print business cards or laminate cards such as IC cards after printout of the cards.

The host computer system 105, connected by a network such as LAN to a PC as the processing part 102, includes a host computer 106 and plural terminals 107 connected by a network to the host computer 106. The host computer 106 may store therein, for example, a personnel information file 108 related to personnel affairs inside the company so that each terminal 107 can access to the personnel information file 108.

The processing part 102 can be linked with the personnel information file 108. For example, image data stored in the image data storage part 104 of the processing part 102 can be retrieved via the personnel information file 108 by inputting personnel information such as an employee number from a terminal 107.

Specifically, the illustrated-document creating system can be applied to a business card creating system for creating business cards with a photograph of one's face; a postcard creating system for creating postcards such as invitation cards with illustrated products or photographs of staff's faces thereon; an ID card creating system for creating an identity card (ID card) with a photograph; a leaflet creating system for creating leaflets such as a project document, a handbill and a catalog; a card creating system for creating illustrated cards; a personnel information system for creating and administering a personnel master file with photographs of personnel's faces such as personnel's photographs, their resumes or self-declarations, a name and address book and maps; a used-car search system for searching information with photographs of used cars; a stock information planning and purchasing system for controlling stock information; a system for the civil engineering and construction business, which is made up of a combination of a work schedule and a construction master file; and construction perspective creating system for use in combination with a three-dimensional CAD system. These illustrated-document creation systems may use or create color images such as color photographs.

Figure 2:
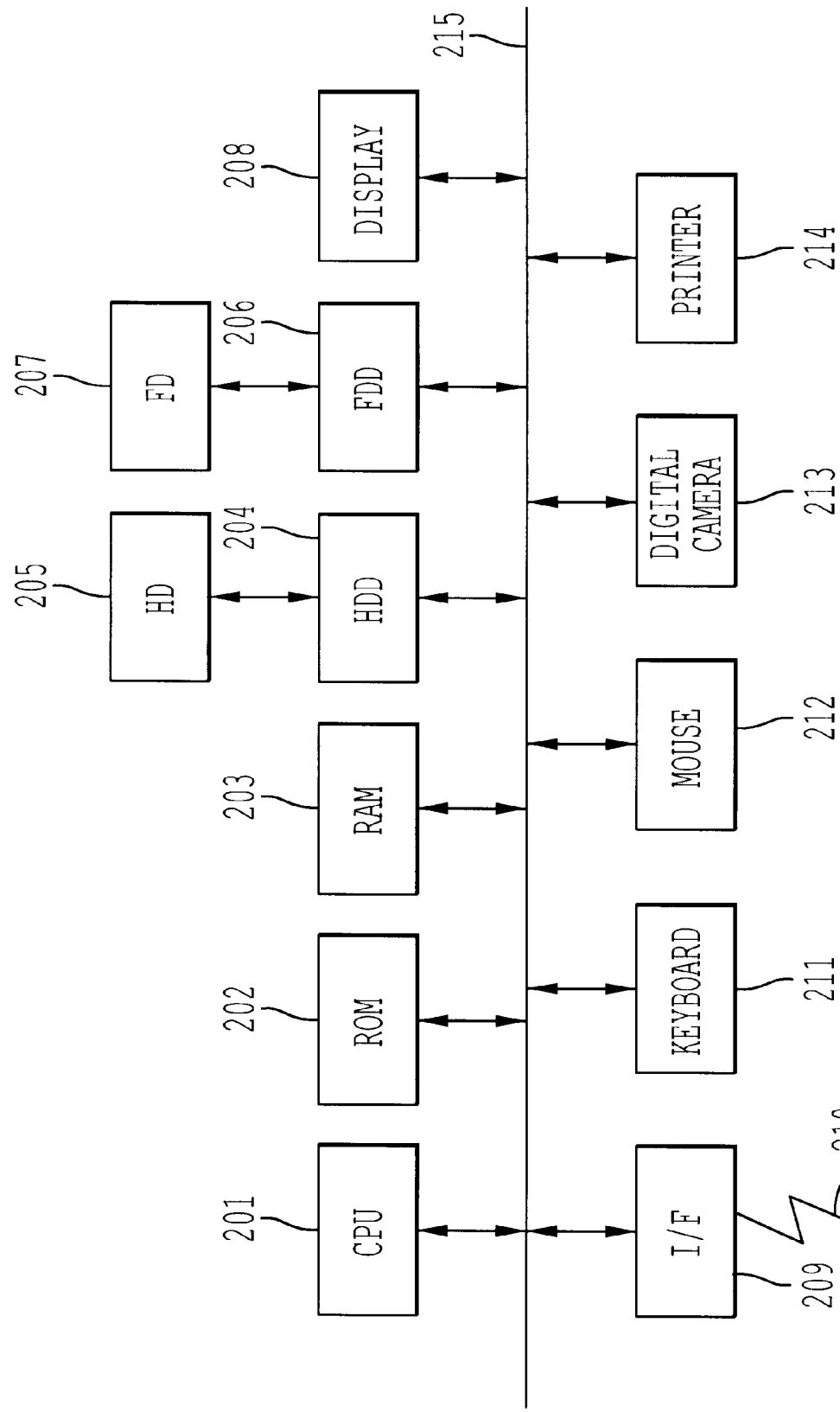
FIG. 2 is a block diagram showing the hardware configuration of the image processing apparatus according to the present invention commonly used for joining plural images together and correcting distortion of the images.

The hardware configuration of the image processing apparatus 100 is described below. FIG. 2 is a block diagram showing the hardware configuration of the image processing apparatus 100. Shown in FIG. 2 are a CPU 201 for controlling the entire system, a ROM 202 with a boot program and the like stored therein, a RAM 203 used as a work area of the CPU 201, an HDD (hard disk drive) 204 for performing reading/writing of data with respect to an HD (hard disk) 205 under control of the CPU 201, an HD 205 for storing data written under control of the HDD 204, an FDD (floppy disk drive) 206 for performing reading/writing of data with respect to an FD (floppy disk) 207 under control of the CPU 201. a removable FD 207 for storing data written under control of the FDD 206, and a display 208 for displaying documents containing images, function information and the like.

An interface (I/F) 209, connected to a network NET through a communication channel 210 controls an internal interface with the network NET; a keyboard 211 provided with keys for input of characters, numerical values and various instructions; a mouse 212 for moving a cursor and designating a selected area and the like; a digital still camera 213 for photographing images with a CCD; a printer 214 for printing out documents; and a bus 215 for connecting the above components. The digital still camera 213 may be replaced by a scanner for optically reading images.

Figure 3:
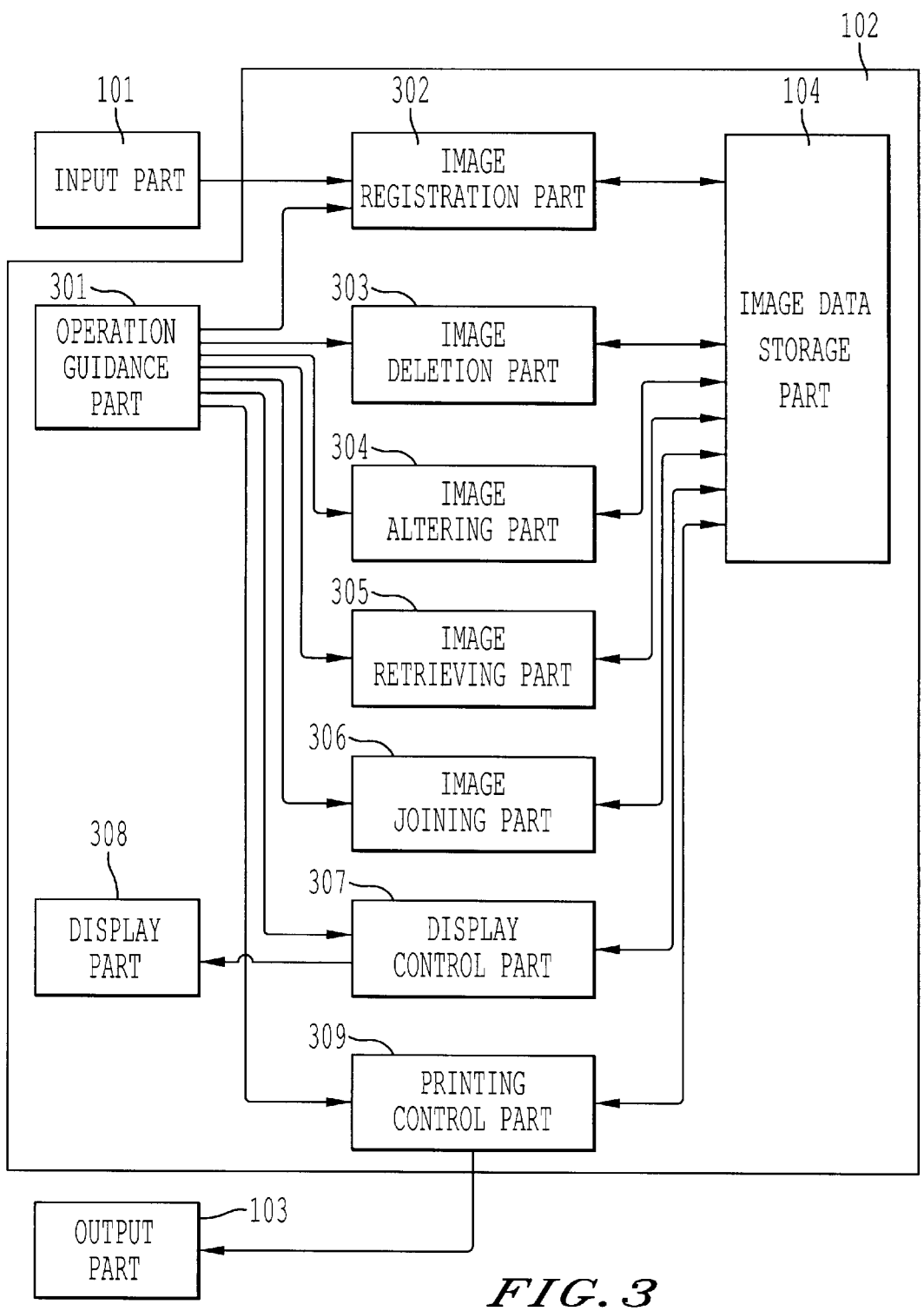
FIG. 3 is a functional block diagram showing the structure of the image processing apparatus according to the present invention commonly used for joining plural images together and correcting distortion of the images.

FIG. 3 is a functional block diagram showing the structure of the image processing apparatus 100. In FIG. 3, the processing part 102 includes, in addition to the image data storage part 104, an operation guidance part 301, an image registration part 302, an image deleting part 303, an image altering part 304, an image retrieving part 305, an image joining part 306, a display control part 307, a display part 308, a printing control part 309 and the like.

The operation guidance part 301 instructs the image registration part 302, the image deleting part 303, the image altering part 304, the image retrieving part 305, the image joining part 306, the display control part 307 and the printing control part 309 to operate according to the contents of the display part 308. For example, the operation guidance part 301 includes pointing devices such as the keyboard 211 and the mouse 212.

The image registration part 302 receives image data transmitted from the input part 101 to register the image data as an image data file by adding predetermined data such as a file name. The image data file so registered is stored into the image data storage part 104. The image deleting part 303 deletes any of the image data already stored in the image data storage part 104 from the image data storage part 104 in accordance with a deleting instruction from the operation guidance part 301.

The image altering part 304 adds a change in image data of any image data file, already stored in the image data storage part 104 in accordance with an altering instruction from the operation guidance part 303, and restores the altered image data into the image data storage part 104. The image altering part 304 will be described in detail later.

The image retrieving part 305 retrieves a desired image data file from the image data files already stored in the image data storage part 104 in accordance with a retrieving instruction from the operation guidance part 301. The image joining part 306 selects image data already stored in the image data storage part 104 so that the selected image data will be pasted on a document in accordance with an instruction from the operation guidance part 301.

The display control part 307 controls the display part 308 to indicate on its display screen an image of an image data file stored in the image data storage part 104, or a reduced image or thumbnail of the image, in accordance with a display instruction from the operation guidance part 301. The display control part 307 will be described in detail later.

The printing control part 309 transmits to the output part 103 printing data such as image data or an illustrated document in accordance with a printing instruction from the operation guidance 301. The output part is also controlled in accordance with operating instructions from the operation guidance 301 such as to set the number of prints and the like.

The image registration part 302, the image deleting part 303, the image altering part 304, the image retrieving part 305, the image joining part 306, the display control part 307 and the printing control part 309 are embodied, respectively, by the CPU 201 or the like executing command processing according to commands written in programs such as an OS and an application program recorded on recording media such as the ROM 202, the RAM 203, the hard disk 205 or the floppy disk 207.

The display part 308 displays documents containing images, character strings and the like under control of the display control part 307. The display part 308 may be the display 208 including a CRT or liquid crystal display.

The present invention will be described first with regard to image editing according to an embodiment, where plural picture images are joined together to form a picture.

First Embodiment

Figure 4:
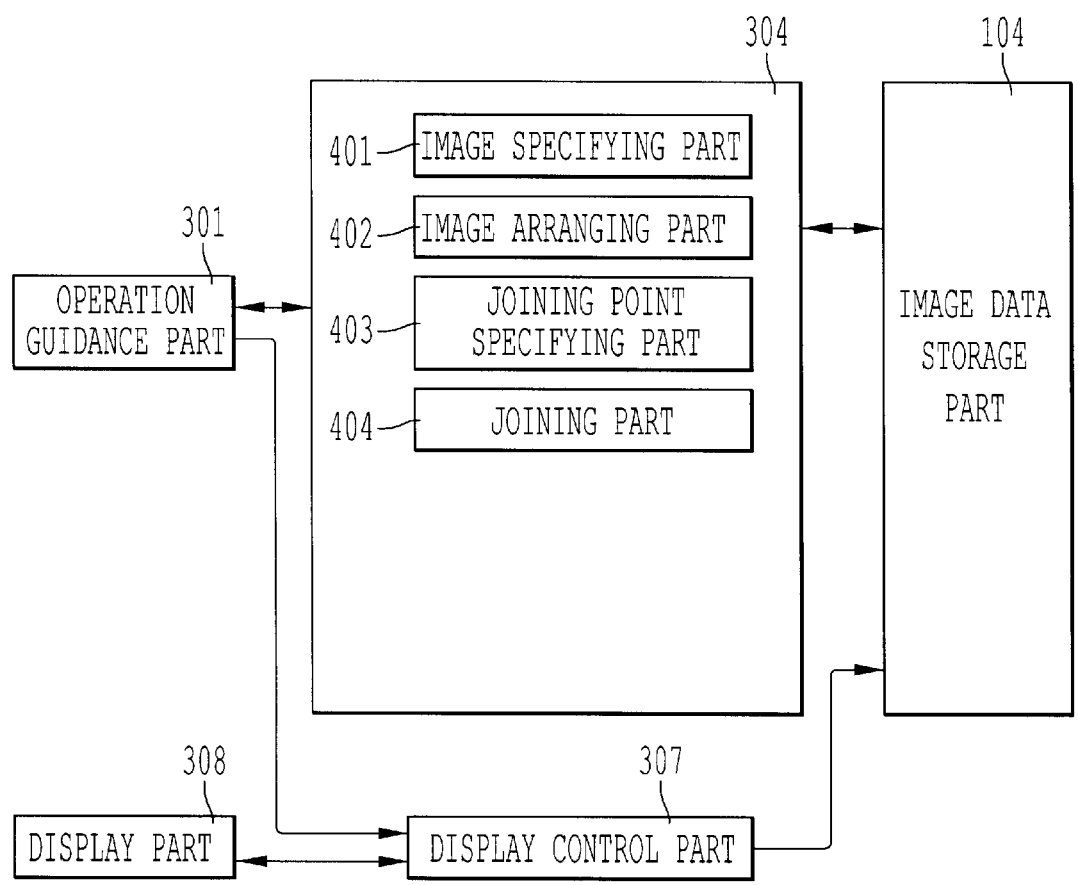
FIG. 4 is a functional block diagram showing the arrangement of an image altering part and the surroundings in the image processing apparatus according to the first embodiment of the present invention for the operation of joining plural images.

In the embodiment in which plural picture images are edited into a picture, the arrangements of the image altering part 304 and the display control part 307 are first described in more detail. FIG. 4 is a functional block diagram showing the arrangement of the image altering part 304, the display control part 307 and the surroundings in the image processing apparatus according to the first embodiment. As shown in FIG. 4, the image altering part 304 includes an image specifying part 401, an image arranging part 402, a joining point specifying part 403 and a joining part 404.

The image specifying part 401 is for specifying two or more images to be joined together. The image specifying part 401 specifies images the operator wants to join in accordance with an operating instruction from the operation guidance part 301.

The image arranging part 402 arranges the images specified by the image specifying part 401 in such a layout as to join them in that order. The images may be arranged in a line or lines, vertically or laterally. The images specified by the image specifying part 401 are thus arranged or rearranged in accordance with the operating instruction from the operation guidance part 301 in such a layout as to join the images in that order.

The joining point specifying part 403 specifies a joining point for each image so that vertically or laterally adjacent images displayed on the display screen of the display part 308 under control of the display control part 307 can be joined by referring to the joining point.

The processing contents of the image specifying part 401, the image arranging part 402 and the joining point specifying part 403 will be described in detail later.

The joining part 404 joins the adjacent images by referring to the joining point specified by the joining point specifying part 403. Such images can be joined together, for example, by a method such as one disclosed in Japanese patent application No. 9-316679 or 10-91125 of the same applicant. The image produced by the images joined together by the joining part 404 is then assigned a file name. and stored in the image data storage part 104 based on the file name.

The image specifying part 401, the image arranging part 402, the joining point specifying part 403 and the joining part 404 are embodied, respectively, by the CPU 201 or the like executing command processing according to commands written in programs such as an OS and an application program recorded on recording media such as the ROM 202, the RAM 203, the hard disk 205 or the floppy disk 207.

Figure 7:
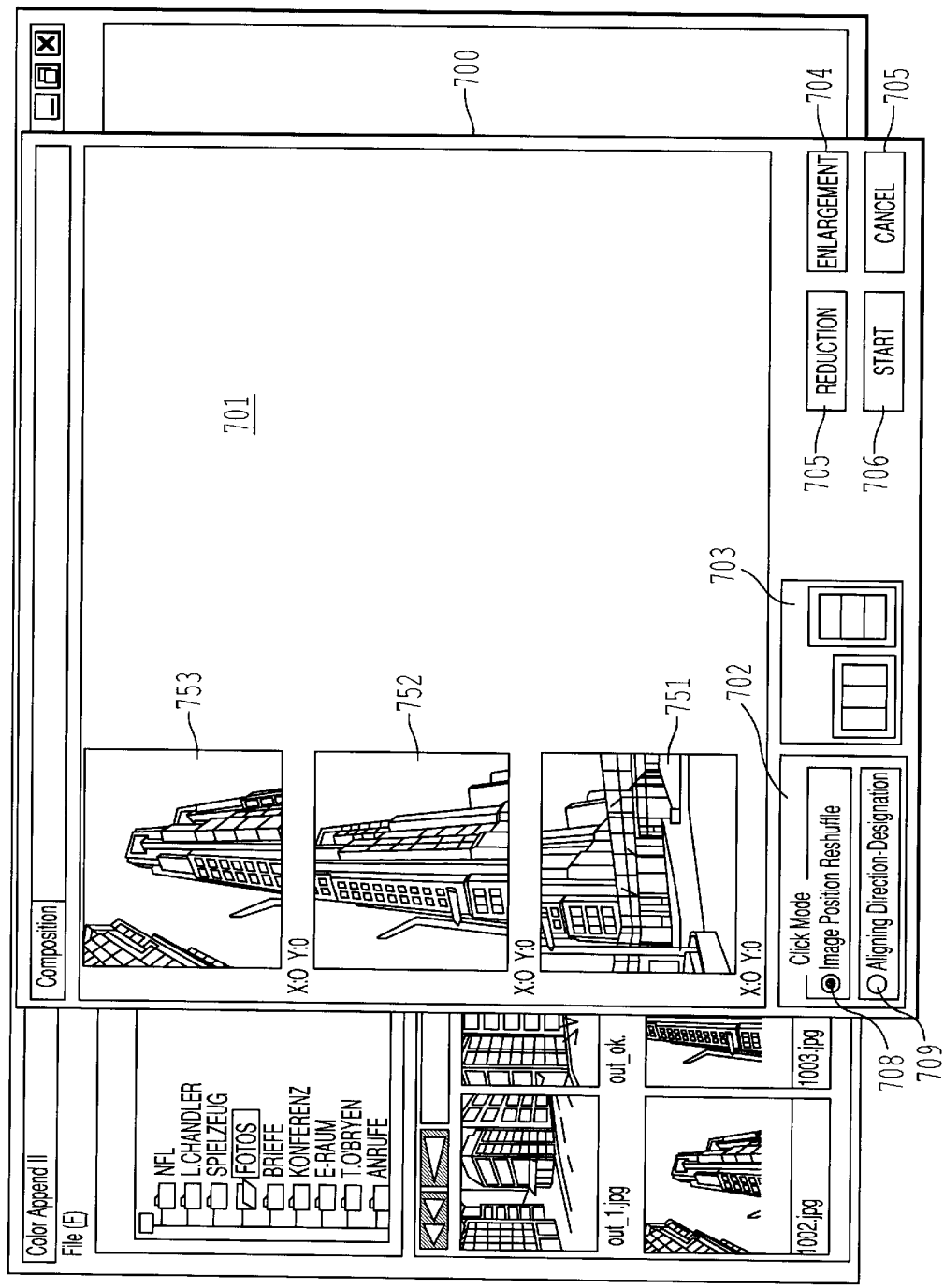
FIG. 7 is an illustration showing still another example of the display screen on the display part of the image processing apparatus according to the first embodiment of the present invention during the operation of joining plural images.

The display control part 307 controls the display part 308 to display a joining window 700 and to display images arranged by the image arranging part 402 in a joining work area 701 of the joining window 700, as shown in FIG. 7.

Figure 5:
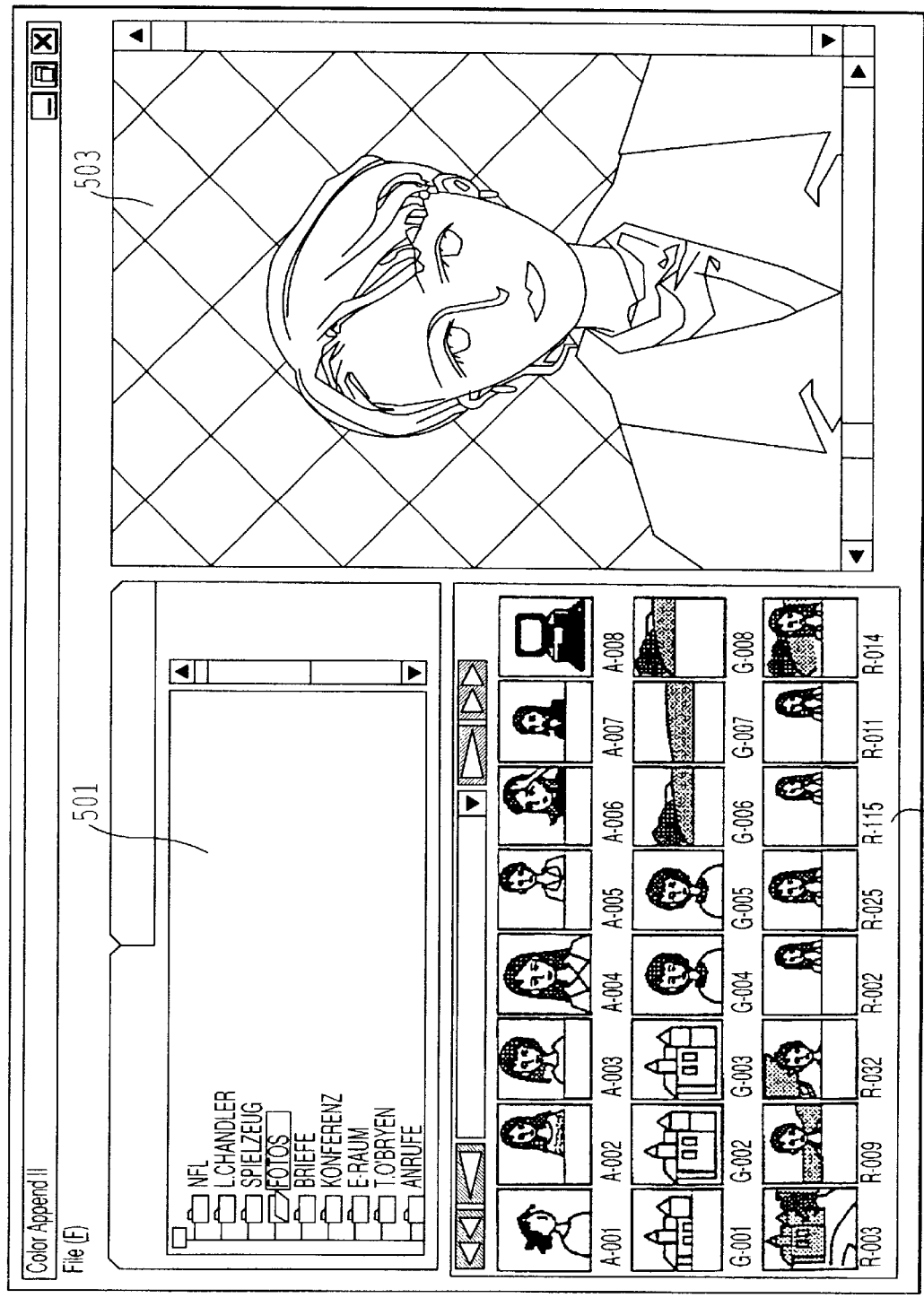
FIG. 5 is an illustration showing an example of a display screen on a display part of the image processing apparatus according to the first embodiment of the present invention during the operation of joining plural images.

Next, the operations of the image processing apparatus and the contents of display screens are described with respect to concrete display examples. FIG. 5 is an illustration showing an example of a display screen appearing on the display part 308 of the image processing apparatus according to the first embodiment. Shown in FIG. 5 is the basic display screen of the image processing apparatus according to the first embodiment. In FIG. 5, the display screen is made up of three areas: a file name display area 501 occupying almost the upper half of the left side of the screen, a reduced image display area 502 occupying the lower side of the file name display area 501, and a selected image display area 503 occupying almost the right half of the screen.

Preferably, these areas are not displayed in a multi-window form, but are configured as fixed areas for the purpose of inhibiting the operator from changing the position and size of these areas. Since the screen is displayed in the same layout at any time, the operator can grasp these areas as one screen. This makes it possible for the operator to use the image processing apparatus intuitively without confusion during the operation and without the need to memorize complicated operating procedures, and hence may edit and process images efficiently.

File names stored in the image data storage part 104 such as the hard disk 205 or the floppy disk 207 are displayed in the hierarchical order in the file name display area 501. The operator can thus select a desired data file by retrieving and specifying the name of the desired data file while viewing the file names displayed in the file name display area 501.

Plural reduced images or thumbnails are created by a reduced image creating part scaling down actual image data at a predetermined magnification rate, and are displayed in the reduced image display area 502. This makes it possible for the operator to view the reduced images so as to recognize instantaneously which file the image data corresponds to. Each file name is also displayed under each reduced image.

A desired image can also be selected by moving the cursor onto the corresponding reduced image and clicking the button of the mouse 212 or the like, instead of specifying the file name in the file name display area 501. In this case, the operator can use the reduced image as a clue to the desired image data file to achieve easy, high-speed selection of the desired image even if the operator has only a vague memory of the file name.

If a predetermined key word is registered for each image data file, such as "character" or "landscape," "business" or "private", the reduced images can be displayed by arranging the display sequence of the reduced images based on the key words. Since the reduced images are arranged based on the key words, a desired image data file can be retrieved at high speed even if the number of registered image data files is large.

In the display example of FIG. 5, eight reduced images are displayed in each of three rows, i.e., the number of reduced images displayed is set to 24, but the arrangement and number of reduced images displayed can be varied according to the resolution of the display and the contents of displayed images, or the difference in retrieving method.

The selected image display area 503 is an area for displaying an image of the image data file selected by specifying the file name in the file name display area 501, or by specifying the corresponding thumbnail in the reduced image display area 502. The selected images may be displayed in the following modes: a standard display mode for displaying the selected image of a standard size, a full-screen display mode for scaling up or down the display frame of the selected image to display the entire frame of the selected image, and a variable magnification display mode for displaying the selected image enlarged or reduced to predetermined magnification desired by the operator. The variable magnification display mode is specified by inputting the percentage of magnification. When the percentage is set to 100%, the magnification becomes equal to the size of the selected image. When a value smaller than 100% is input, the selected image is reduced, and when a value larger than 100% is input, the image is enlarged.

By specifying a predetermined command from the menu, or double-clicking the image itself, the image currently displayed in tile selected image display area 503 can be fully displayed on the display screen while concealing the file name display area 501 and the reduced image display area 502 behind the selected image display area 503. This makes it possible to edit and process the selected image more efficiently. This full-screen display of the selected image is particularly effective in processing a large image. After completion of editing and processing operations, the full-screen display of the selected image can be resized and returned to the home image area by specifying a predetermined command from the menu, or double-clicking the image itself again. The file name display area 501 and the reduced image display area 502 are then redisplayed.

Figure 6:
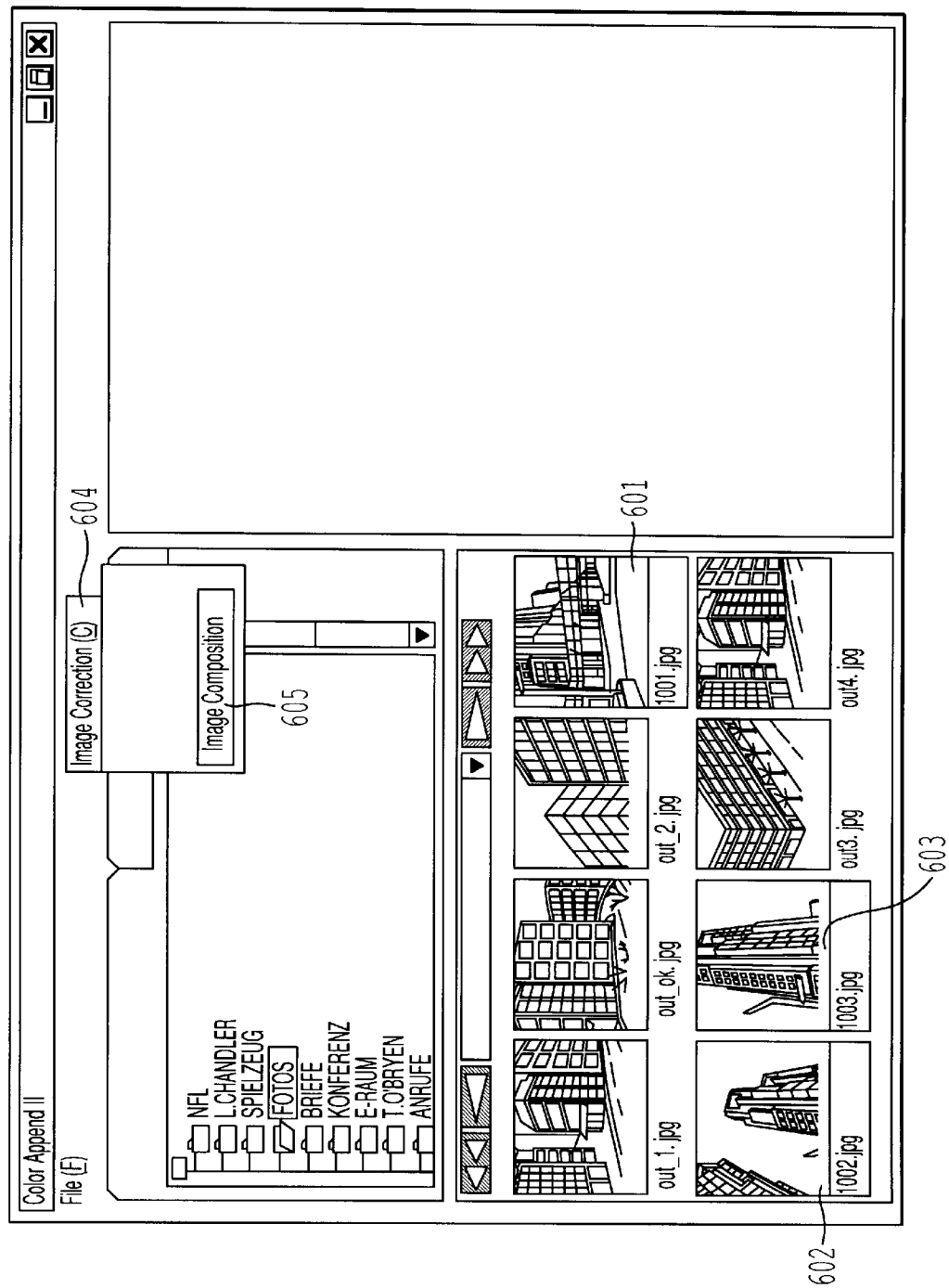
FIG. 6 is an illustration showing another example of the display screen on the display part of the image processing apparatus according to the first embodiment of the present invention during the operation of joining plural images.

Next, description is made to the operating procedures for specifying images executed by the image specifying part 401. FIG. 6 is an illustration showing another example of the display screen on the display part 308 of the image processing apparatus according to the first embodiment. In FIG. 6, the number of reduced images displayed in the reduced image display area 502 is set to eight for convenience sake.

Referring to FIG. 6, plural images to be joined together are specified from the reduced images in the reduced image display area 502. Although such plural images can be specified by using the keyboard to input the file names of corresponding reduced images, the plural images are specified here by using a pointing device such as the mouse 212 or the like to move the cursor to the reduced image display area and click the button of the mouse 212 or the like.

Since the plural reduced images need to be specified in one specifying operation, the button of the mouse 212 is clicked while pressing a specific key such as the shift key on the keyboard 211, thus easily specifying plural reduced images.

FIG. 6 shows a case where three reduced images 601, 602 and 603 are specified as images to be joined together. These reduced images specified may be made distinguishable from the others by displaying the file names of the reduced images specified as a negative, or enclosing the reduced images with a bold frame, so that the operator can recognize the reduced images specified.

After specifying the reduced images, the operator moves the cursor to an "IMAGE CORRECTION" menu 604 on the menu bar in FIG. 6, clicks the button of the mouse 212 or the like, and further clicks an "IMAGE JOINING" menu 605 displayed as one of pull-down menus to select the image joining function. Then, the joining window 700 is popped up and displayed as shown in FIG. 7.

Figure 8:
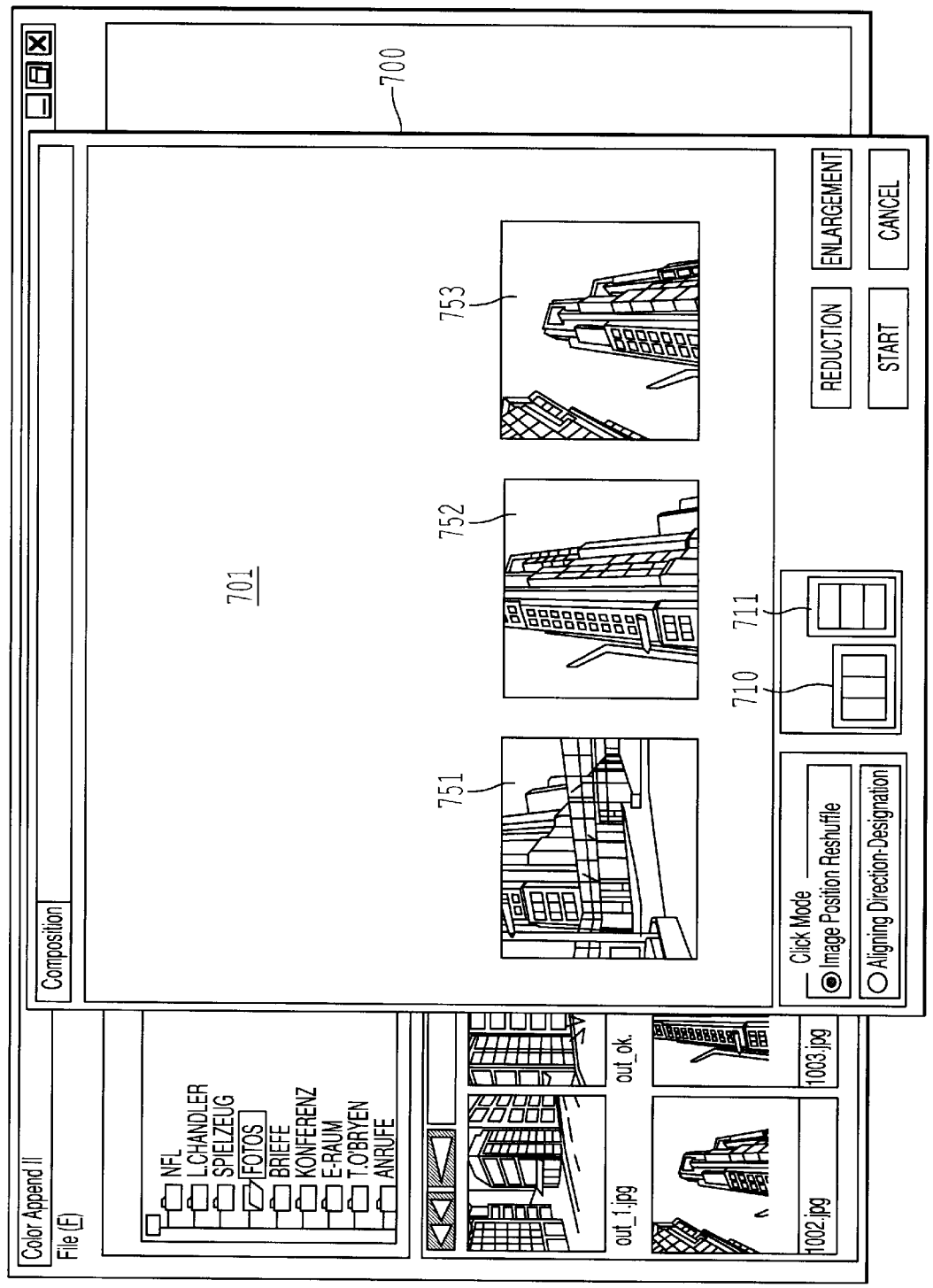
FIG. 8 is an illustration showing yet another example of the display screen on the display part of the image processing apparatus according to the first embodiment of the present invention during the operation of joining plural images.
Figure 9:
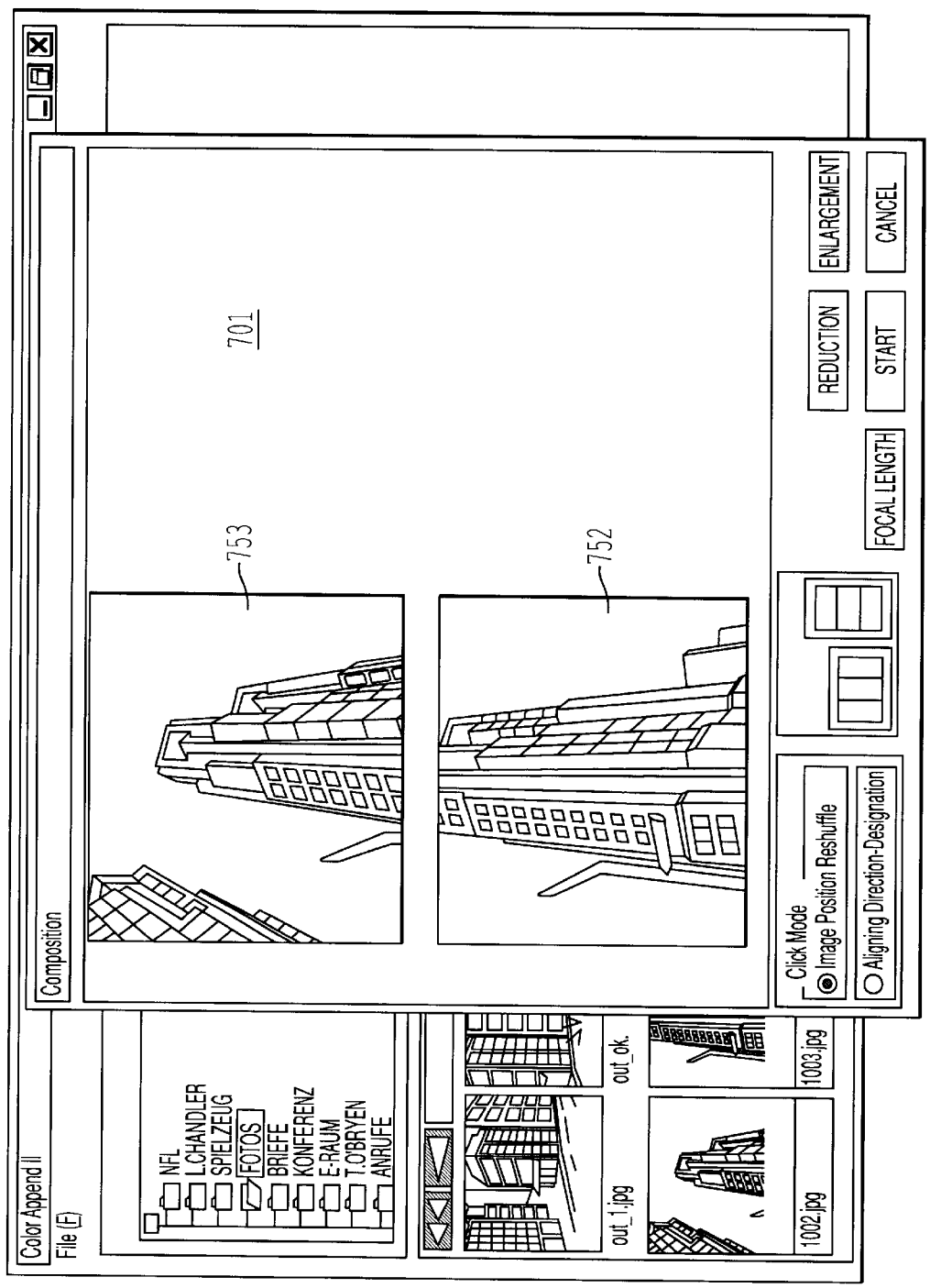
FIG. 9 is an illustration showing yet another example of the display screen on the display part of the image processing apparatus according to the first embodiment of the present invention during the operation of joining plural images.

Next, the processing contents of the image arranging) part 402 are described. FIGS. 7 to 9 are illustrations showing other examples of display screens on the display part 308 of the image processing apparatus according to the first embodiment. The joining window 700 includes a joining work area 701, a mode switching part 702, an arrangement switching part 703, a scale-up button 704, a scale-down button 705, a start button 706, and a cancel button 707.

Images specified by the image specifying part 401 are displayed in the joining work area 701. In FIG. 7, the reduced images 601, 602 and 603 specified in FIG. 6 are enlarged to predetermined magnification and displayed (corresponding to the images 751, 752 and 753, respectively).

The mode switching part 702 has two click modes for the pointing device such as the mouse 212 or the like: an image position replacing mode 708 and a joining position specifying mode 709.

Icons are arranged on the arrangement switching part 703 for switching the arrangement or layout in which the images specified by the image specifying part 401 are displayed. If three images are to be specified, since the three images will be arranged vertically or laterally, the two types of arrangements are shown as icons. As shown in FIG. 8, an icon 710 indicates a lateral arrangement of three images and an icon 711 indicates a vertical arrangement of three images. The operator can move the cursor onto either of the icons and click the button of the mouse 212 or the like to switch the arrangement of the images displayed on the work area 701. The icons displayed on the arrangement switching part 703 vary in shape and number according to the number of images specified by the image specifying part 401.

FIG. 7 shows a case where the icon 711 shown in FIG. 8 has been selected. The three images 751, 752 and 753 are displayed on the work area 701 in the same arrangement as the icon 711, i.e., by aligning these images in the vertical direction. On the other hand, FIG. 8 shows a case where the icon 710 has been selected. Thus, the arrangement of images can be changed by such a simple operation as to select the icon.

The scale-up button 704 is to scale up the size of images displayed on the joining work area 701. The images are scaled up to predetermined magnification each time the scale-up button 704 is pressed. i.e., when the operator moves the cursor onto the scale-up button 704 and clicks the button of the mouse 212 or the like one time. The scaled-up images are thus displayed on the joining work area 701, and this makes it easy for the operator to specify joining points.

FIG. 9 is an illustration showing yet another example of the display screen on the display part 308 of the image processing apparatus according to the first embodiment. FIG. 9 shows a case where the scale-up button 704 has been pressed once.

The scale-down button 705 is used to scale down the images, in a way opposite to the scale-up button 704, to predetermined magnification identical to that of the scale-up button 704, according to the number of times the button is pressed. If the scale-down button 705 is pressed as many times as the scale-up button 704 is pressed, the images will be returned to the original size. Since the size of images can not be scaled down any more in FIG. 7, the scale-down button 705 is grayed out, and pressing the button 705 is now inhibited.

The start button 706 instructs the start of joining processing of the images. Since no joining points have been specified yet, the start button 706 is grayed out, and pressing the start button 706 is inhibited.

The cancel button 707 instructs cancellation of the joining processing. If the cancel button 707 is pressed, the joining processing currently being performed is stopped, and the joining window 700 is closed.

Further, since joining points need to be specified by the joining point specifying part 403 for each pair of the adjacent images displayed on the joining work area 701, the images must be displayed in such a layout as to join the images in that order. For this reason, the image arranging part 402 performs position replacement processing of the images.

Figure 10A:
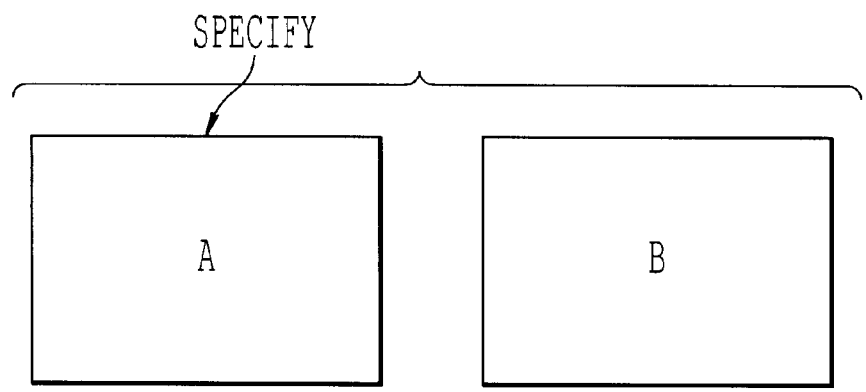
FIGS. 10a–10c are illustrations for explaining image position replacement executed by an image arranging part of the image processing apparatus according to the first embodiment of the present invention during the operation of joining plural images.
Figure 10B:
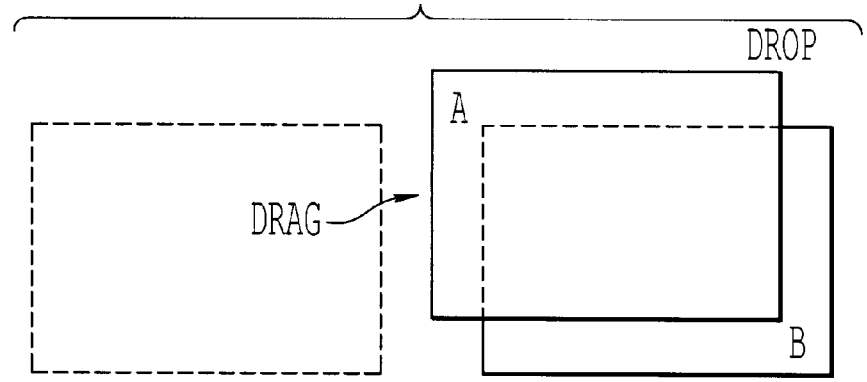
Figure 10C:
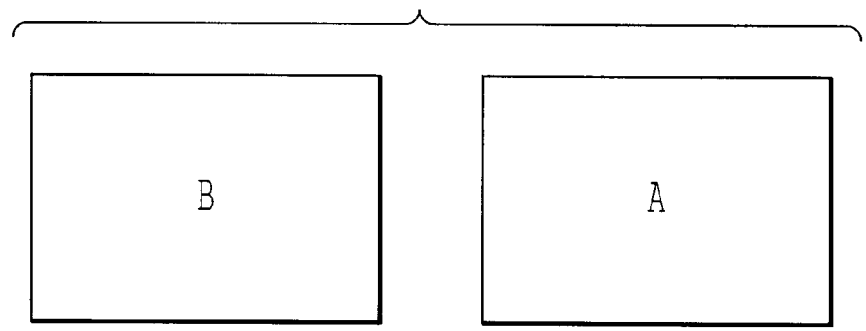

FIGS. 10a–10c are illustrations for explaining the image position replacement executed by the image arranging part 402 of the image processing apparatus according to the first embodiment. At first, the click mode on the mode switching part 702 shown in FIG. 7 is switched to the image position replacing mode 708. Then, an image to be replaced with another is specified. The image specification may be done by clicking a desired image, for example, an image A in FIG. 10a, with the mouse 212 or the like.

The desired image A is dragged to, and dropped in the neighborhood of another image B displayed in a position in which the operator wants to replace the image A with the image B, as shown in FIG. 10b. As a result, the desired image A is moved to the position in which the image B has been located, while the image B is moved to the original position of the desired image A, as shown in FIG. 10c.

If the click mode on the mode switching part 702 is in the image position replacing mode 708, the same operation can be performed repeatedly. This makes it possible for the operator to perform image replacement efficiently at high speed.

Figure 11:
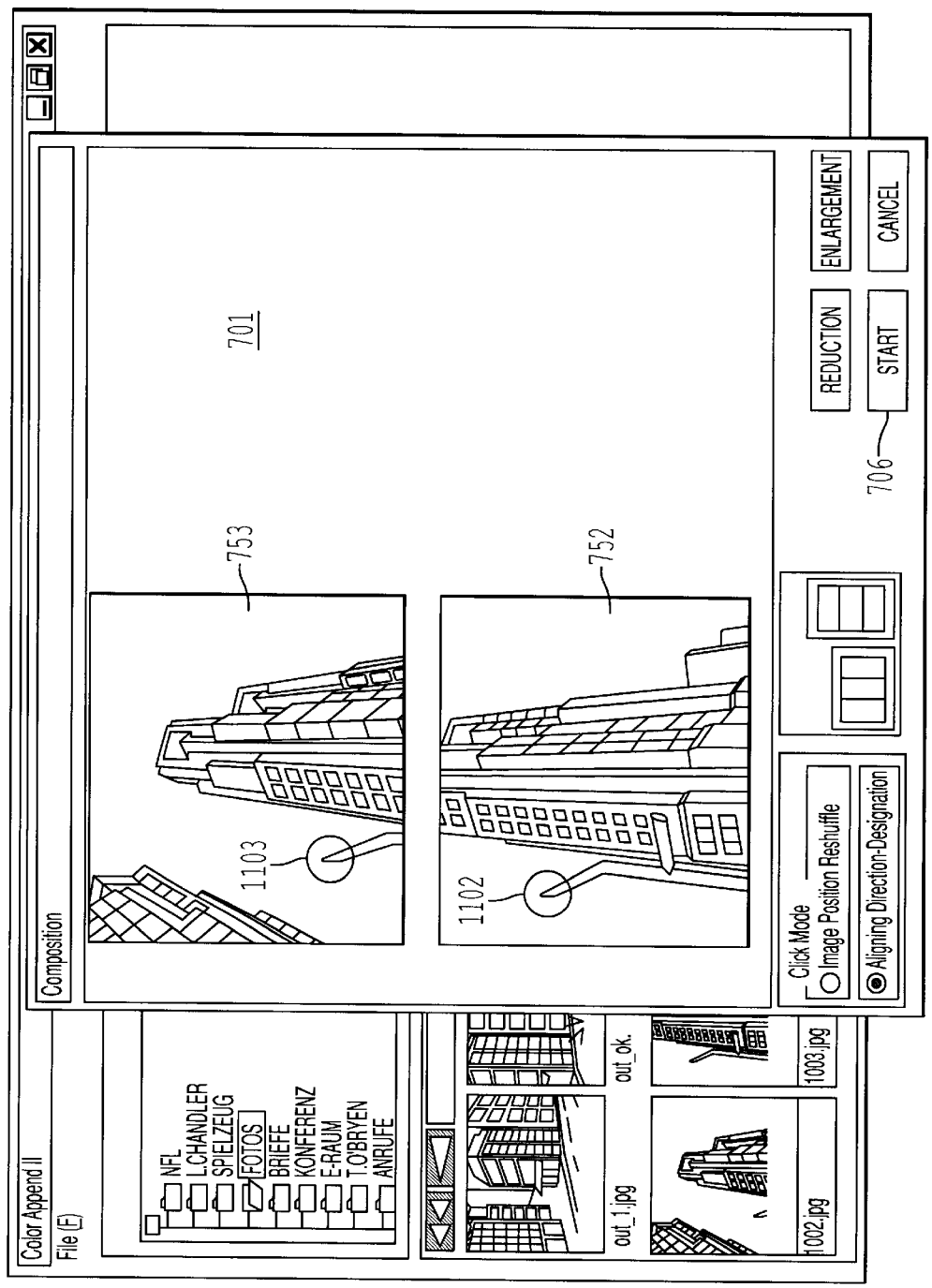
FIG. 11 is an illustration showing yet another example of the display screen on the display part of the image processing apparatus according to the first embodiment of the present invention during the operation of joining plural images.

Next, the processing contents of the joining point specifying part 403 are described. At first, the click mode on the mode switching part 702 is switched to the joining position specifying mode 709. FIG. 11 is an illustration showing yet another example of the display screen on the display part of the image processing apparatus according to the first embodiment.

In FIG. 11 (or 9), adjacent images in the joining work area 701 are compared by the user to specify, with the pointing device such as the mouse 212, respective characteristic points at which an identical image character appears on both images. To specify the characteristic points accurately, the images should be enlarged to a certain extent, for example, as shown in FIG. 11.

Specifically, in this example, the tips of lampposts 1102 and 1103, located on the center left of the overlapped parts of both images 752 and 753, are suitable for joining points. The joining points are specified by moving the cursor to these tips 1102 and 1103 and clicking the button of the mouse 212 or the like. Coordinate data indicative of the joining points specified are then stored in a storage area provided in the joining point specifying part 403. Such joining points are specified for each pair of vertically or laterally adjacent images.

After completion of specifying the joining points for all the adjacent images, the operator presses the start button 706 to start execution of the joining processing. When the joining processing is completed, an image resulting from the joining processing is displayed in the joining work area 701, and a window 1200 is displayed with a message: Is this result OK?

Figure 12:
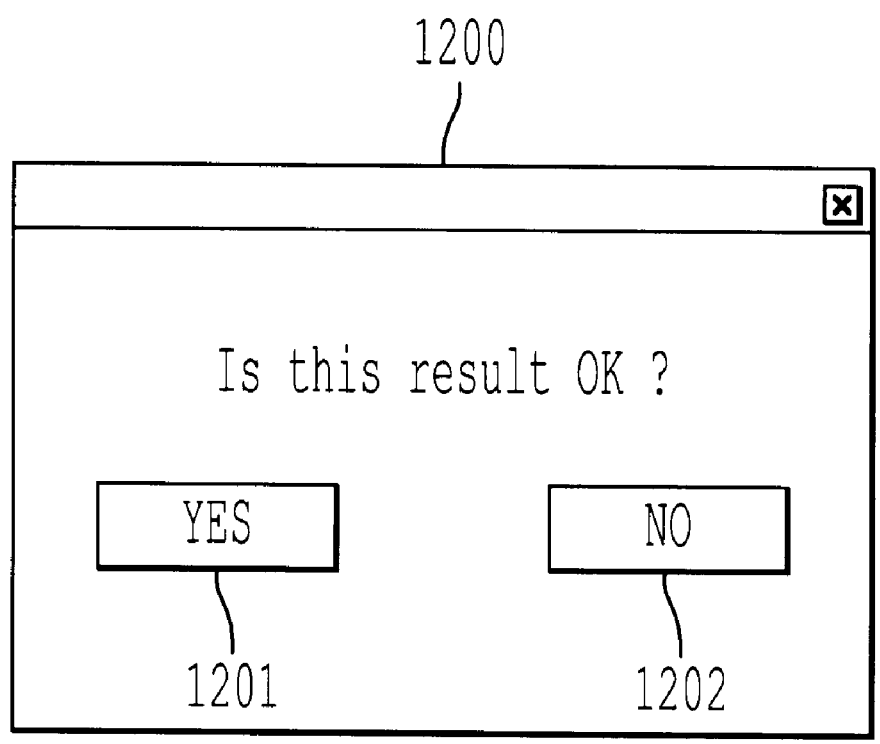
FIG. 12 is an illustration for explaining an example of a window displayed on the display part of the image processing apparatus according to the first embodiment of the present invention during the operation of joining plural images.

FIG. 12 is an illustration for explaining an example of such a window displayed on the display part of the image processing apparatus according to the first embodiment. In FIG. 12, if an "yes" button 1201 is pressed, the image resulting from the joining processing is assigned a file name and stored into the image data storage part 104. On the other hand, if a "no" button 1202 is pressed, the joining result is canceled and the operating procedure returns to the display screen just before the start button 706 is pressed, so that joining points can be specified again.

Figure 13:
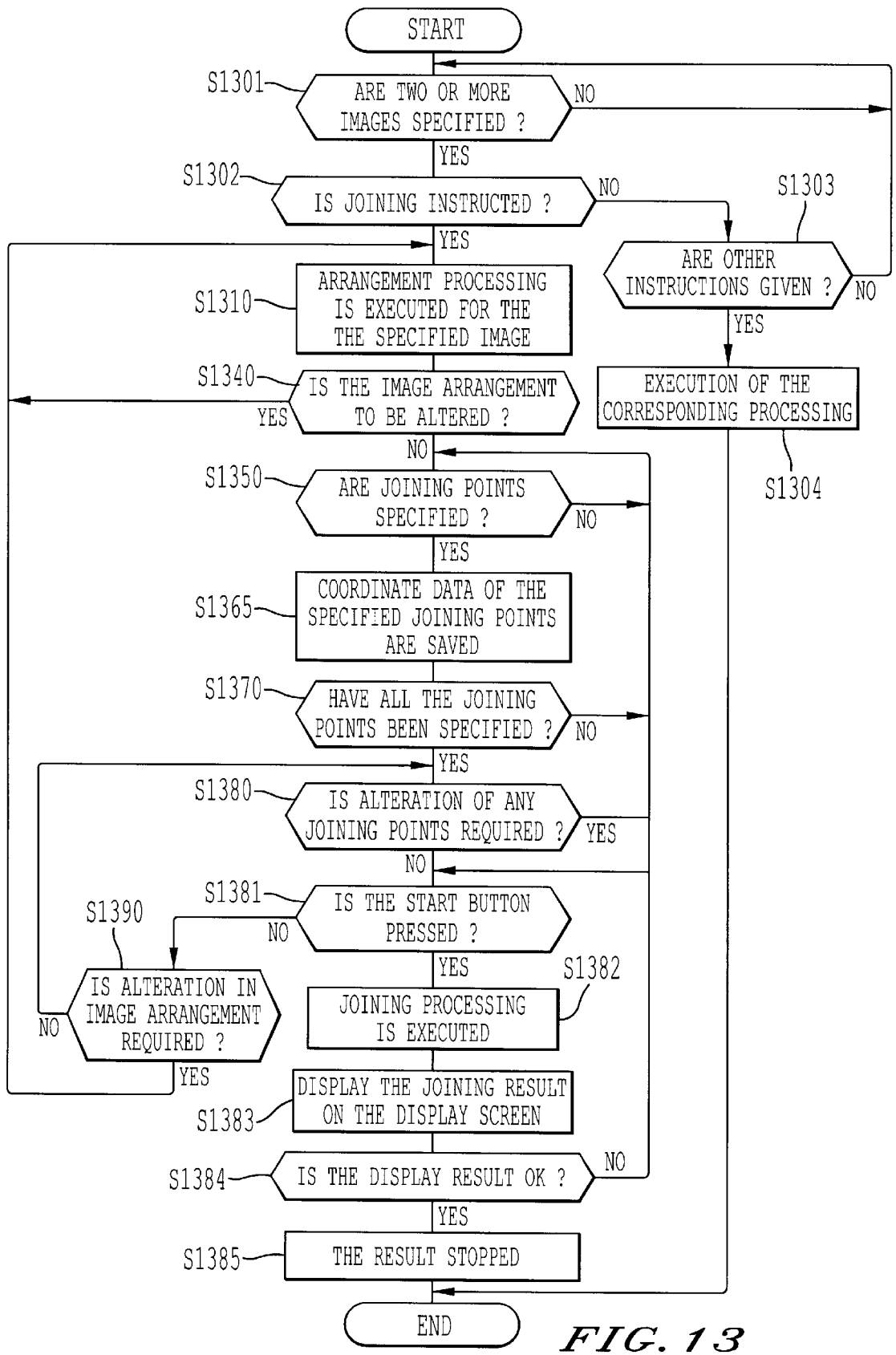
FIG. 13 is a flowchart showing a sequence of processing steps executed by the image altering part and a display control part according to the first embodiment of the present invention during the operation of joining plural images.

Next, description is made to a sequence of processing steps executed by the image altering part 304 and the display control part 307 according to the first embodiment. FIG. 13 is a flowchart showing a sequence of processing steps executed by the image altering part and the display control part according to the first embodiment. In the flowchart of FIG. 13, it is first determined whether two or more images are specified or not (step S1301). The operation remains instep S1301 until two or more images are specified (until step S1301 becomes affirmative), and it is then determined whether joining is instructed or not (step S1302).

If joining is not instructed in step S1302 (step S1302 is negative), it is determined whether other instructions such as deletion of images are given or not (step S1303). If no other instruction is given here (step S1303 is negative), the procedure returns to step S1301, and the subsequent processing steps are repeated. If any other instruction is given in step S1303 (step S1303 is affirmative), this operation is ended after execution of the corresponding processing (step S1304).

If joining is instructed in step S1302 (step S1302 is affirmative), arrangement processing is executed for the specified images (step S1310). The image arrangement procedures will be described in detail later.

It is next determined whether the image arrangement is to be altered or not (step S1340). If alteration is required (step S1340 is affinnative), the procedure returns to step S1310 in which the images are rearranged. If alteration is not required in step S1340 (step S1340 is negative), it is determined whether joining points are specified or not (step S1350). If any joining points are specified (step S1350 is affirmative), coordinate data of the joining points specified are saved (step S1365). The processing steps S1350 through S1370 are repeated until all the joining points are specified. When all the joining points have been specified (step S1370 is affirmative), it is further determined whether to alter any of the joining points (step S1380).

If alteration of any joining points is required in step S1380 (step S1380 is affirmative), the procedure returns to step S1350. On the other hand, if alteration of any joining points is not required in step S1380 (step S1380 is negative), it is determined whether the start button is pressed or not (step S1381). If the start button is pressed (stcp S1381 is affirmative), joining processing is executed, using the conventional technique disclosed in Japanese patent application No. 9-316679 or 10-91125 (which are hereby incorporated by reference) (step S1382) to display the joined image on the display screen of the display part 308 (step S1383).

It is next determined whether the displayed result is OK or not (step S1384). If the result is not OK (step S1384 is negative), the procedure returns to step S1350 to specify joining points again. On the other hand, if OK in step S1384, the result is stored (step S1385), and all the processing is ended.

If the start button is not pressed in step S1381 (step S1381 is negative), it is determined whether alteration in image arrangement is required or not (step S1390). If alteration is required (step S1390 is affirmative), the procedure returns to step S1310 and the subsequent processing steps are repeated. On the other hand, if alteration is not required (step S1390 is negative), the should be altered or not. After that, the subsequent processing steps are repeated.

Figure 14:
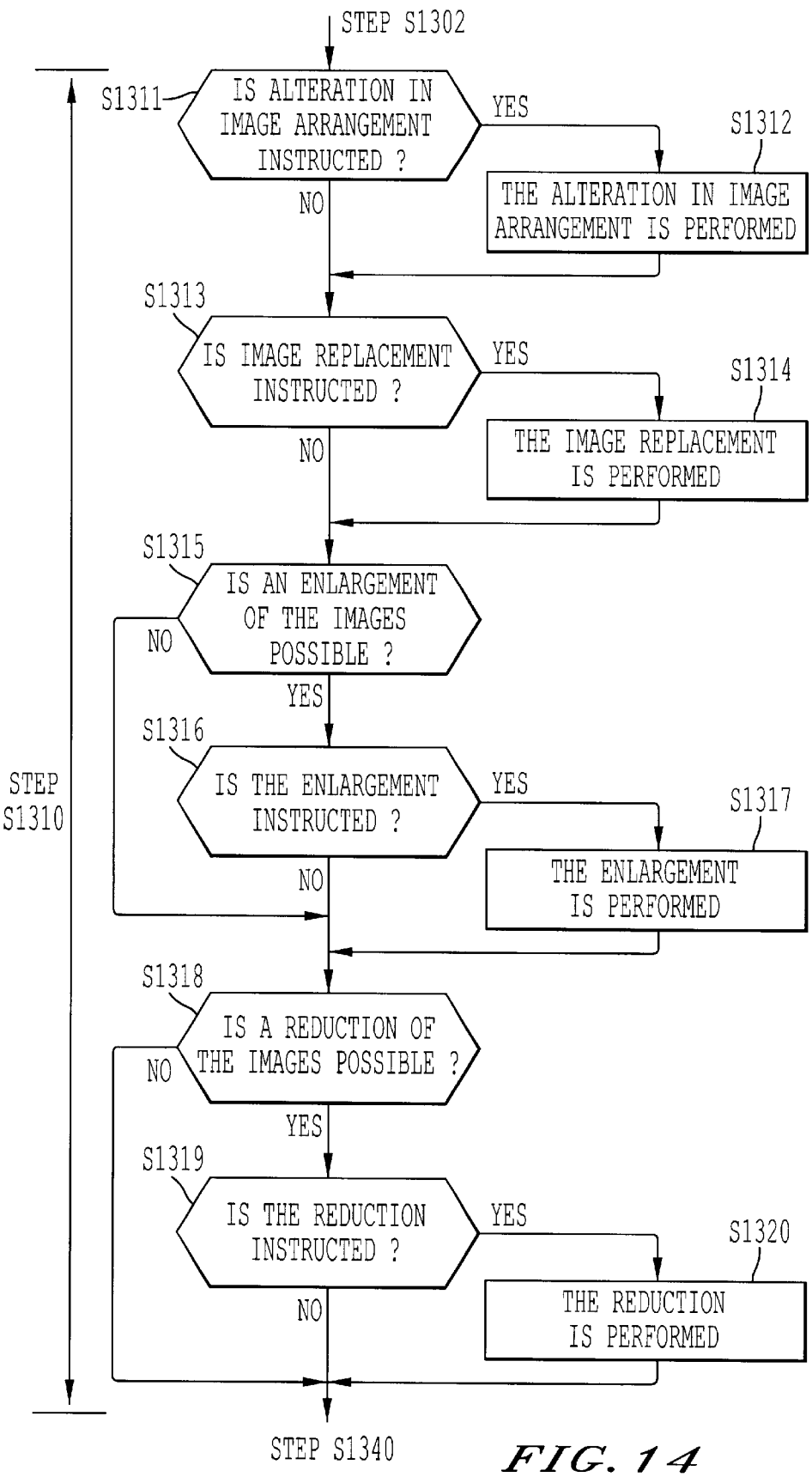
FIG. 14 is a flowchart showing processing steps executed by the image arranging part according to the first embodiment of the present invention during the operation of joining plural images.

Next, the image arrangement processing executed at step S1310 is described in detail. FIG. 14 is a flowchart showing processing steps executed by the image arranging part 402 according to the first embodiment. If joining is instructed in step S1302 of the flowchart of FIG. 13 (step S1302 is affirmative), determination is made in the flowchart of FIG. 14 as to whether alteration in image arrangement is instructed or not (step S1311). If instructed (step S1311 is affirmative), the alteration in image arrangement is performed (step S1312). On the other hand, if not instructed (step S1311 is negative), the procedure goes to the next step without execution of any processing.

It is next determined whether image replacement is instructed or not (step S1313). If instructed (step S1313 is affirmative), the image replacement is performed (step S1314). On the other hand, if not instructed (step S1313 is negative), the procedure goes to the next step without execution of any processing.

It is next determined whether an enlargement of the images is possible or not (step S1315). If possible (step S1315 is affirmative), determination is made as to whether the enlargement is instructed or not (step S1316). If instructed (step S1316 is affirmative), the enlargement is performed (step S1317). On the other hand, if it is not possible to enlarge the images (step S1315 is negative), or if the enlargement is not instructed (step S1316 is negative), the procedure goes to the next step without execution of any processing.

It is next determined whether a reduction of the images is possible or not (step S1318). If possible (step S1318 is affirmative), determination is made as to whether the reduction is instructed or not (step S1319). If instructed (step S1319 is affirmative), the reduction is performed (step S1320). On the other hand, if it is not possible to reduce the images (step S1318 is negative), or if the reduction is not instructed (step S1319 is negative), the procedure goes to the next step, i.e., step 1340, without execution of any processing.

As discussed above, when plural images are joined together, the first embodiment makes it easy to specify and arrange the images, and to specify joining points for adjacent images.

Second Embodiment

Although in the first embodiment one joining point is specified at a point, i.e., by clicking the button of the mouse 212 or the like, it may be specified using a line, i.e., by specifying the joint between adjacent images in a drag-and drop operation of the mouse 212 or the like, as discussed in the following second embodiment.

Since the general structure of the illustrated document creating system including an image processing apparatus according to the second embodiment of the present invention, and the hardware configuration of the image processing apparatus 100 are substantially the same as those of the first embodiment, description thereof is omitted here. Further, since the image processing apparatus 100 includes substantially the same parts as those of the first embodiment except the image altering part 304 and the display control part 307, the parts common to those of the first embodiment are also not described here.

Figure 15:
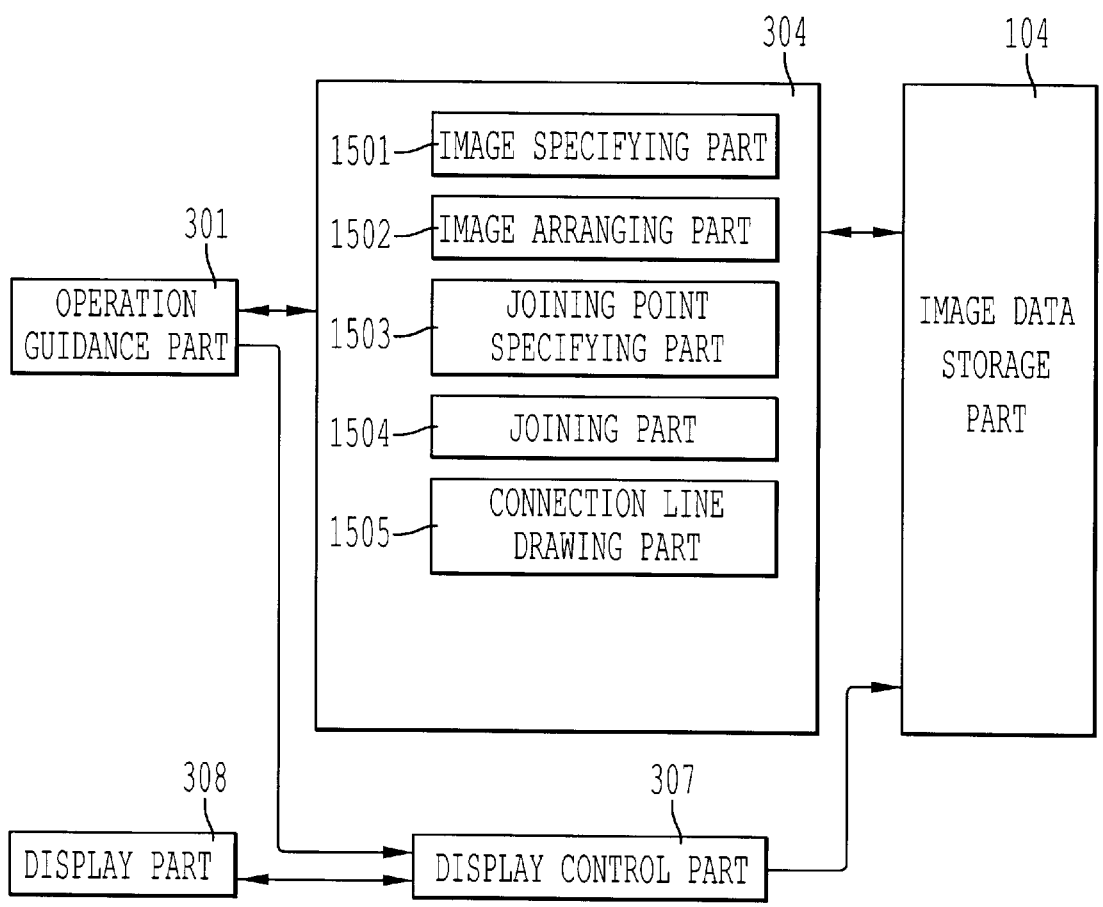
FIG. 15 is a functional block diagram showing the arrangement of an image altering part and the surroundings in an image processing apparatus according to the second embodiment of the present invention during the operation of joining plural images.

Next, the image altering part 304 is described. FIG. 15 is a functional block diagram showing the arrangement of the image altering part 304 and the surroundings in the image processing apparatus according to the second embodiment of the present invention. As shown in FIG. 15, the image altering part 304 includes an image specifying part 1501, an image arranging part 1502, a joining point specifying part 1503, a joining part 1504 and a connection line drawing part 1505. Since parts other than the joining point specifying part 1503 and the connection line drawing part 1505 are substantially the same as those of the first embodiment description thereof is omitted.

The joining point specifying part 1503 has substantially the same structure as that of the joining point specifying part 403 of the first embodiment, in which any one joining point is specified for each image so that vertically or laterally adjacent images, displayed on the display screen of the display part 308 under control of the display control part 307, can be joined by referring to the joining point, but differs from the joining point specifying part 403 in method of specifying the joining point. The connection line drawing part 1505 is to draw a connection line between the joining points specified by the joining point specifying part 1503. The processing contents of the joining point specifying part 1503 and the connection line drawing part 1505 will be described in detail later.

The image specifying part 1501, the image arranging part 1502, the joining point specifying part 1503, the joining part 1504 and the connection line drawing part 1505 are embodied, respectively, by the CPU 201 or the like executing command processing according to commands written in programs such as an OS and an application program recorded on recording media such as the ROM 202, the RAM 203, the hard disk 205 or the floppy disk 207.

Figure 16:
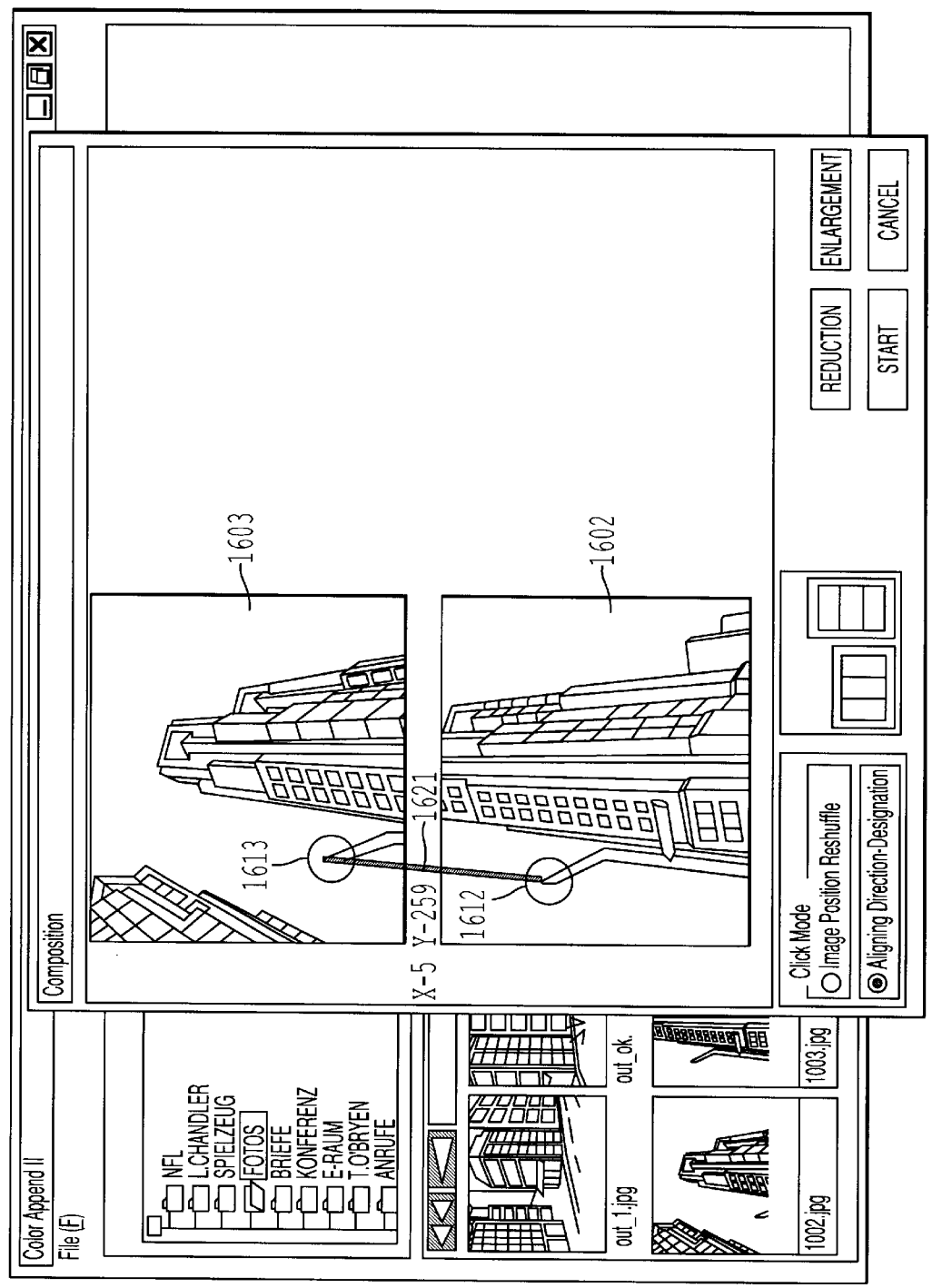
FIG. 16 is an illustration showing an example of a display screen on the display part of the image processing apparatus according to the second embodiment of the present invention during the operation of joining plural images.

The display control part 307 controls the display part 308 to display not only images arranged by the image arranging part 1502, but also a connection line 1621 drawn by the connection line drawing part 1505 as shown in FIG. 16.

Next, description is made to specification processing of joining points and drawing processing of a connection line executed by the joining point specifying part 1503 and the connection line drawing part 1505. FIG. 16 is an illustration showing an example of a display screen on the display part 308 of the image processing apparatus according to the second embodiment. In FIG. 16, the operator switches the click mode to the joining position specifying mode, compares adjacent images 1602 and 1603 to specify characteristic points at which an identical image character appears on both images. The operator then moves the cursor to one point 1612 on the image 1602, clicks (presses) the button of the mouse 212 or the like, and moves (drags) the cursor to the other point 1613 on the image 1603 by moving the mouse 212 while maintaining a pressed state of the button. The connection line drawing part 1505 is synchronized with the movement of the cursor to draw the connection line 1621 on the coordinates identical to the cursor path on the screen. When the cursor reaches the point 1613, the operator releases (drops) the pressed state of the button. The connection line 1621 drawn by the connection line drawing part 1505 is thus fixed.

The joining points are specified as such above. Coordinate data of the joining points specified are saved (stored) in a storage provided inside the joining point specifying part 1503. As in the first embodiment, the specification processing of joining points is performed for each pair of vertically or laterally adjacent images. After completion of the specification processing for all the adjacent images, the operator can press the start button to start execution of joining processing.

Thus, the joining points can be specified by the simplest way by pressing the button of the mouse or the like, moving the mouse while pressing the button, and releasing the pressed button in a predetermined position.

The connection line 1621 may be such a colored line that it can be easily discriminated, such as a red line. The connection line may also have such a thickness that is can be easily discriminated. The line types, such as color and thickness, may be selectable by the operator, or selectable automatically depending on the image by taking into account a color used in the image so that the connection line can be more easily discriminated from the color.

The connection line 1621 may be displayed as a dotted line during drag operation, and changed to a solid line after drop operation to fix the connection line. This makes it possible for the operator to easily confirm the process of specifying the connection line.

Figure 17:
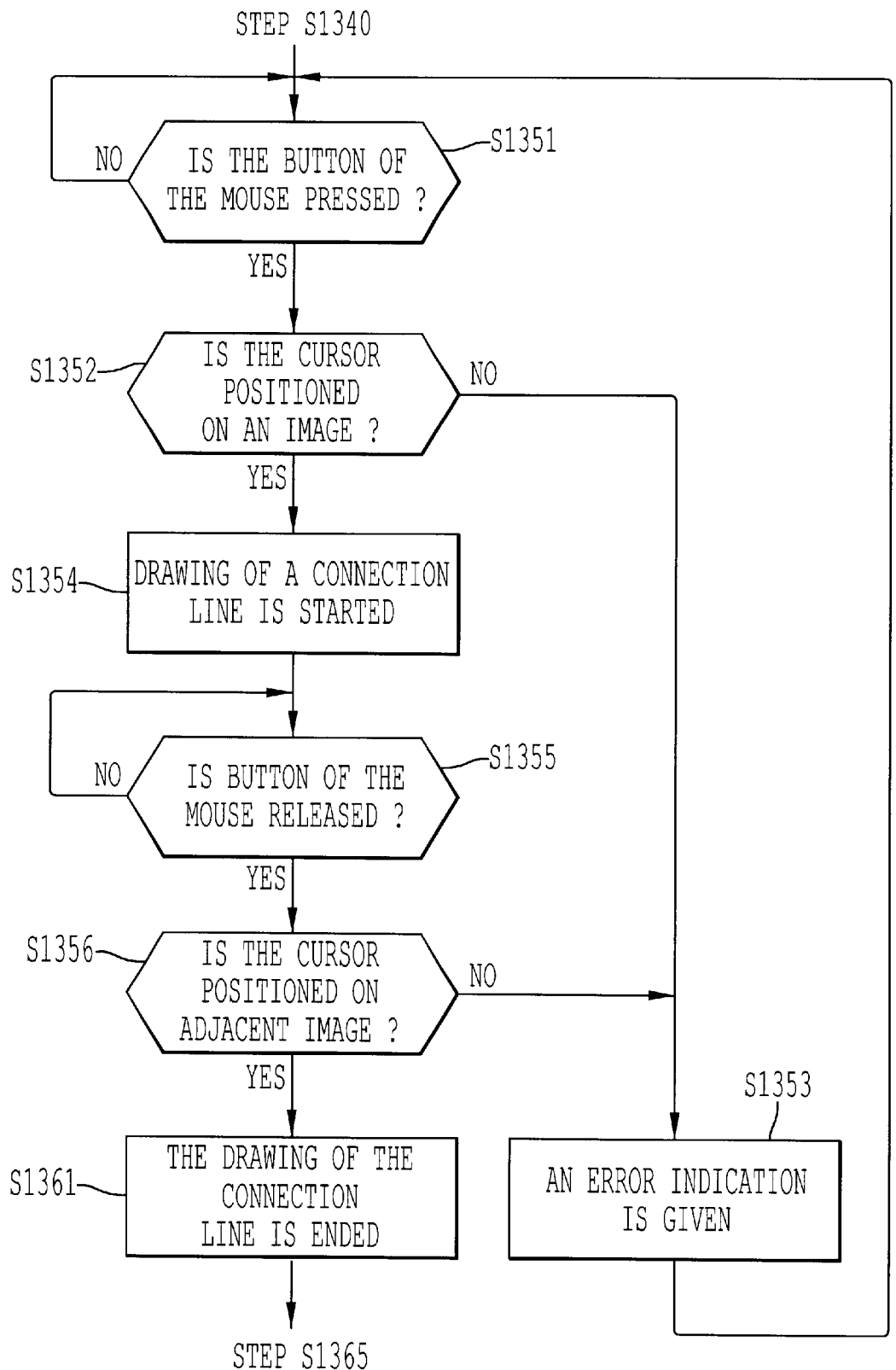
FIG. 17 is a flowchart showing part of processing steps executed by an image altering part and a display control part according to the second embodiment of the present invention during the operation of joining plural images.

Next, description is made to a sequence of processing steps executed by the image altering part 304 and the display control part 307 according to the second embodiment. FIG. 17 is a flowchart showing part of processing steps executed by the image altering part 304 and the display control part 307 according to the second embodiment. Since the flowchart of FIG. 17 executes the same processing steps as those from S1301 to S1340 and those from S1365 to S1390 in the flowchart of FIG. 13 according to the first embodiment, the common steps and their description are omitted.

In step S1340 of the flowchart of FIG. 13 according to the first embodiment, if alteration in image arrangement is not required (step S1340 is negative), determination is made in the flowchart of FIG. 17 as to whether the button of the mouse 212 or the like is pressed or not (step S1351). If the button is pressed (step S1351 is affirmative), it is determined whether the cursor is positioned on an image or not (step S1352). If the cursor is not positioned on any image (step S1352 is negative), an error indication is given (step S1353) and the procedure returns to step S1351. On the other hand, if the cursor is positioned on an image (step S1353 is affirmative), drawing of a connection line is started at the point (step S1354).

After that, the operation remains in step S1355 until the button of the mouse 212 or the like is released. When the button is released (step S1355 becomes affirmative), it is determined whether or not the cursor is positioned on an image adjacent to the image on which the cursor has been located in step S1352 (step S1356). If the cursor is not positioned on the adjacent image (step S1356 is negative), an error indication is given (step S1353), and the procedure returns to step S1351 to repeat the subsequent processing steps.

If it is determined in step S1356 that the cursor is positioned on the adjacent image (step S1356 is affirmative), the drawing of the connection line is ended (step S1361). After that, the procedure goes to step S1365 of FIG. 13 according to the first embodiment.

As discussed above, according to the second embodiment, a connection line is drawn between joining points specified, so that the operator can not only specify the joining points as if he or she drew a line by hand, but also recognize instantaneously whether the joining points are specified or not.

Third Embodiment

The set of joining points already specified may be released when a new set of joining points is specified for a pair of adjacent images, as described in the following third embodiment. Since the general structure of the illustrated document creating system including an image processing apparatus according to the third embodiment of the present invention, and the hardware configuration of the image processing apparatus 100 are the same as those of the first embodiment, description thereof is omitted here. Further, since the image processing apparatus 100 includes the same parts as those of the first embodiment except the image altering part 304, the parts common to those of the first embodiment are also not described here.

Figure 18:
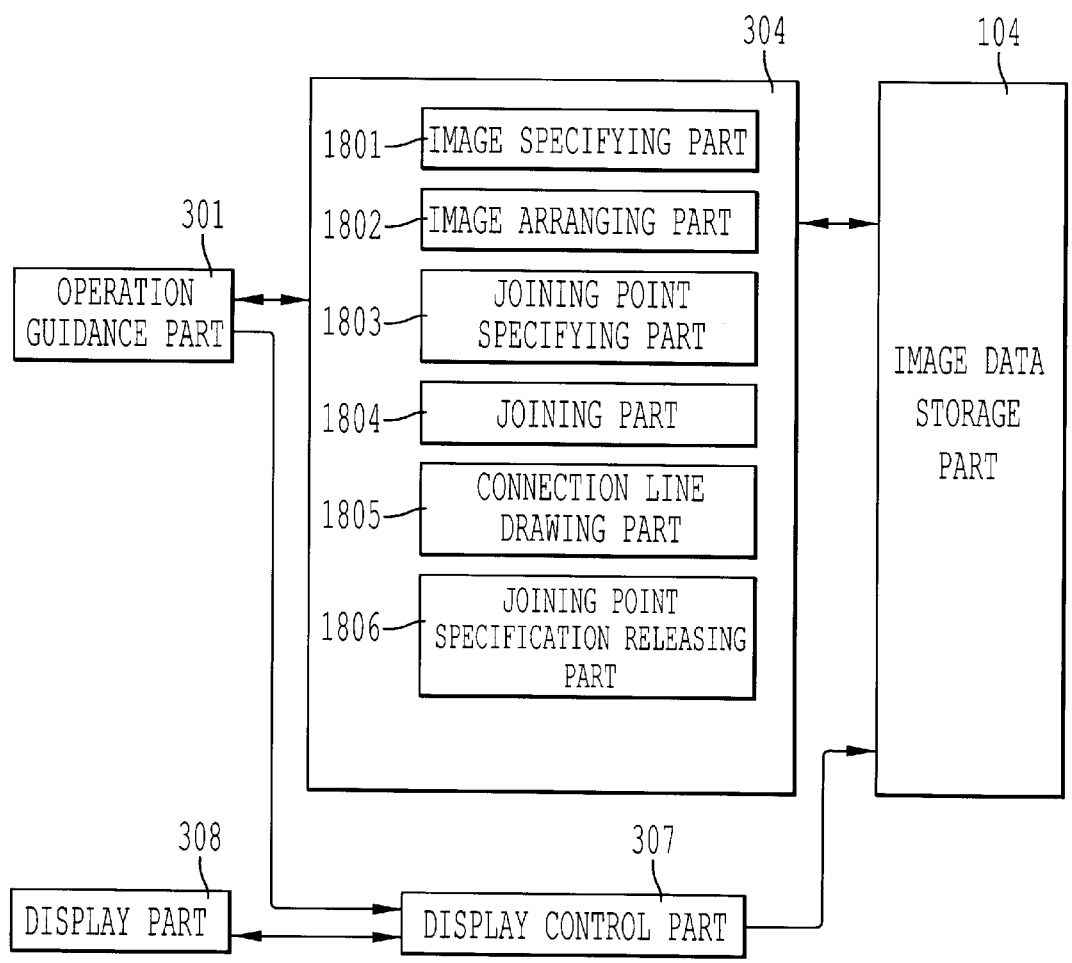
FIG. 18 is a functional block diagram showing the arrangement of an image altering part and the surroundings in an image processing apparatus according to the third embodiment of the present invention during the operation of joining plural images.

Next, the image altering part 304 is described. FIG. 18 is a functional block diagram showing the arrangement of the image altering part 304 and the surroundings in the image processing apparatus according to the third embodiment of the present invention. As shown in FIG. 18, the image altering part 304 includes an image specifying part 1801, an image arranging part 1802, a joining point specifying part 1803, a joining part 1804, a connection line drawing part 1805 and a joining-point specification releasing part 1806.

Since parts other than the joining point specifying part 1803, the connection line drawing part 1805 and the joining-point specification releasing part 1806 are the same as those of the first embodiment, and the connection line drawing part 1805 is the same as that of the second embodiment, description thereof is omitted.

The joining point specifying part 1803 may be either the joining point specifying part 403 of the first embodiment, or the joining point specifying part 1503. The joining-point specification releasing part 1806 releases specification of the previous set of joining points when a set of joining points is specified for a pair of adjacent images for which another set of joining points has already been specified. The processing contents of the joining-point specification releasing part 1806 will be described in detail later.

The image specifying part 1801, the image arranging part 1802, the joining point specifying part 1803. the joining part 1804. the connection line drawing part 1805 and the joining point specification releasing part 1806 are embodied, respectively, by the CPU 201 or the like executing command processing according to commands written in programs such as an OS and an application program recorded on recording media such as the ROM 202, the RAM 203, the hard disk 205 or the floppy disk 207.

Next, description is made to releasing processing of a set of joining points executed by the joining-point specification releasing part 1806. When a set of joining points is specified for a pair of adjacent images, the joining-point specification releasing part 1806 recognizes whether another set of joining points has already been specified for the adjacent images, by referring to whether or not coordinate data of the corresponding joining points are stored in a storage area provided inside the joining point specifying part 1803.

Further, when a new set of joining points is specified, the joining-point specification releasing part 1806 releases the previous joining points by deleting corresponding coordinate data stored, and stores the set of joining points newly specified. Thus, the joining points can be easily changed. The joining-point specification releasing part 1806 also deletes a connection line, if any, drawn between the joining points already specified.

Figure 19:
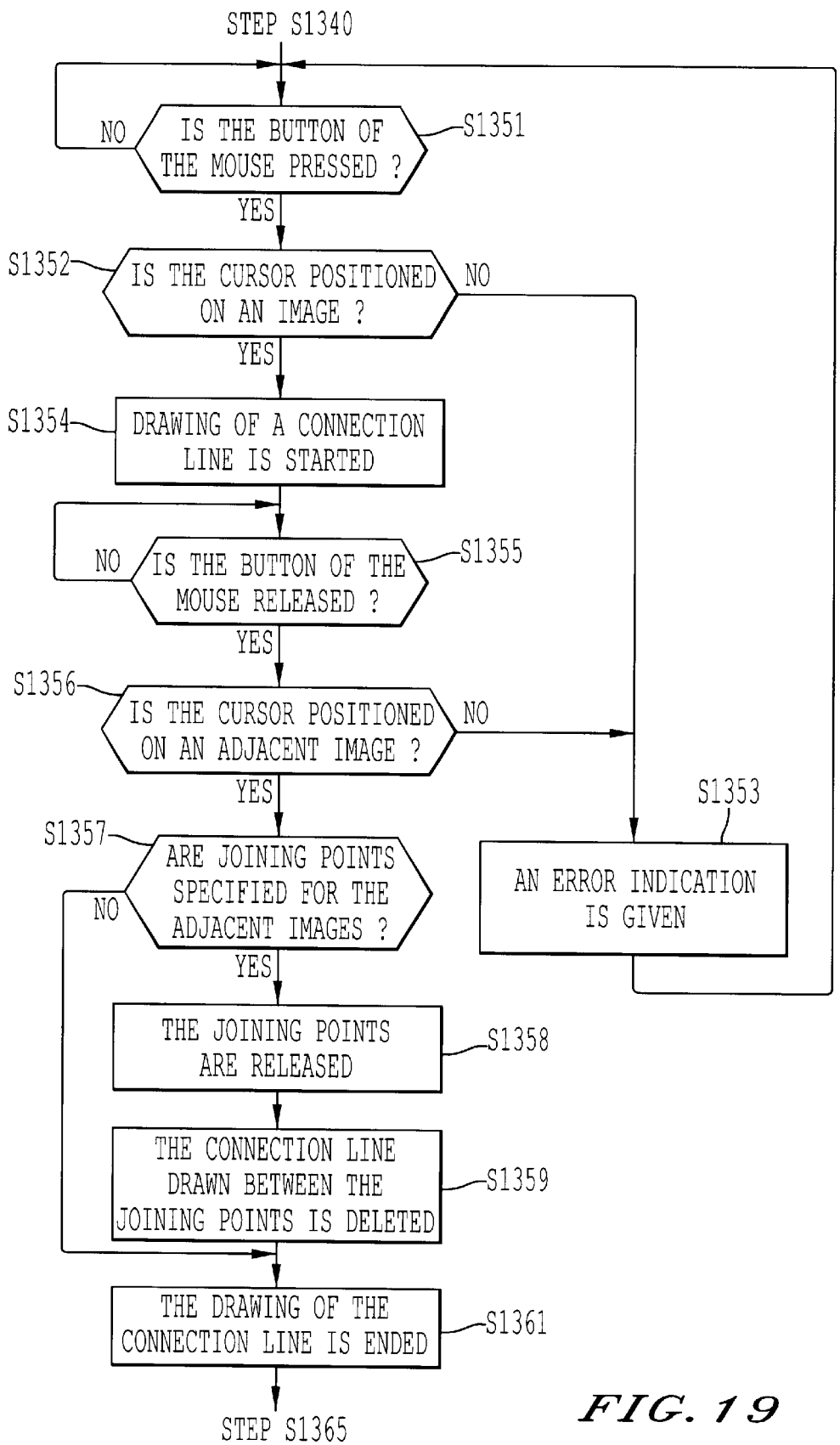
FIG. 19 is a flowchart showing parts of processing steps executed by the image altering part and a display control part according to the third embodiment of the present invention during the operation of joining plural images.

Next, description is made to a sequence of processing steps executed by the image altering part 304 and the display control part 307 according to the third embodiment. FIG. 19 is a flowchart showing parts of processing steps executed by the image altering part 304 and the display control part 307 according to the third embodiment.

Since the flowchart of FIG. 19 executes the same processing steps as those from S1301 to S1340 and those from S1365 to S1390 in the flowchart of FIG. 13 according to the first embodiment, the common steps and their description are omitted. Further, the flowchart of FIG. 19 also executes the same processing steps as those from S1351 to S1356 and S1365; description thereof is omitted as well.

In step S1356, if the cursor is positioned on the adjacent image (step S1356 is affirmative), it is then determined whether joining points are specified for the adjacent images or not (step S1357). If the joining points are not specified (step S1357 is negative), the procedure shifts to step S1361 without execution of any processing.

On the other hand, if the joining points are specified (step S1357 is affirmative), the joining points arc released (step S1358). The connection line drawn between the joining points is then deleted (step S1359), and the procedure goes to step S1361.

As discussed above, according to the third embodiment, when a set of joining points is specified for adjacent images for which another set of joining points has already been specified, the joining-point specification releasing part 1806 releases the previous set of joining points already specified, so that when specifying a new set of joining points, the operator can change the specification of joining points easily and efficiently in the same operation when specifying a set of joining points for the first time without the need to release the specification of the previous set of joining points.

Fourth Embodiment

Although the above first to third embodiments have been made for images photographed with a digital still camera 213 having a fixed focal length, i.e., these embodiments assume that the focal length is invariable, the focal length may be set for proper joining of images even if the images have been photographed with a digital still camera 213 having variable focal lengths, as discussed in the following fourth embodiment.

When two or more images for joining together are photographed at different focal lengths, because these images differ in image size depending on the focal length, it is difficult to join these images together. The fourth embodiment has been made to solve the problem by standardizing the focal length of the images so that the images can be joined together. Since the general structure of the illustrated document creating system including an image processing apparatus according to the fourth embodiment of the present invention, and the hardware configuration of the image processing apparatus 100 are the same as those of the first embodiment, description thereof is omitted here. Further, since the image processing apparatus 100 includes the same parts as those of the first embodiment except the image altering part 304, the parts common to those of the first embodiment are also not described here.

Figure 20:
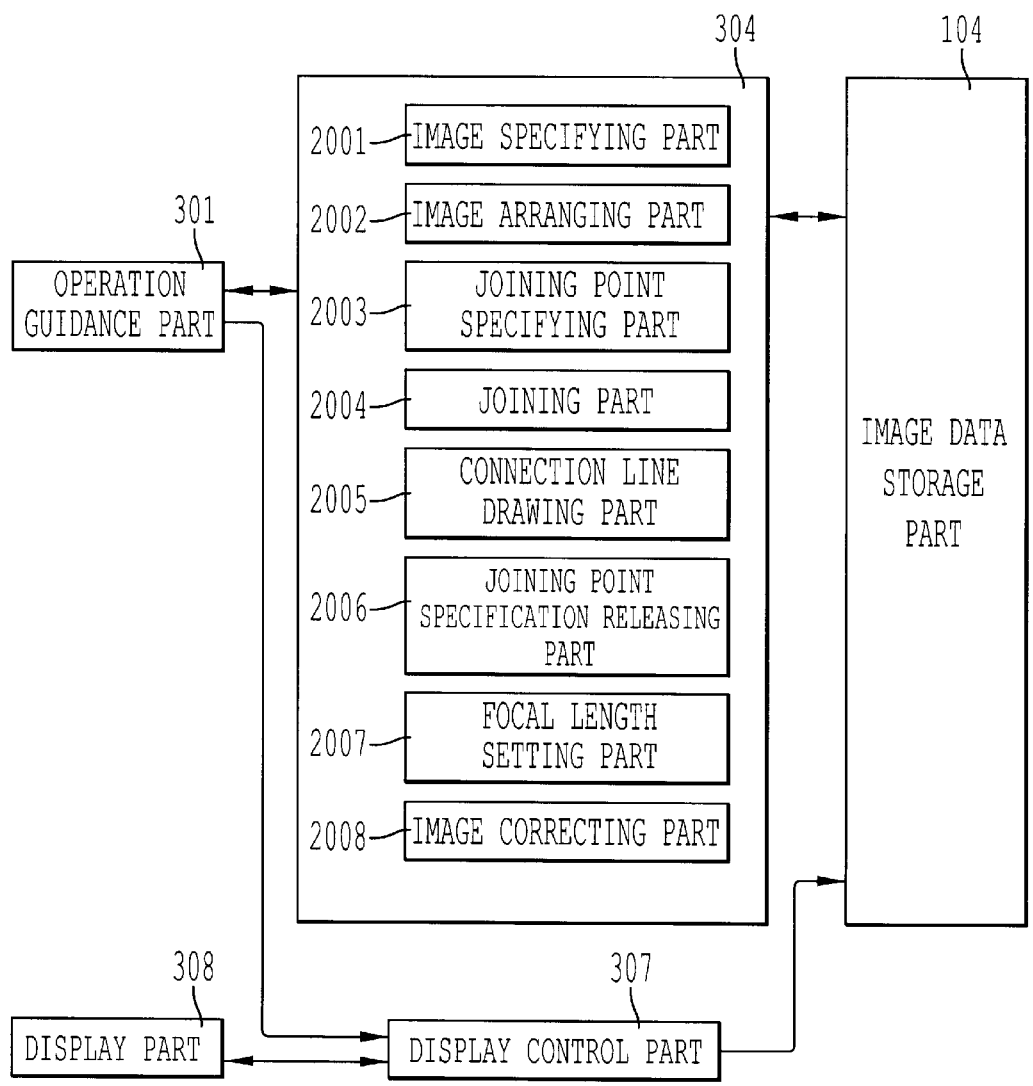
FIG. 20 is a functional block diagram showing the arrangement of an image altering part and the surroundings in an image processing apparatus according to the fourth embodiment of the present invention during the operation of joining plural images.

Next, the image altering part 304 is described. FIG. 20 is a functional block diagram showing the arrangement of the image altering part 304 and the surroundings in the image processing apparatus according to the fourth embodiment of the present invention. As shown in FIG. 20, the image altering part 304 includes an image specifying part 2001, an image arranging part 2002, adjoining point specifying part 2003, a joining part 2004, a connection line drawing part 2005, a joining-point specification releasing part 2006, a focal length setting part 2007 and an image correcting part 2008. The parts other than the focal length setting part 2007 and the image correcting part 2008 are the same as those of the first to third embodiments, and therefore description thereof is omitted.

The focal length setting part 2007 sets the focal length of an image, photographed with a digital still camera 213 or the like in accordance with an operating instruction from the operation guidance part 301. The focal length may be set by directly inputting a numerical value for the focal length, or otherwise, from a table related to camera types and their focal lengths pre-stored in the table. The processing contents of the focal length setting part 2007 will be described in detail later.

The image correcting part 2008 corrects the image to be joined with other images based on data of the focal length set by the focal length setting part 2007. The correction processing may include correction of distortion of an image resulting from distortion aberration of the optical system of the image. Specifically, a distortion aberration coefficient is estimated based on the focal length data to execute the distortion correction for each image using the estimated distortion aberration coefficient. The distortion may be corrected, for example, by a method such as one disclosed in Japanese application No. 9-303893 (U.S. patent application Ser. No. 08/807,571, filed Feb. 27, 1997) of the same applicant.

The image specifying part 2001, the image arranging part 2002, the joining point specifying part 2003, the joining part 2004, the connection line drawing part 2005, the joining-point specification releasing part 2006, the focal length setting part 2007 and the image correcting part 2008 are embodied, respectively, by the CPU 201 or the like executing command processing according to commands written in programs such as an OS and an application program recorded on recording media such as the ROM 202, the RAM 203, the hard disk 205 or the floppy disk 207.

Figure 21:
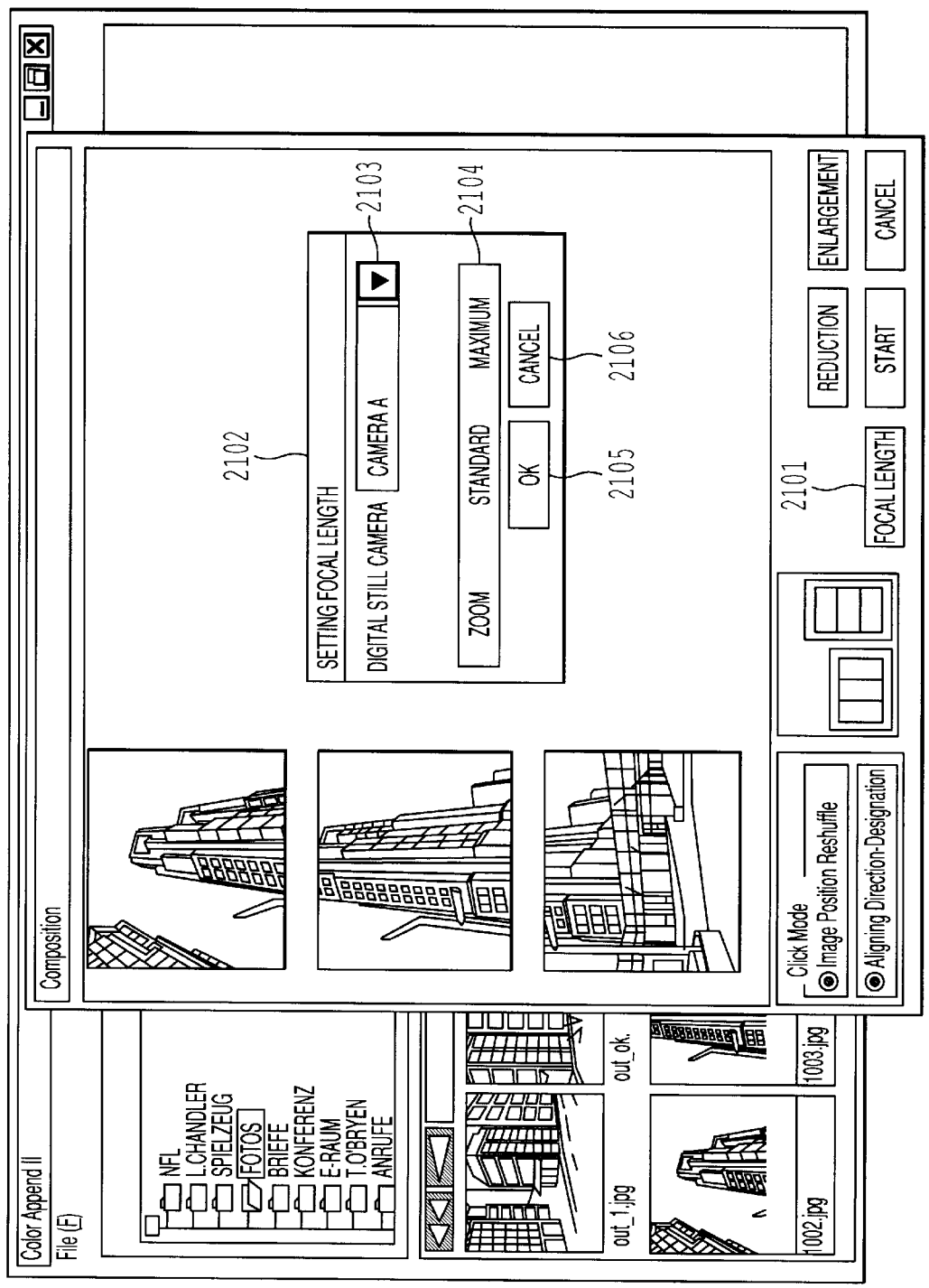
FIG. 21 is an illustration showing an example of a display screen on the display part of the image processing apparatus according to the fourth embodiment of the present invention during the operation of joining plural images.

Next, description is made to focal-length setting processing executed by the focal length setting part 2007. FIG. 21 is an illustration showing an example of a display screen on the display part 308 of the image processing apparatus according to the fourth embodiment. There is shown in FIG. 21 a focal length button 2101 to open a focal length setting window 2102 for setting the focal length. In FIG. 21, since the focal length setting button 2101 has already been pressed, the focal length setting window 2102 is in the popped-up state.

The focal length setting window 2102 includes an input frame 2103 into which the type of digital still camera 213 is input, a zoom switching part 2104, an OK button 2105 and a cancel button 2106.

The name of a digital still camera can be directly input into the input frame 2103, but in general, the rightmost button is pressed to display a list of the names of digital still cameras so that the name of a digital still camera with which an image to be joined has been photographed can be selectively input. The standard focal lengths of the listed cameras is stored.

The zoom switching part 2104 is to switch the mode related to the zoom depending on whether the image to be joined has been photographed in the zoom mode or not. When no zoom is used for the photograph. the mode is switched to "standard," i.e., the standard focal length for the specified camera. On the other hand, when the zoom is used for the photograph, the mode is switched to "maximum," i.e., maximum zoom for the camera specified.

Although in the embodiment switching is enabled between two kinds of modes, more than two zoom modes can be used for switching over among them depending on the types of digital still cameras and the kinds of zooms. In some types of digital still cameras, the information related to setting of the focal length may be added to the image data. In this case, the focal length may be automatically set by reading the information related to setting of the focal length.

After completion of input of the name of a digital still camera and switching of the zoom mode. the operator may press the OK button 2105 to end the setting processing of the focal length and close the focal length setting window 2102. or the cancel button 2106 to cancel the setting process and close the focal length setting window 2102.

Figure 22:
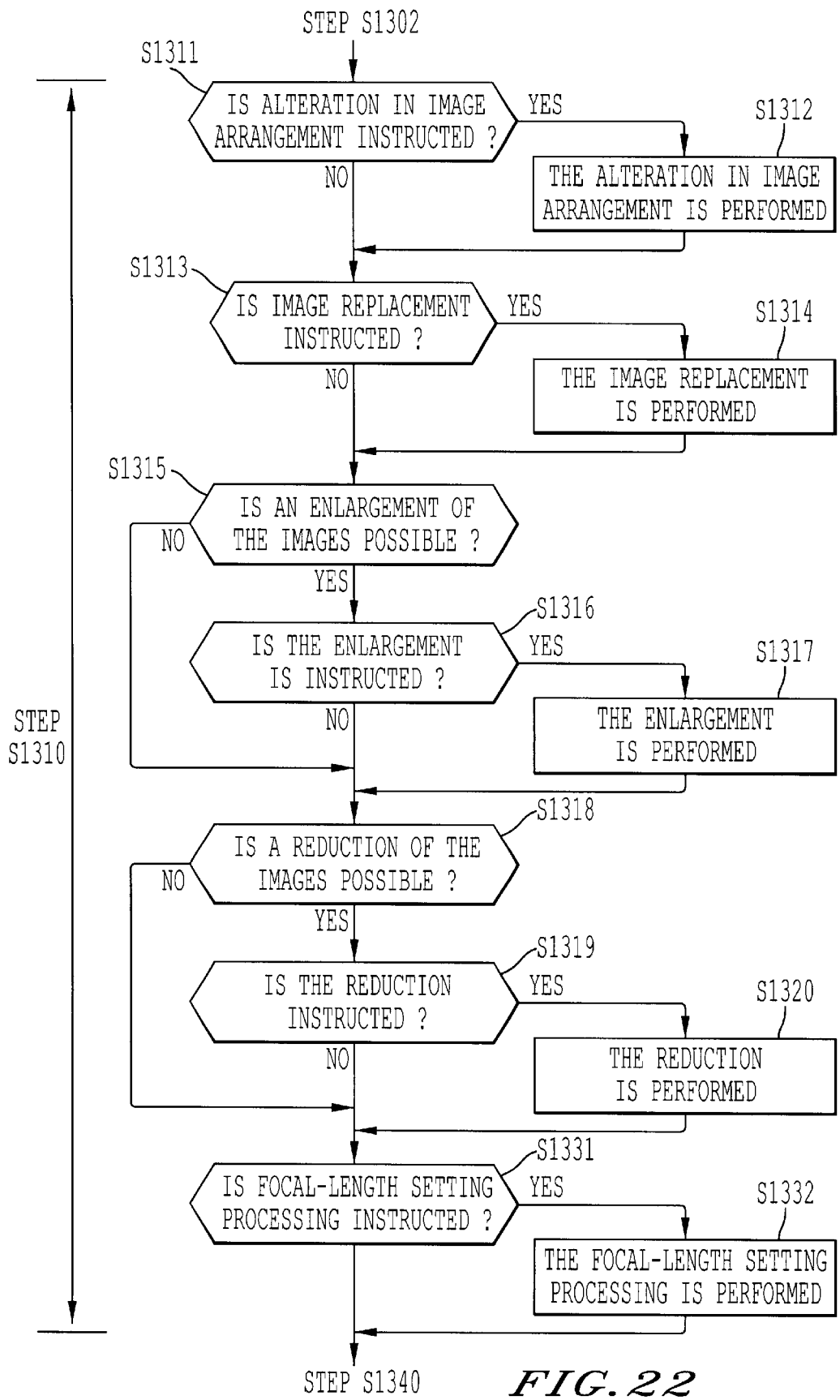
FIG. 22 is a flowchart showing parts of processing steps executed by the image altering part and a display control part according to the fourth embodiment of the present invention during the operation of joining plural images.

Next, description is made to a sequence of processing steps executed by the image altering part 304 and the display control part 307 according to the fourth embodiment. FIG. 22 is a flowchart showing part of processing steps executed by the image altering part and the display control part according to the fourth embodiment.

Since the flowchart of FIG. 22 executes the same processing steps as those from S1301 to S1310 and those from S1340 to S1390 in the flowchart of FIG. 13 according to the first embodiment, the marks of the common steps and their description are omitted. The flowchart of FIG. 22 also executes the same processing steps as those from S1311 to S1320 in the flowchart of FIG. 14 according to the first embodiment and therefore description thereof is omitted as well.

In the flowchart of FIG. 22, if step S1319 is negative or step S1320 is affirmative, determination is made as to whether focal-length setting processing is instructed or not (step S1331). If instructed (step 513311 is affirmative), the focal-length setting processing is performed (step S1332). On the other hand, if not instructed (step S1331 is negative), the procedure goes to the next step, i.e., step S1340, without execution of any processing.

As discussed above, according to the fourth embodiment, the focal length setting part 2207 sets the focal length with which an image has been input, while the image correcting part 2208 corrects the image based on the focal length set, for joining the image with another. This makes it possible to join images together without occurrence of distortion even if the images have been input by input devices with different focal lengths.

Fifth Embodiment

Since the above first to fourth embodiments assume a case where a maximum of three images can be arranged both in the vertical direction and in the lateral direction, such a number of images (two, three, four, six or nine) as to shape the joined image into a square or rectangle can only be joined together. However, the number of images to be arranged vertically or laterally can be so increased that further different combinations of images (such as eight images, arranged two in length and four in width, or four in length and two in width) can be arranged. This embodiment is discussed below on the assumption that such a number of images as to make the joined image into a rectangular shape can be set, but the present invention is not limited by these cases, and such combinations of images as to form unique shapes other than rectangles may be set. Further, plural images such as four images, five images, six images, seven images, eight images, nine images and so on may be so joined that a panorama of landscape type can be formed.

Since the general structure of the illustrated document creating system including an image processing apparatus according to the fifth embodiment of the present invention, and the hardware configuration of the image processing apparatus 100 are the same as those of the first embodiment, description thereof is omitted here. Further, the functional configuration of the image processing apparatus 100 is the same as that of the first to fourth embodiments and therefore description thereof is omitted as well.

Figure 23:
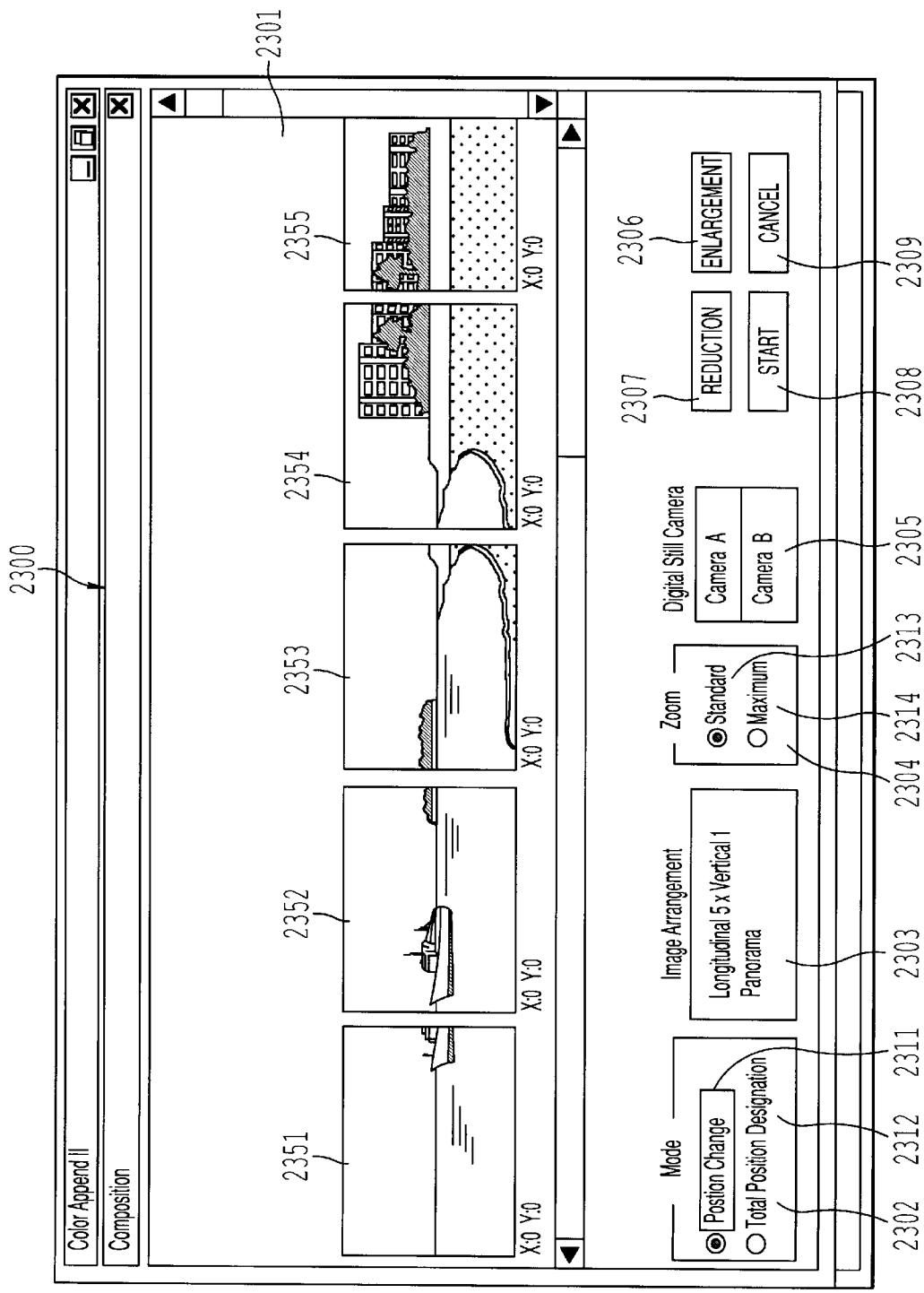
FIG. 23 is an illustration showing an example of a display screen on a display part of an image processing apparatus according to the fifth embodiment of the present invention during the operation of joining plural images.

FIG. 23 is an illustration showing an example of a display screen on the display part 308 of the image processing apparatus according to the fifth embodiment. A joining window 2300 includes a joining work area 2301, a mode switching part 2302, an arrangement switching part 2303, a zoom switching part 2304, a camera switching part 2305, a scale-up button 2306, a scale-down button 2307, a start button 2308 and a cancel button 2309.

As in the joining work area 701 of the first embodiment, images specified by the image specifying part 401 are displayed in the joining work area 2301. In FIG. 23, five images (2351, 2352, 2353, 2354 and 2355) specified from corresponding reduced images or thumbnails are displayed at a predetermined magnification rate.

As with the mode switching part 702 of the first embodiment, an image position replacing mode 2311 and a joining position specifying mode 2312 are displayed on the mode switching part 2303 as click modes of the pointing device such as the mouse 212. Since the image position replacing mode 2311 and the joining position specifying mode 2312 have the same contents as the image position replacing mode 708 and the joining position specifying mode 709, description thereof is omitted here.

Arrangement alternatives selectable as display layouts of images specified by the image specifying part 401 are displayed on the arrangement switching part 2303. The arrangement switching part 2303 will be described in detail later.

Selectable zoom switching alternatives related to whether an image to be joined with another has been photographed in the zoom mode or not are displayed on the zoom switching part 2304. When no zoom is used for the photograph, the mode is switched to "standard" 2313. On the other hand, when the zoom is used for the photograph, the mode is switched to "maximum" 2314. The zoom mode is thus switched.

Although in this embodiment, switching is enabled by selecting one switching alternative out of two kinds of switching alternatives, more than two zoom modes may be used for switching, depending on the types of digital still cameras and the kinds of zooms. In some types of digital still cameras. the information related to setting of the focal length may be added to the image data. In this case, the focal length may be automatically set by reading the information related to setting of the focal length.

A list of the names of selectable digital still cameras is displayed on the camera switching part 2305. The operator can select, out of the listed names, the name of a digital still camera with which an image to be joined with other images has been photographed. The camera switching is thus performed.

As with the scale-up button 704 of the first embodiment, the scale-up button 2306 is a button to enlarge the size of images displayed on the joining work area 2301. The images are enlarged to predetermined magnification each time the scale-up button is pressed, i.e., when the operator moves the cursor onto the scale-up button 2306 to click the button of the mouse 212 or the like one time. The images are thus enlarged on the joining work area 701 at a predetermined magnification rate, and displayed on the joining work area 2301. This makes it easy for the operator to specify joining points.

The scale-down button 2307 is a button, as similar to the scale-down button 705 of the first embodiment, to reduce the images, in a way opposite to the scale-up button 2306, to predetermined magnification identical to that of the scale-up button 2306, according to the number of times the button is pressed. If the scale-down button 2307 is pressed as many times as the scale-up button 2306 is pressed, the images will be returned to the original size.

The start button 2308 is similar to the start button 706 of the first embodiment. to instruct the start of joining processing of the images. Since no joining points have been specified yet, the start button 2308 is grayed out, and pressing the start button 2308 is inhibited.

The cancel button 2309 is similar to the cancel button 707 of the first embodiment, to instruct cancellation of the joining processing. If the cancel button 2309 is pressed, the joining processing currently being performed is stopped, and the joining window 2300 is closed.

Further, since joining points need to be specified by the joining point specifying part 403 for each pair of the adjacent images displayed on the joining work area 2301, the images must be displayed in such a layout as to join the images in that order. For this reason, the image arranging part 402 performs position replacement processing of the images. The position replacement processing of the images is performed in the same manner as that in the first embodiment and therefore description thereof is omitted here.

Figure 24:
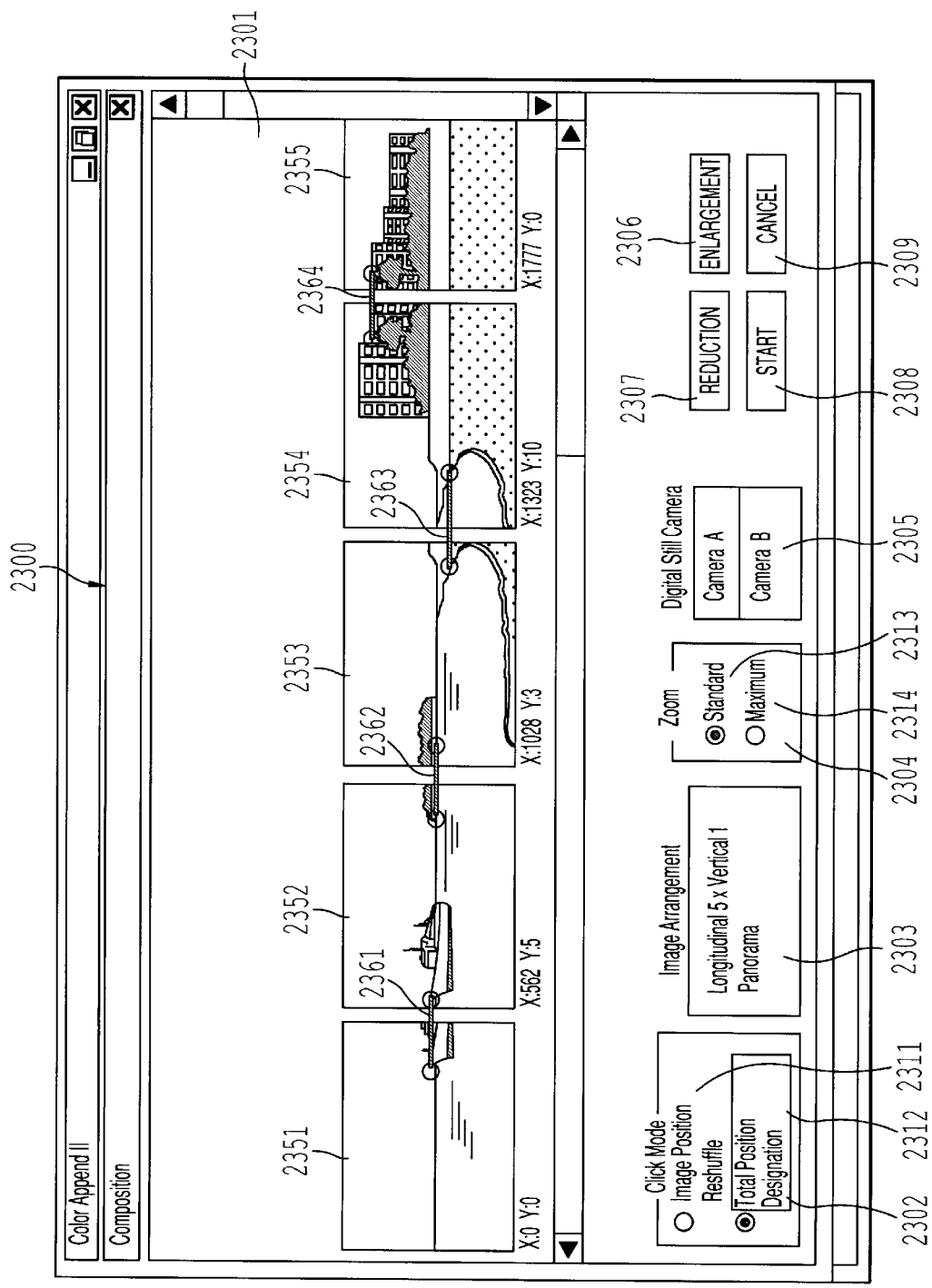
FIG. 24 is an illustration showing another example of the display screen on the display part of the image processing apparatus according to the fifth embodiment of the present invention during the operation of joining plural images.

FIG. 24 is an illustration showing another example of the display screen on the display part 308 of the image processing apparatus according to the fifth embodiment. In FIG. 24, the click mode on the mode switching part 2302 is switched from the image position replacing mode 2311 to the joining position specifying mode 2312. Then adjacent images in the joining work area 2301 are compared to specify, with the pointing device such as the mouse 212, respective characteristic points at which an identical image character appears on both images. FIG. 24 shows a case where connection lines 2361, 2362, 2363 and 2364 are drawn as the specification results of the characteristic points. For example, the connection line 2361 connects the characteristic points of the bow appearing on both images 2351 and 2352.

When one image differs in brightness from another, the brightest image is used to standardize the brightness of the other images thereto. Alternatively, the leftmost image may be used to standardize the brightness of the other images, or any image selected by the operator may be used to standardize the brightness of the other images.

Since the connection lines 2361, 2362, 2363 and 2364 are drawn in the same manner as the connection line 1621 is drawn in the second embodiment, description of the drawing method is omitted here. Further, the image joining method is also the same as that in the first embodiment and therefore description thereof is omitted as well. After completion of drawing all the connection lines, the start button 2308 enters a state in which the operator can press it. Pressing the start button 2308 allows the start of image joining processing.

Next, arrangement switching processing executed by the arrangement switching part 2303 is described. FIGS. 25 through 32 are illustrations showing examples of displayed modes on the arrangement switching part 2303 of the image processing apparatus according to the fifth embodiment, and arrangements or layouts of images in the joining work area 2301. In FIGS. 25a through 32a show examples of displayed modes on the arrangement switching part 2303, and FIGS. 25b–32b, and FIGS. 25c–32c, show variations of image arrangements in the joining work area 2301.

Figure 25A:
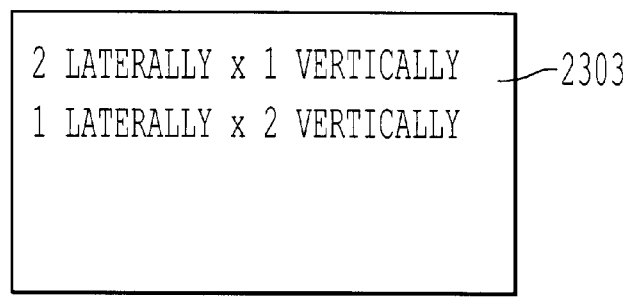
FIGS. 25a–25c are illustrations showing an example of display on an arrangement switching part and variations of image arrangement in a joining work area of the image processing apparatus according to the fifth embodiment of the present invention during the operation of joining plural images.
Figure 25B:
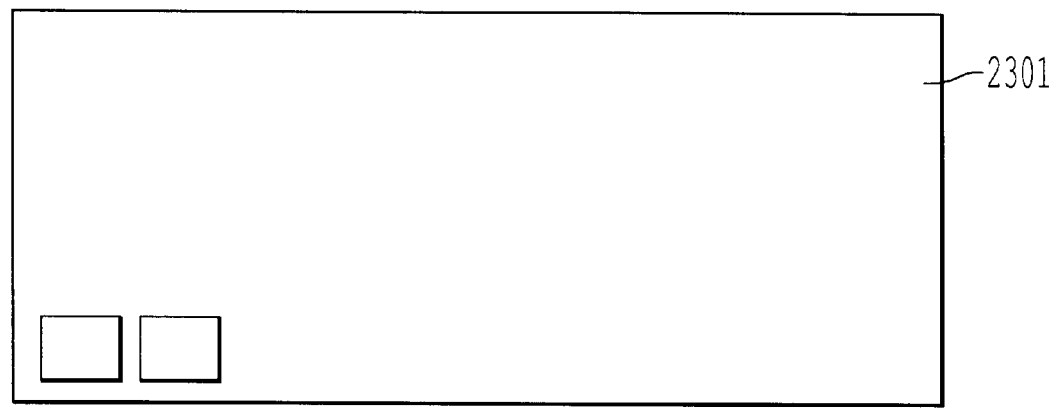
Figure 25C:
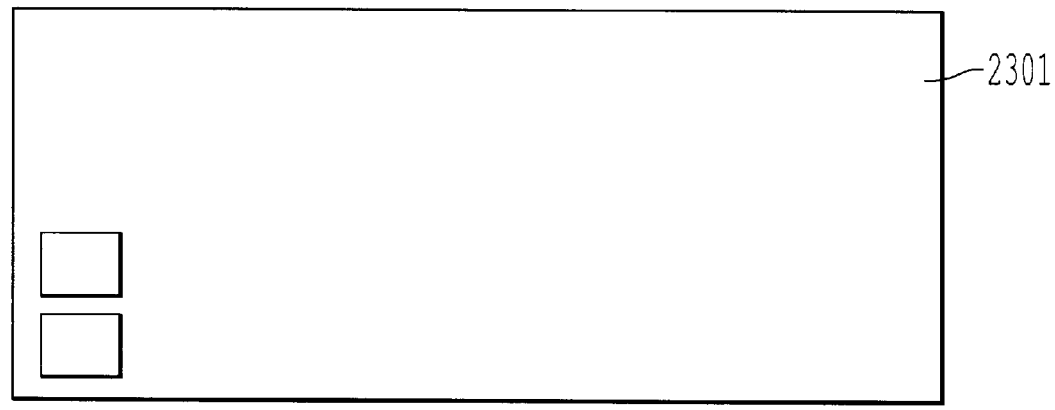

FIG. 25a shows displayed modes on the arrangement switching part 2303 when two images are specified. When two images are specified, there are two arrangement modes, a mode for arranging the two images laterally (2 laterally×1 vertically), and a mode for arranging the two images vertically (1 laterally×2 vertically). FIG. 25b shows an image arrangement in the joining work area 2301 when one arrangement alternative "2 laterally×1 vertically" is specified. FIG. 25c shows another image arrangement in the joining work area 2301 when the other arrangement alternative "1 laterally×2 vertically" is specified.

Figure 26A:
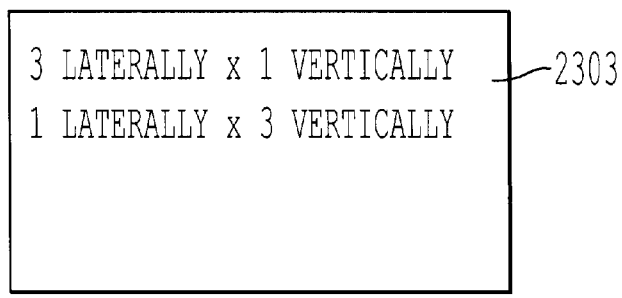
FIGS. 26a–26c are illustrations showing another example of display on the arrangement switching part and variations of image arrangement in the joining work area of the image processing apparatus according to the fifth embodiment of the present invention during the operation of joining plural images.
Figure 26B:
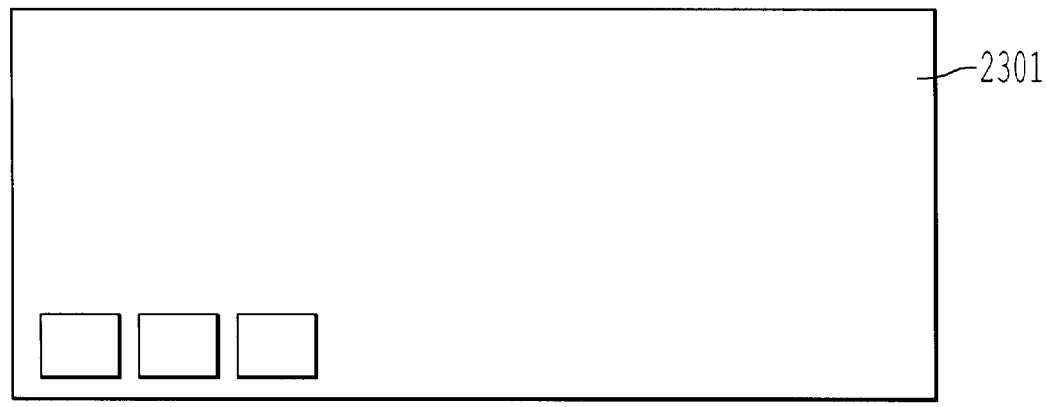
Figure 26C:
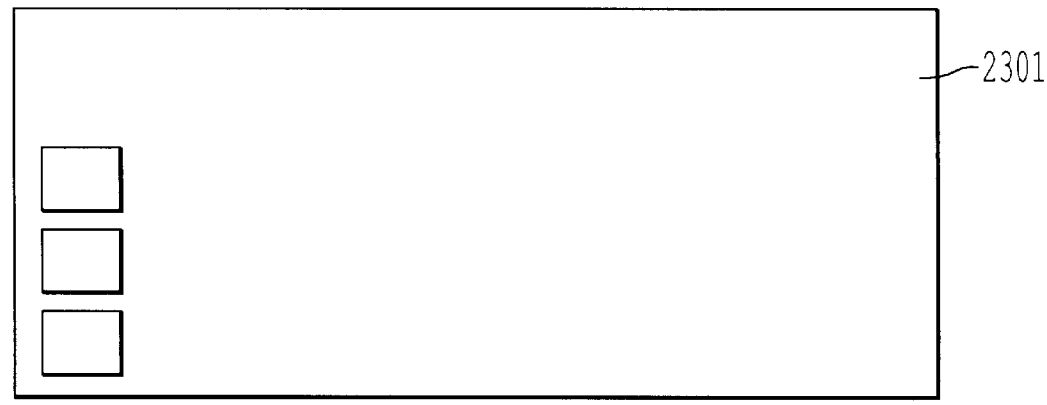
Figure 27A:
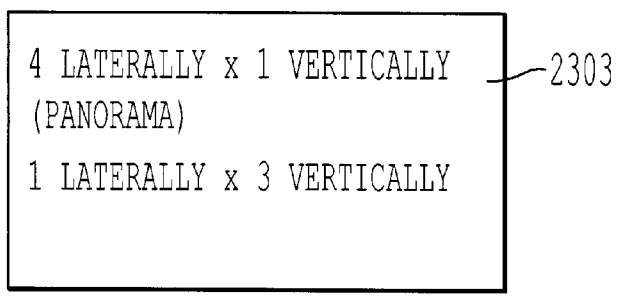
FIGS. 27a–27c are illustrations showing still another example of display on the arrangement switching part and variations of image arrangement in the joining work area of the image processing apparatus according to the fifth embodiment of the present invention during the operation of joining plural images.
Figure 27B:
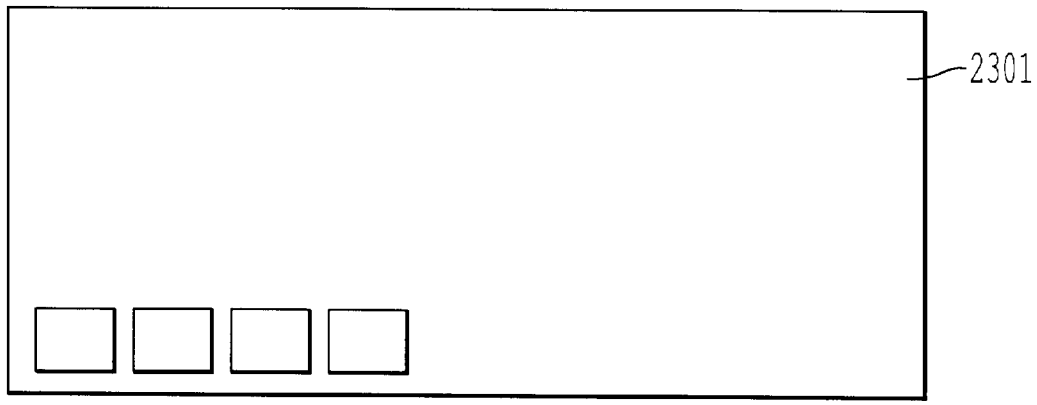
Figure 27C:
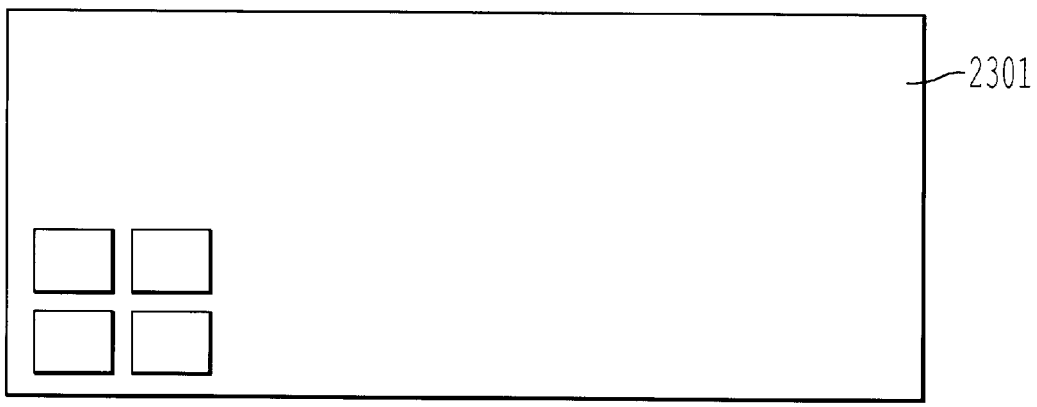
Figure 28A:
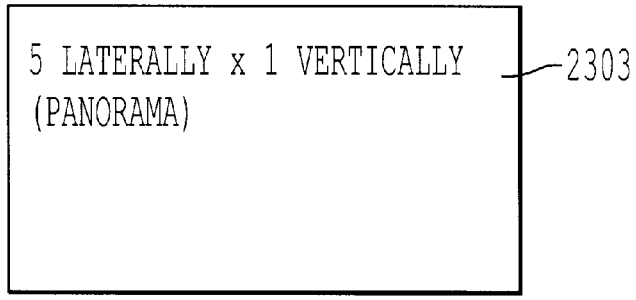
FIGS. 28a–28b are illustrations showing yet another example of display on the arrangement switching part and variations of image arrangement in the joining work area of the image processing apparatus according to the fifth embodiment of the present invention during the operation of joining plural images.
Figure 28B:
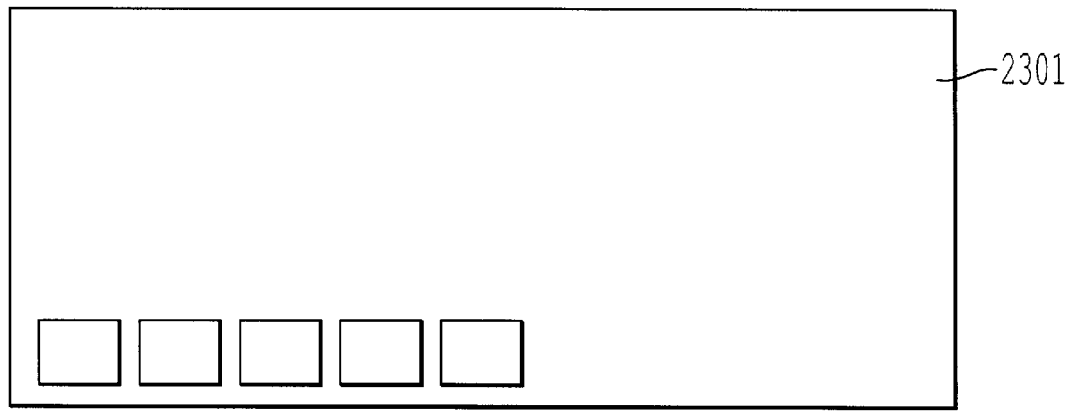
Figure 29A:
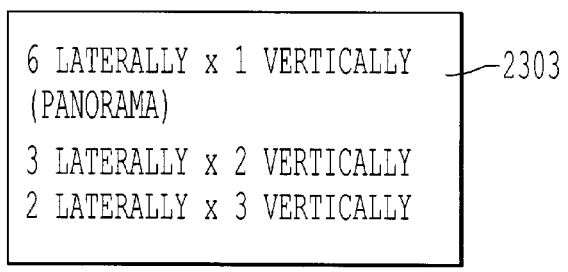
FIGS. 29a–29d are illustrations showing yet another example of display on the arrangement switching part and variations of image arrangement in the joining work area of the image processing apparatus according to the fifth embodiment of the present invention during the operation of joining plural images.
Figure 29B:
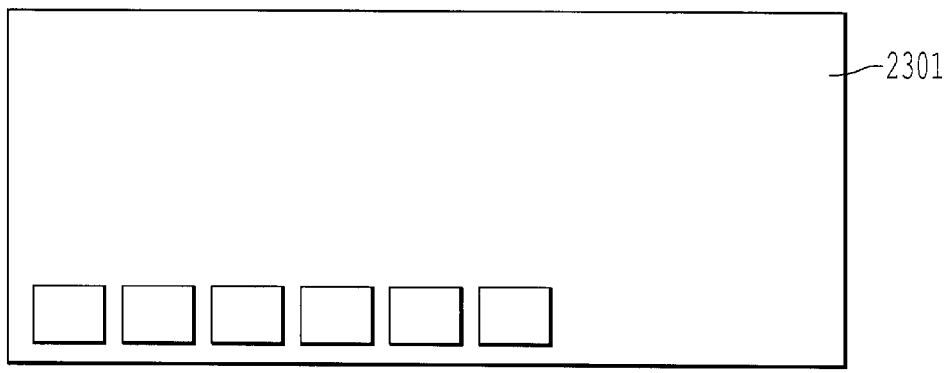
Figure 29C:
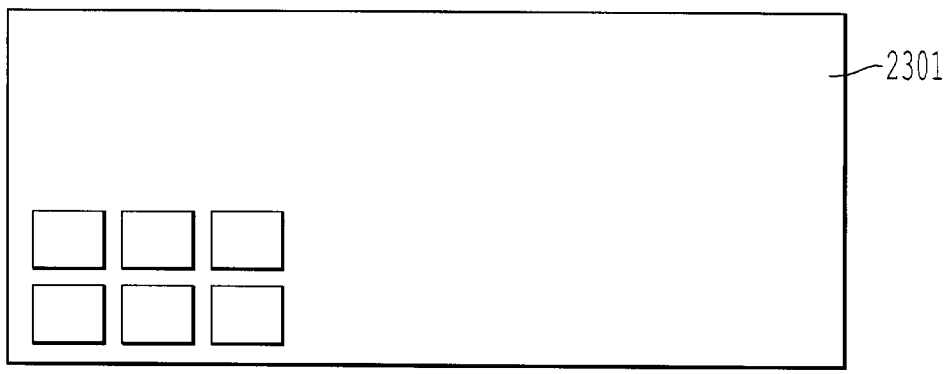
Figure 29D:
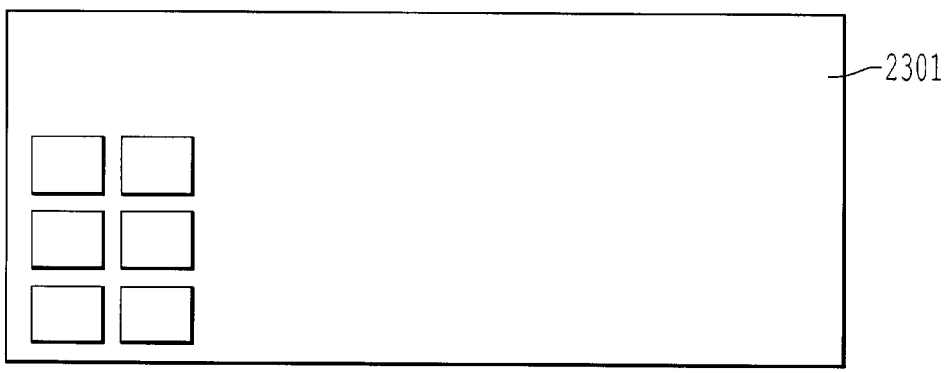
Figure 30A:
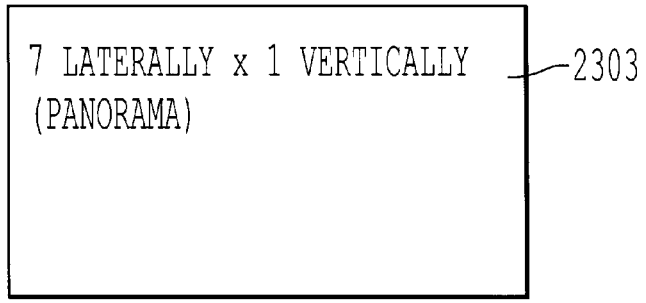
FIGS. 30a–30b are illustrations showing yet another example of display on the arrangement switching part and variations of image arrangement in the joining work area of the image processing apparatus according to the fifth embodiment of the present invention during the operation of joining plural images.
Figure 30B:
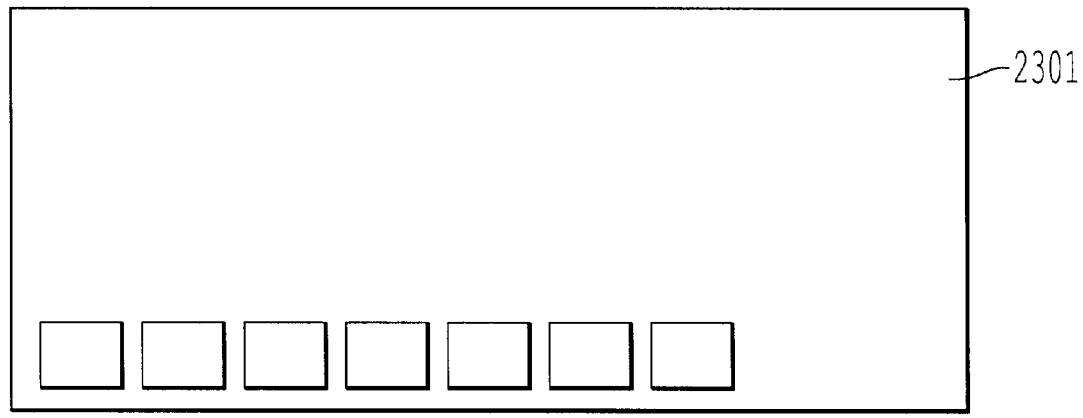
Figure 31A:
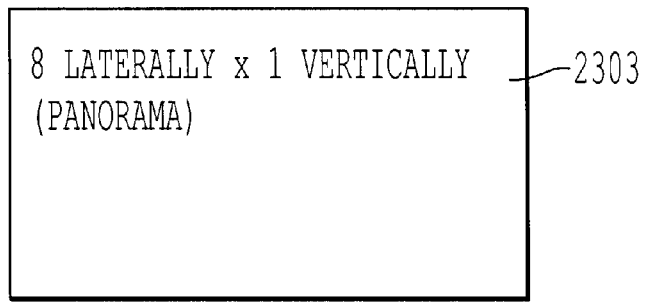
FIGS. 31a–31b are illustrations showing yet another example of display on the arrangement switching part and variations of image arrangement in the joining work area of the image processing apparatus according to the fifth embodiment of the present invention during the operation of joining plural images.
Figure 31B:
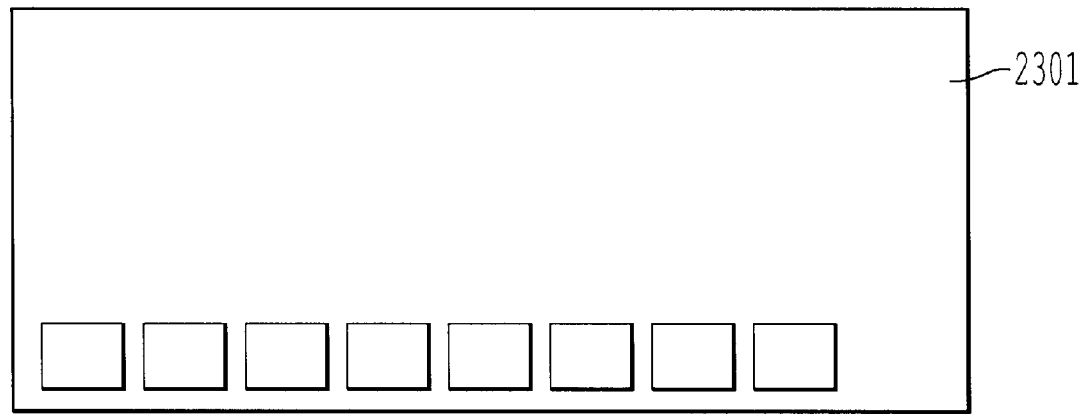
Figure 32A:
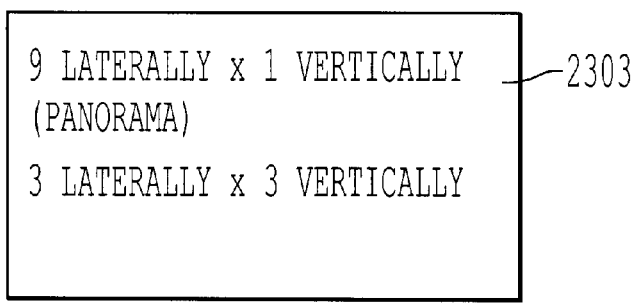
FIGS. 32a–32c are illustrations showing yet another example of display on the arrangement switching part and variations of image arrangement in the joining work area of the image processing apparatus according to the fifth embodiment of the present invention during the operation of joining plural images.
Figure 32B:
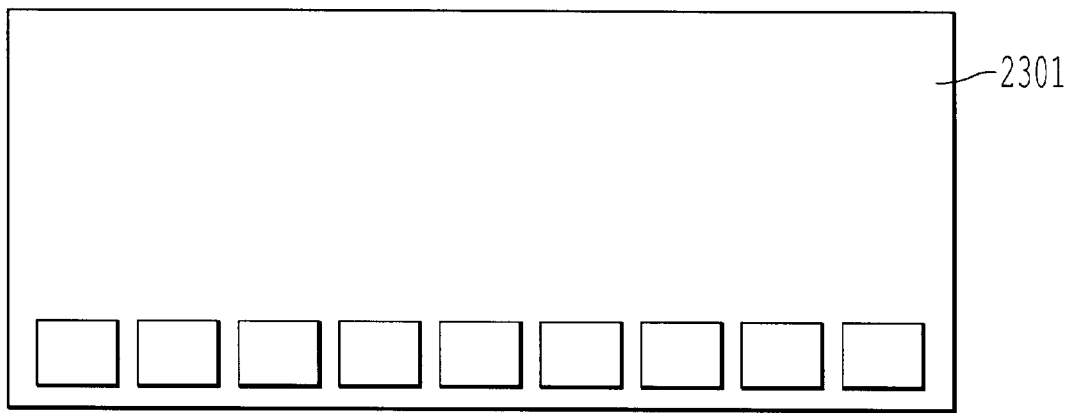
Figure 32C:
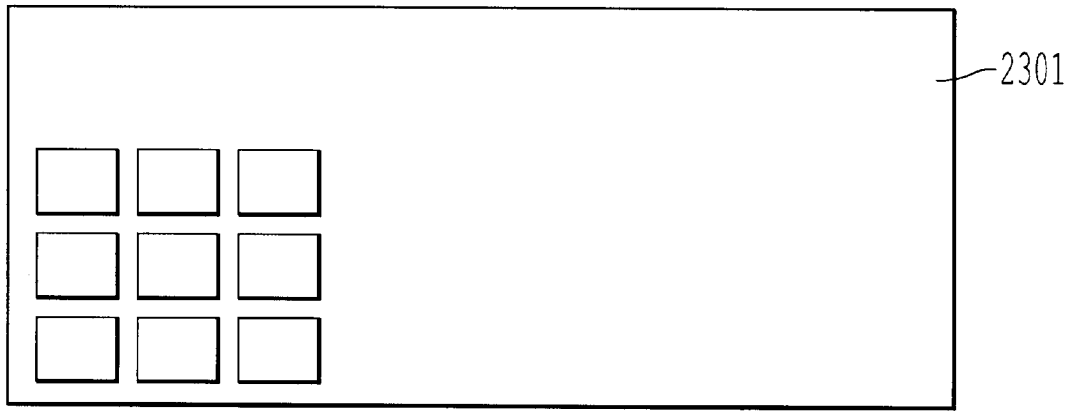

FIG. 26 shows a case where three images are specified, FIG. 27 shows a case where four images are specified, FIG. 28 shows a case where five images are specified, FIG. 29 shows a case where six images are specified, FIG. 30 shows a case where seven images are specified, FIG. 31 shows a case where eight images are specified and FIG. 32 shows a case where nine images are specified.

For landscape type images in FIGS. 27a to 32a, the word "panorama" is specially added so that the operator can see it at a glance. Further, since in the embodiment the image arrangement is decided based on the case where a maximum of three images can be arranged both in the vertical direction and in the lateral direction, arrangement alternatives for arranging four or more images in the vertical direction or in the lateral direction are not displayed except in respective cases of panorama. For example, when eight images are specified, arrangement alternatives "4 laterally×2 vertically" and "2 laterally×4 vertically" are not displayed in FIG. 31a. Such arrangement alternatives, however, may be displayed as required.

Figure 33:
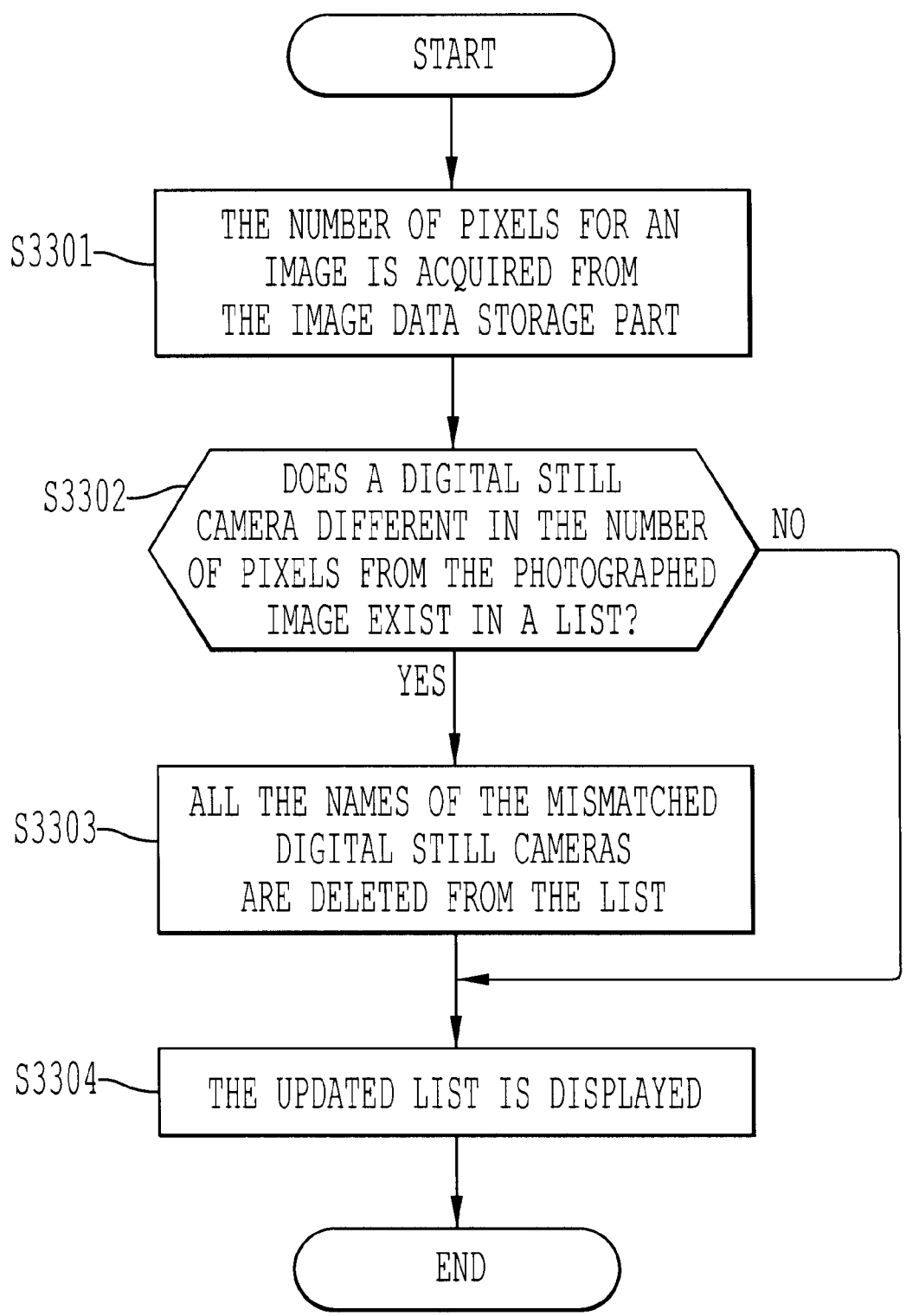
FIG. 33 is a flowchart showing processing steps of switching the camera mode in the image processing apparatus according to the fifth embodiment of the present invention during the operation of joining plural images.

Next, camera switching processing executed by the camera switching part 2305 is described. FIG. 33 is a flowchart showing processing steps of switching the camera mode in the image processing apparatus according to the fifth embodiment. In the flowchart of FIG. 33, the number of pixels for an image is first acquired from the image data storage part 104 (step S3301). It is then determined, from the acquired information on the number of pixels, whether a digital still camera or cameras different in the number of pixels from the photographed image exist in a list or not (step S3302).

If any mismatched digital still cameras do not exist in step S3302 (step S3302 is negative), the procedure shifts to step S3304 in which all the digital still cameras previously registered in the list of digital still cameras are displayed. On the other hand, if a mismatched digital still camera or cameras exist (step S3302 is affirmative), all the names of the mismatched digital still cameras are deleted from the list (step S3303), and the updated list in which all the mismatched camera names have been deleted is displayed (step S3304).

As discussed above, according to the fifth embodiment, when the operator wants to take a picture of a landscape type scene, he or she has only to photograph plural images while changing the position of the digital still camera slightly in the lateral direction so that the plural images can be joined together to form a panorama image.

Further, since proper arrangement alternatives are displayed based on the number of photographed images, the image arrangement can be performed efficiently. Furthermore, since the number of pixels for an image photographed is acquired and only the digital still cameras capable of photographing an image corresponding to the number of pixels are displayed, erroneous selection of a digital still camera different from the digital still camera used for photographing the corresponding image can be avoided.

Herein below, description will be made to image editing related to correction of image distortion realized by the present invention. Since the general structure of the illustrated-document creating system including the image processing apparatus and the hardware configuration of the image processing apparatus 100 for correcting image distortion are substantially the same as those used in the above-described embodiments for joining plural images together to form an image picture, description thereof is omitted here. Further, since parts in the image processing apparatus 100 other than the image altering part 304 and the display control part 307 are substantially the same as those used in the above-described embodiments for joining plural images together to form an image picture, description thereof is omitted as well.

Sixth Embodiment

Figure 34:
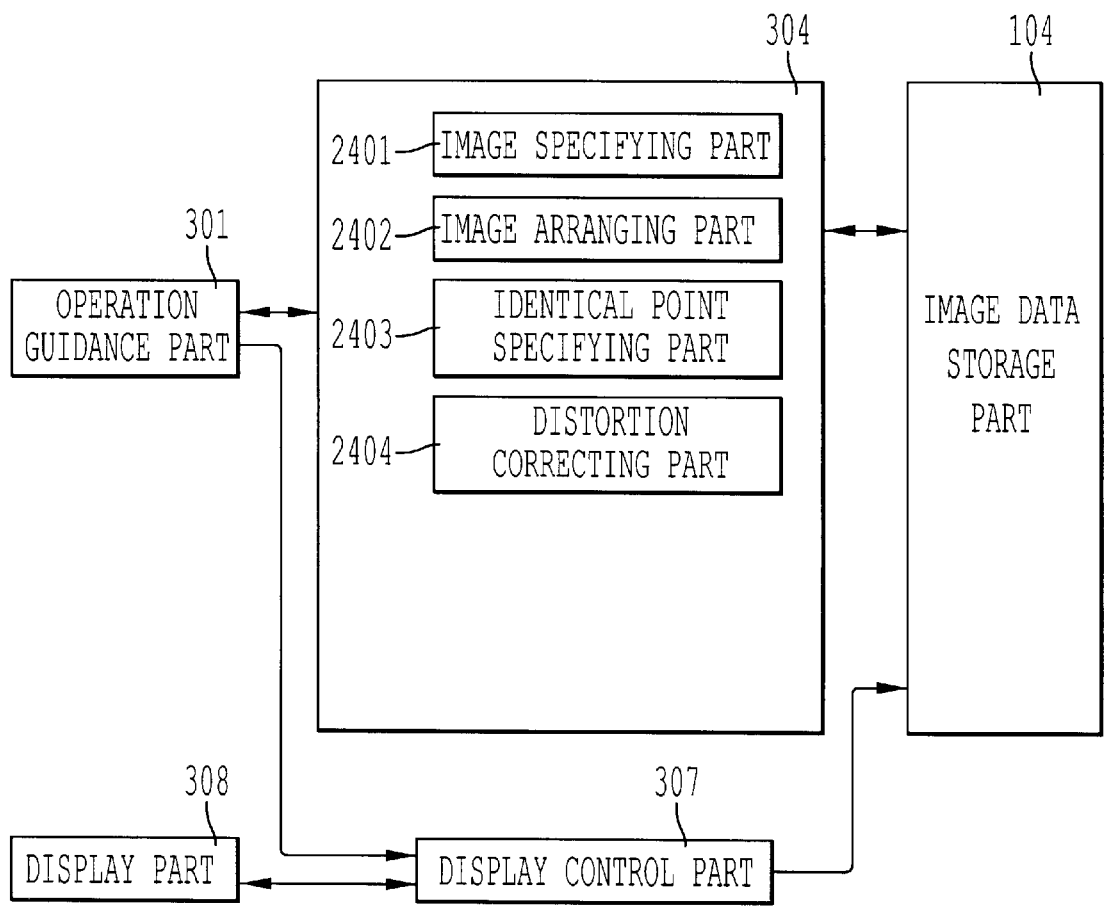
FIG. 34 is a functional block diagram showing the arrangement of an image altering part and the surroundings in an image processing apparatus according to the sixth embodiment of the present invention during the operation of correcting distortion of images.

First, the arrangements of the image altering part 304 and the display control part 307 are described in more detail. FIG. 34 is a functional block diagram showing the arrangements of the image altering part 304, the display control part 307 and the surroundings in the image processing apparatus according to the present invention for correcting image distortion. As shown in FIG. 34, the image altering part 304 includes an image specifying part 2401, an image arranging part 2402, an identical point specifying part 2403 and a distortion correcting part 2404.

At least two images, which are photographed by slightly changing the photographing position and for which the operator desires to correct distortion, are specified by the image specifying part 2401. The image specifying part 2401 specifies images, for which the operator desires to correct distortion, in accordance with an operating instruction from the operation guidance part 301.

The image arranging part 2402 arranges the images specified by the image specifying part 2401. At least two images photographed by slightly changing the photographing position are arranged vertically or laterally so that the identical point specifying part 2403 can easily specify an identical point on adjacent images.

The identical point specifying part 2403 specifies any one identical point for each image displayed on the display screen of the display part 308 under control of the display control part 307. The identical point specifying part 2403 specifies, in accordance with an operating instruction from the operation guidance part 301, an identical point the operator desires to specify.

The processing contents of the image specifying part 2401, the image arranging part 2402 and the identical point specifying part 2403 will be described later.

The distortion correcting part 2404 corrects distortion of an image by referring to the identical point specified by the identical position specifying part 2403. Images photographed by an image pick-up device such as a digital still camera or video camera may include geometrical distortion due to image formation in a position deviated from the original position of the image under the influence of so-called distortion aberration of the lens system. To correct image distortion, a method such as, for example, one described in Japanese patent application laid-open publication No. 9-294225 (Japanese patent application No. 8-2732949) of the same applicant, can be used.

The method is characterized in that plural images including an identical point picked up from one point are used to detect plural sets of corresponding observing points from these images and measure angles of the observation points with respect to an optical axis of the image pick-up system, thus estimating a parameter for correcting distortion of the images based on the angle information obtained.

A file name is assigned to the image of which the distortion has been corrected by the distortion correcting part 2404 and the image is stored into the image data storage part 104 based on the file name.

The image specifying part 2401, the image arranging part 2402, the identical point specifying part 2403 and the distortion correcting part 2404 are embodied, respectively, by the CPU 201 or the like executing command processing according to commands written in programs such as an OS and an application program recorded on recording media such as the ROM 202, the RAM 203, the hard disk 205 or the floppy disk 207.

Figure 36:
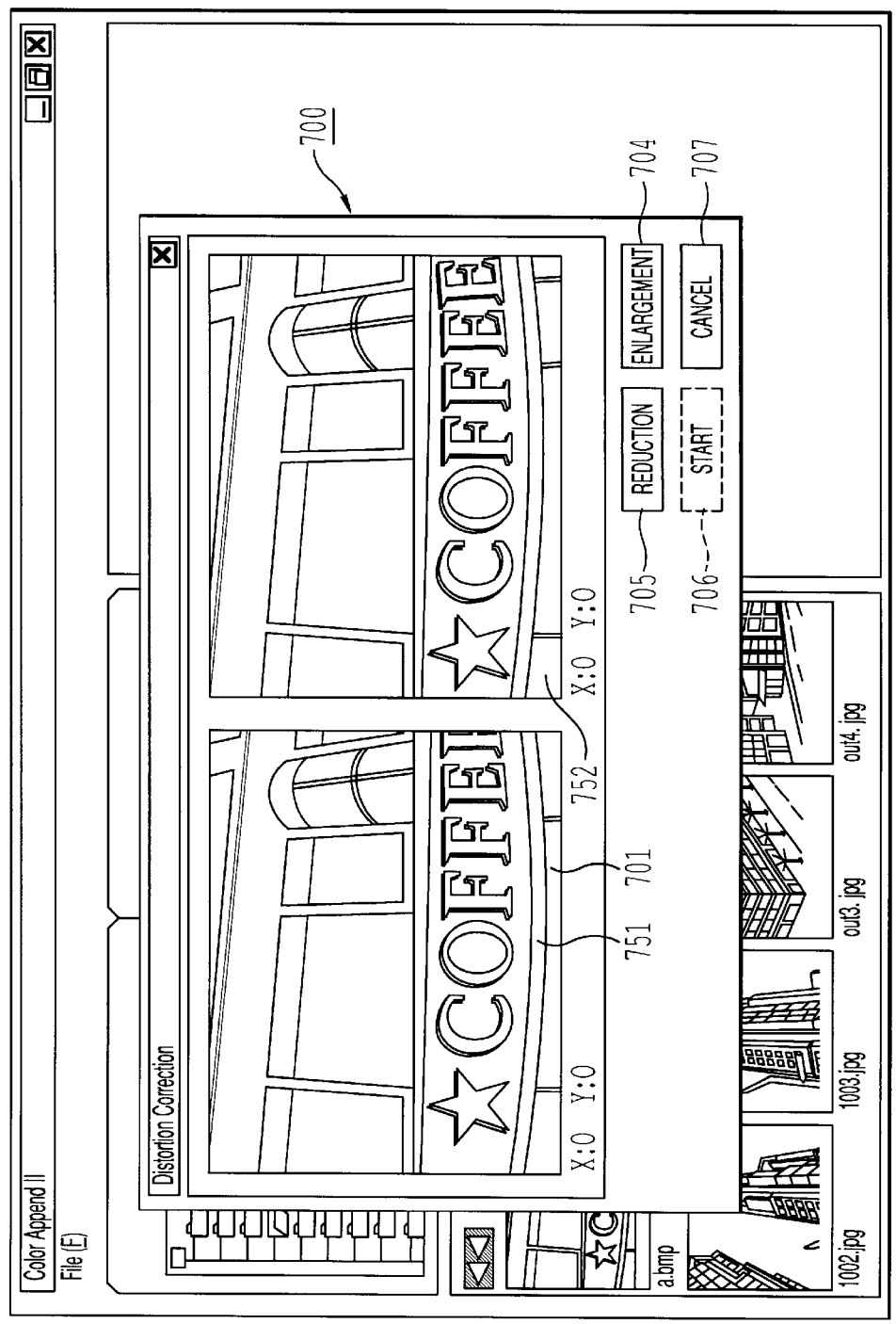
FIG. 36 is an illustration showing another example of the display screen on the display part of the image processing apparatus according to the sixth embodiment of the present invention during the operation of correcting distortion of images.

The display control part 307 controls the display part 308 to display, as illustrated in FIG. 36, a distortion correcting window 700 and images, specified by the image specifying part 2401 and arranged by the image arranging part 2402, in a distortion correcting work area 701 of the distortion correcting window 700.

The display contents of the display part 308 is substantially the same as the case where plural images are joined together to form an image picture and therefore detailed description thereof is omitted.

Figure 35:
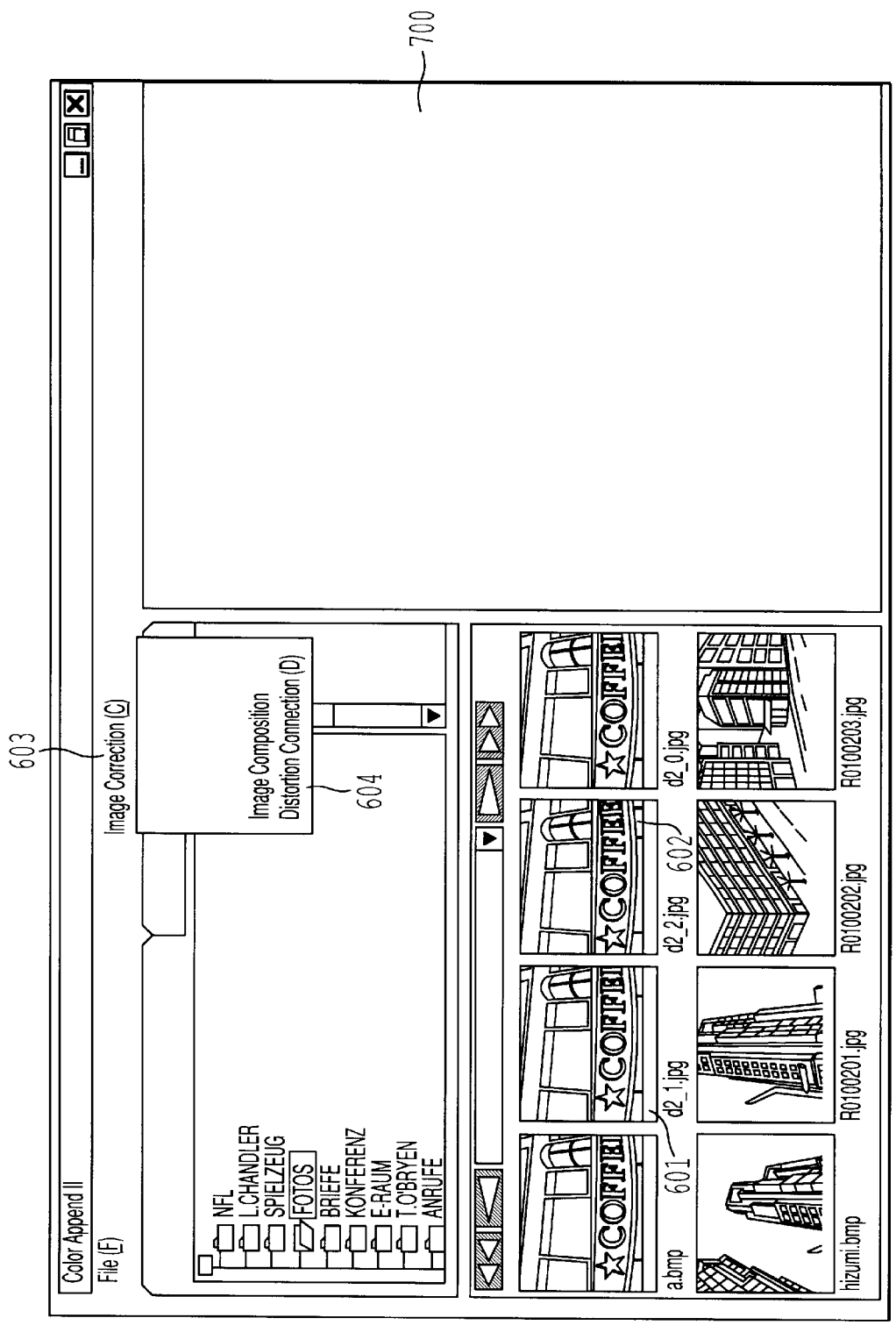
FIG. 35 is an illustration showing an example of a display screen on a display part of the image processing apparatus according to the sixth embodiment of the present invention during the operation of correcting distortion of images.

Referring to FIG. 35, as with the description with respect to FIG. 5 of the first embodiment in which plural images arc joined together to form an image picture, two images are specified from corresponding reduced images or thumbnails in the reduced image display area 502. The method to specify the images is the same as that shown in the first embodiment in which plural images are joined together to form an image picture.

In FIG. 35, two reduced images or thumbnails 601 and 602 are specified as images of which the distortion is to be corrected. The reduced images specified are discriminated from the other images by inversely (negatively) displaying the file names, or enclosing the reduced images with a bold frame, so that the operator can recognize the reduced images specified.

After completion of specifying the reduced images, the operator moves the cursor to an "image correction" menu 603 on the menu bar in FIG. 35, clicks the button of the mouse 212 or the like, and further clicks an "distortion correction" menu 604 displayed as one of pull-down menus to select the distortion correcting function. Thus, the distortion correcting window 700 is popped up and displayed as shown in FIG. 36.

Next, the processing contents of the image arranging part 402 are described. FIG. 36 is an illustration showing another example of the display screen on the display part 308 according to the sixth embodiment. The distortion correcting window 700 includes the distortion correcting work area 701, the scale-up button 704, the scale-down button 705, the start button 706 and the cancel button 707.

Images specified by the image specifying part 2401 are displayed in the distortion correcting work area 701. In FIG. 36, images 751 and 752 identical to the reduced images 601 and 602 specified in FIG. 35 are displayed at a predetermined magnification rate. As apparent from FIG. 36, the billboard for a coffee shop is distorted so as to have reduced magnification in a direction to away from the center of the image. This distortion becomes noticeable in regions close to vertical or lateral edges.

Since the scale-up button 704 and the scale-down button 705 perform substantially the same functions, respectively, as described in the embodiments for joining plural images together to form an image picture, description thereof is omitted here.

The start button 706 instructs the start of correction of image distortion. In the state illustrated in FIG. 36, since joining points have not been specified yet, the start button 706 is grayed out. and pressing the start button 706 is inhibited.

The cancel button 707 instructs cancellation of the distortion correction processing. If the cancel button 707 is pressed, the distortion correction processing currently being performed is stopped, and the distortion correcting window 2300 is closed.

Figure 37:
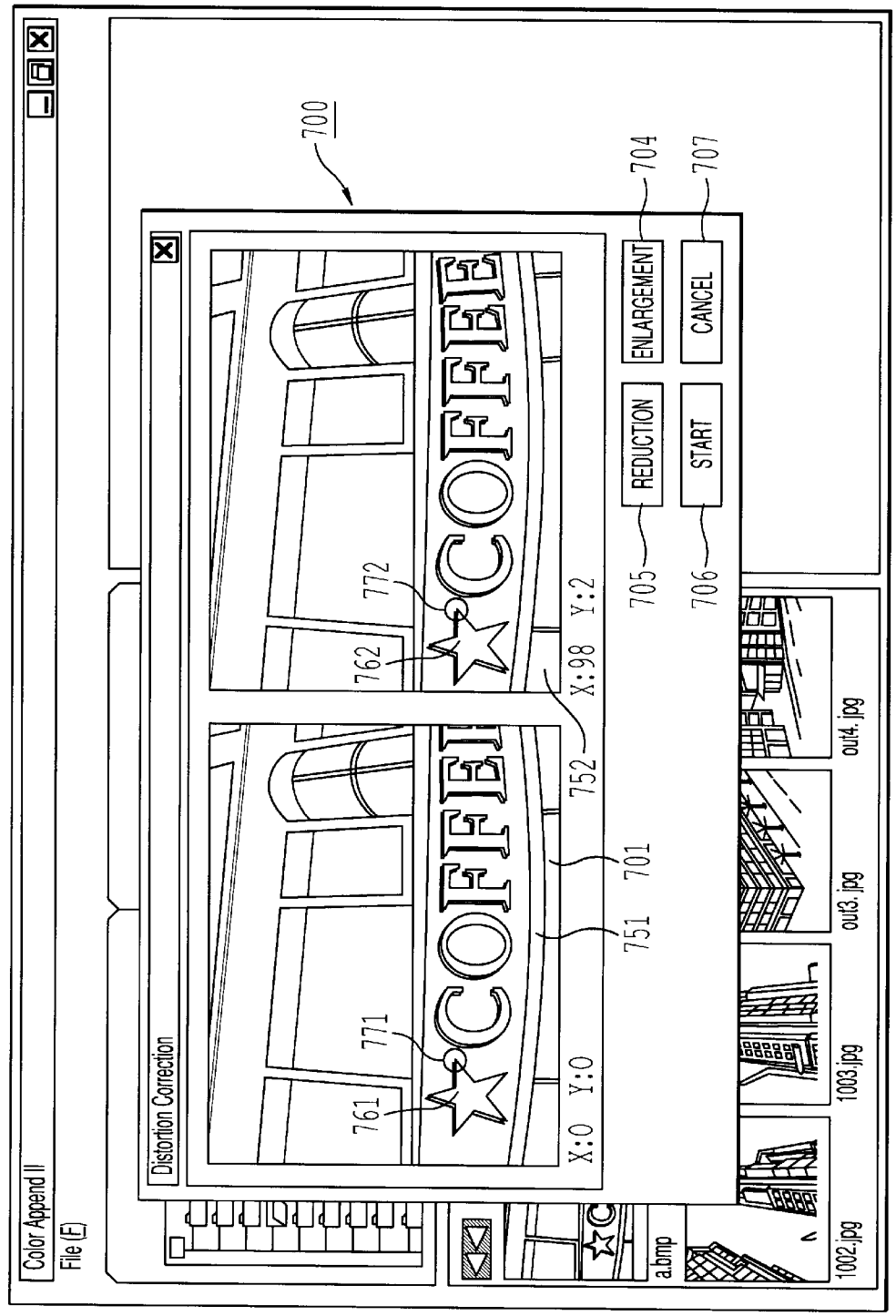
FIG. 37 is an illustration showing still another example of the display screen on the display part of the image processing apparatus according to the sixth embodiment of the present invention during the operation of correcting distortion of images.

Next, description is made to the processing contents of the identical point specifying part 2403. FIG. 37 is an illustration showing still another example of the display screen on the display part of the image processing apparatus according to the sixth embodiment.

In FIG. 37, adjacent images in the distortion correcting work area 701 are compared to specify, with the pointing device such as the mouse 212, an identical point appearing in each of the adjacent images, i.e., a characteristic point in a common image pattern appearing oil both images. To specify the characteristic identical point accurately on each image, the images should be enlarged to a certain extent as shown in FIG. 37.

Specifically, the star-shape symbol marks 761 and 762, located on the left hand of the billboard for the coffee shop appearing on both images 751 and 752, are suitable as characteristic identical points to be specified. Then, joining points are specified by moving the cursor, for example, to respective tips 771 and 772 of the star-shape symbol marks 761 and 762, and clicking the button of the mouse 212 or the like. Coordinate data indicative of the joining points specified are stored in a storage provided inside the joining point specifying part 2403.

After completion of specifying the identical points. the operator presses the start button 706 to start execution to the distortion correction processing. A window, though not shown here, is opened with a message indicating "Distortion correction processing is completed". When an "OK" button in the window is clicked, the distortion correction processing is ended.

Figure 38:
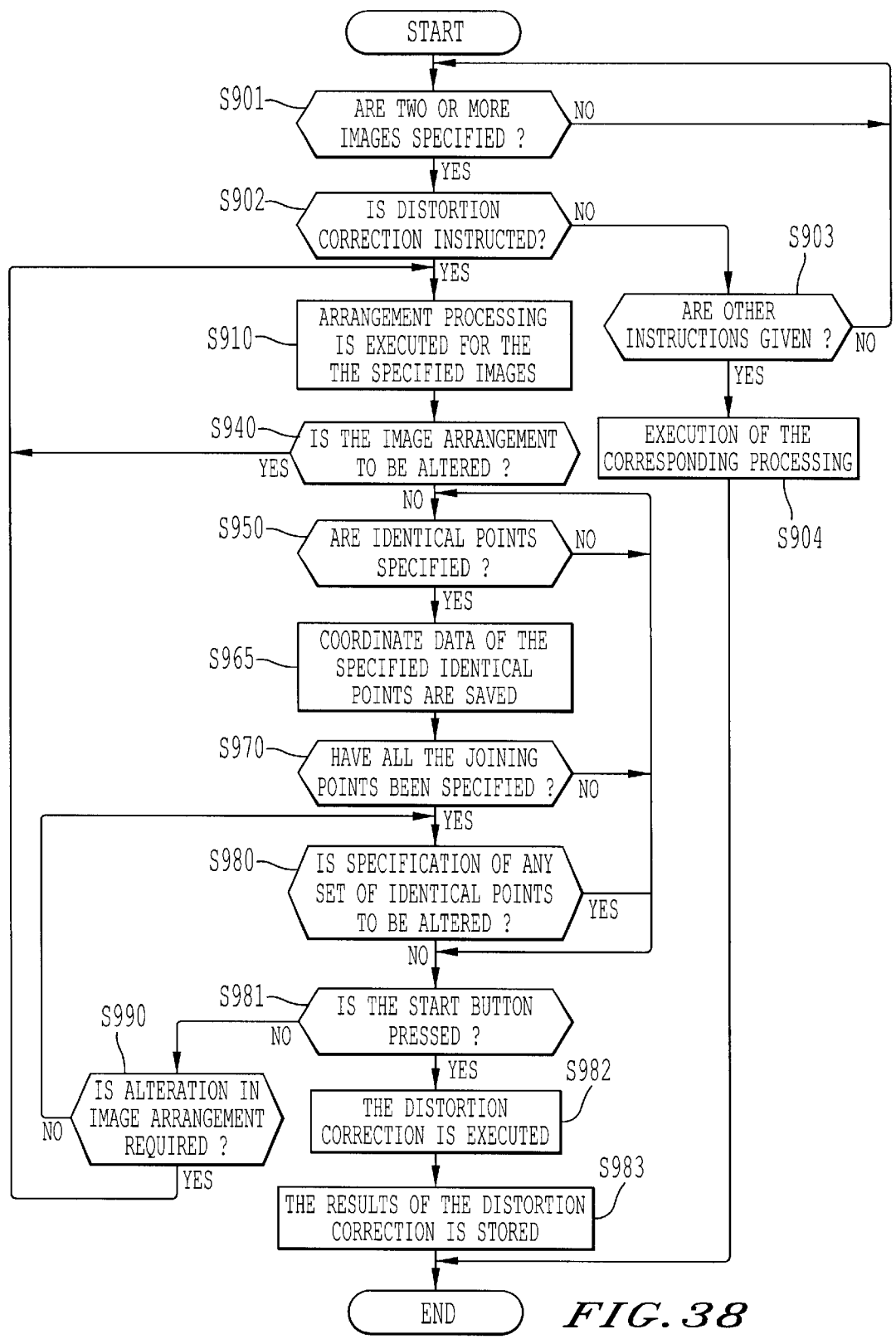
FIG. 38 is a flowchart showing a sequence of processing steps executed by the image altering part and a display control part of the image processing apparatus according to the sixth embodiment of the present invention during the operation of correcting distortion of images.

Next, description is made to a sequence of processing steps executed by the image altering part 304 and the display control part 307 according to the sixth embodiment. FIG. 38 is a flowchart showing a sequence of processing steps executed by the image altering part 304 and the display control part 307 of the image processing apparatus 100 according to the sixth embodiment. In the flowchart of FIG. 38, it is first determined whether two or more images are specified or not (step S901). The operation remains in step S901 until two or more images are specified (until step S901 becomes affirmative), and it is then determined whether distortion correction is instructed or not (step S902).

If distortion correction is not instructed in step S902 (step S902 is negative), it is determined whether other instructions such as deletion of images are given or not (step S903). If no other instruction is given here (step S903 is negative), the procedure returns to step S901, and the subsequent processing steps are repeated. If any other instruction is given in step S903 (step S903 is affirmative), this operation is ended after execution of the corresponding processing (step S904).

If distortion correction is instructed in step S902 (step S902 is affirmative), arrangement processing is executed for the specified images (step S910). The image arrangement procedures will be described in detail later.

It is next determined whether the image arrangement is to be altered or not (step S940). If alteration in arrangement is required (step S940 is affirmative), the procedure returns to step S910 in which the images are rearranged. If alteration is not required in step S940 (step S940 is negative), it is determined whether identical points are specified or not (step S950). If any set of identical points is specified (step S950 is affirmative), coordinate data of the identical points specified are saved (step S965). The processing steps S950 through S970 are repeated until all the identical points are specified. When all the identical points have been specified (step S970 is affirmative), it is further determined whether specification of any set of identical points is to be altered or not (step S980).

If determination is made in step S980 that a specification of any set of identical points is to be altered (step S980 is affirmative), the procedure returns to step S950. On the other hand, if determination is not made in step S980 that specification of any set of identical points is to be altered (step S1980 is negative), it is determined whether the start button is pressed or not (step S981). If the start button is pressed (step S981 is affirmative), the distortion correction is executed (step S982), and the results of the distortion correction is stored (step S983) to end all the processing.

Figure 39:
FIG. 39 is an illustration showing a resulting image for which distortion correction has been performed in the image processing apparatus according to the sixth embodiment of the present invention during the operation of correcting distortion of images.

FIG. 39 shows a resulting image for which the distortion correction has been executed. As apparent from FIG. 39, execution of the distortion correction results in correction of the distortion appearing on the lower side of the billboard for the coffee shop.

If the start button is not pressed in step S981 (step 981 is negative), it is determined whether alteration in image arrangement is required or not (step S990). If alteration in image arrangement is required (step S990 is affirmative), the procedure returns to step S910 and the subsequent processing steps are repeated. On the other hand, if alteration in image arrangement is not required (step S990 is negative), the procedure returns to step S980 in which determination is made as to whether any set of identical points should be altered or not. After that, the subsequent processing steps are repeated.

Figure 40:
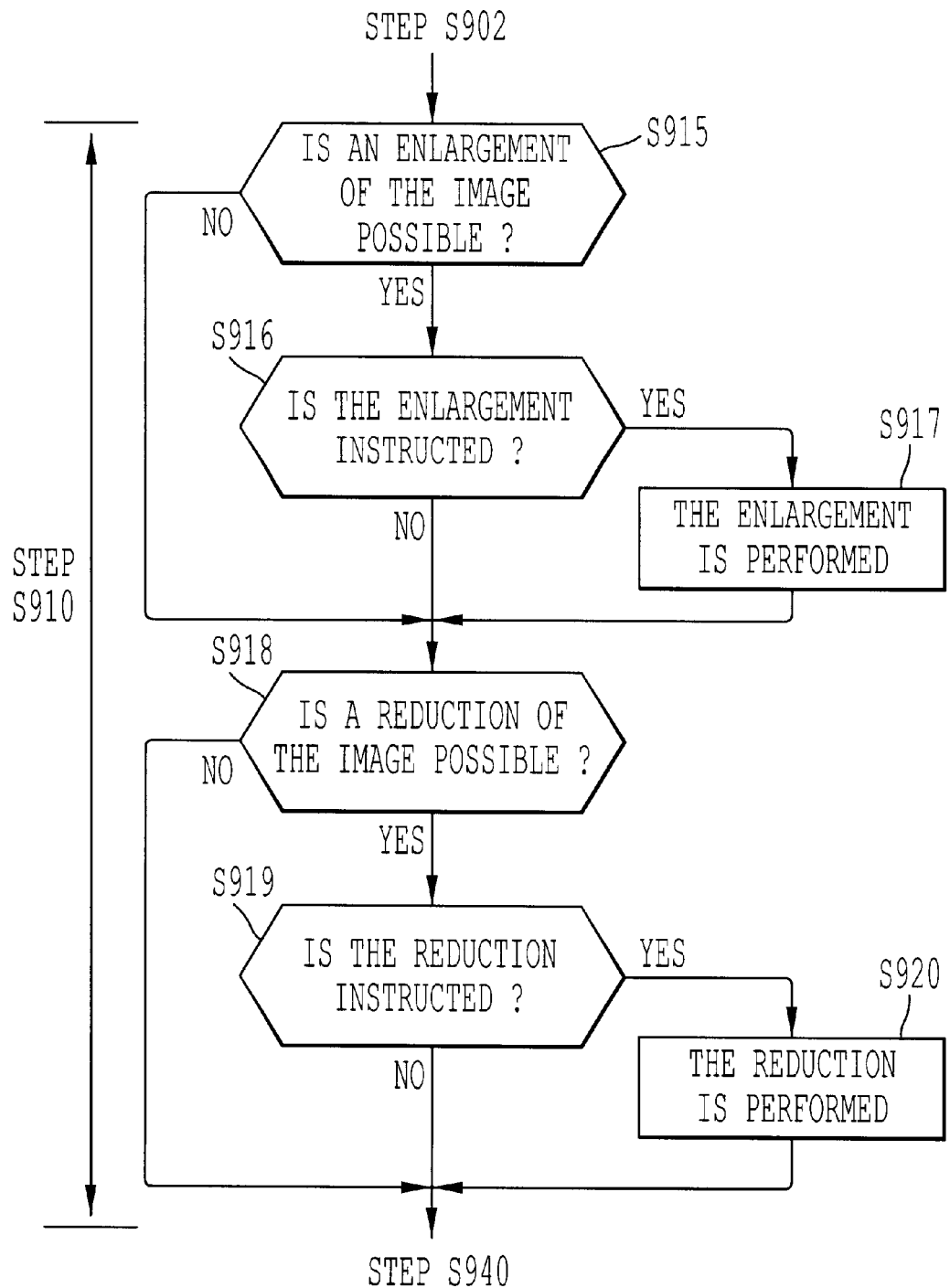
FIG. 40 is a flowchart showing processing steps executed by an image arranging part of the image processing apparatus according to the sixth embodiment of the present invention during the operation of correcting distortion of images.

Next, the image arrangement processing executed at step S910 is described in detail. FIG. 40 is a flowchart showing processing steps executed by the image arranging pail 2402 of the image processing apparatus 100 according to the sixth embodiment. If distortion correction is instructed in step S902 of the flowchart of FIG. 38 (step S902 is affirmative), determination is made in the flowchart of FIG. 40 as to whether an enlargement of the images is possible or not (step S915). If possible (step S915 is affirmative), determination is made as to whether the enlargement is instructed or not (step S916). If instructed (step S916 is affirmative), the enlargement is performed (step S917). On the other hand, if it is not possible to enlarge the images (step S915 is negative), or if the enlargement is not instructed (step S916 is negative), the procedure goes to the next step without execution of any processing.

It is next determined whether a reduction of the images is possible or not (step S918). If possible (step S918 is affirmative), determination is made as to whether the reduction is instructed or not (step S919). If instructed (step S919 is affirmative), the reduction is performed (step S920). On the other hand, if it is not possible to reduce the images (step S918 is negative), or if the reduction is not instructed (step S919 is negative), the procedure goes to the next step, i.e., step 940, without execution of any processing.

As discussed above, according to the six embodiment of the present invention, when correction of image distortion is performed, specification and arrangement of images, and specification of identical points for adjacent images are easily done.

Seventh Embodiment

Although in the sixth embodiment an identical point in each image is specified by moving a cursor to the point and then clicking the button of the mouse 212 or the like, the identical point may be specified using a line, i.e., by specifying identical points on two or more adjacent images in a drag-and drop operation of the mouse 212 or the like, as discussed in the following seventh embodiment.

Since the general structure of the illustrated-document creating system including an image processing apparatus according to the seventh embodiment of the present invention, and the hardware configuration of the image processing apparatus 100 are substantially the same as those of the sixth embodiment, description thereof is omitted here. Further, since the image processing apparatus 100 includes substantially the same parts as those of the sixth embodiment except the image altering part 304 and the display control part 307, the parts common to those of the sixth embodiment are also not described here.

Figure 41:
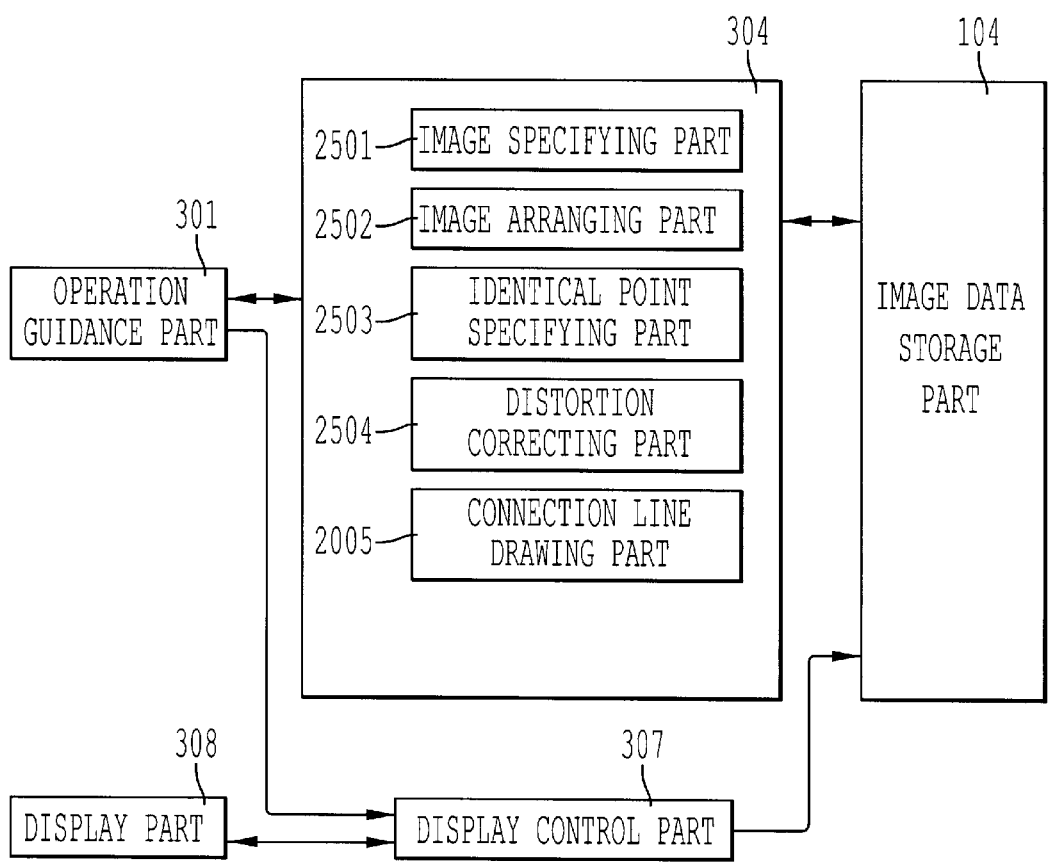
FIG. 41 is a functional block diagram showing the arrangement of an image altering part and the surroundings in an image processing apparatus according to the seventh embodiment of the present invention during the operation of correcting distortion of images.

Next, the image altering part 304 is described. FIG. 41 is a functional block diagram showing the arrangement of the image altering part 304 and the surroundings in the image processing apparatus 100 according to the seventh embodiment of the present invention. As shown in FIG. 41, the image altering part 304 includes an image specifying part 2501, an image arranging part 2502, an identical point specifying part 2503, a distortion correcting part 2504 and a connection line drawing part 2505. Since parts other than the identical point specifying part 2503 and the connection line drawing part 2505 are substantially the same as those of the sixth embodiment, description thereof is omitted.

The identical point specifying part 2503 has substantially the same structure as that of the identical point specifying part 2403 of the sixth embodiment, in which any one point is specified for each image so that images displayed on the display screen of the display part 308 under control of the display control part 307, can be joined by referring to the point, but differs from the identical point specifying part 2403 in method of specifying the point. The connection line drawing part 2505 draws a connection line between the locations specified by the identical point specifying part 2503. The processing contents of the identical point specifying part 2503 and the connection line drawing part 2505 will be described in detail later.

The image specifying part 2501, the image arranging part 2502, the identical point specifying part 2503, the distortion correcting part 2504 and the connection line drawing part 2505 are embodied, respectively, by the CPU 201 or the like executing command processing according to commands written in programs such as an OS and an application program recorded on recording media such as the ROM 202, the RAM 203, the hard disk 205 or the floppy disk 207.

Figure 42:
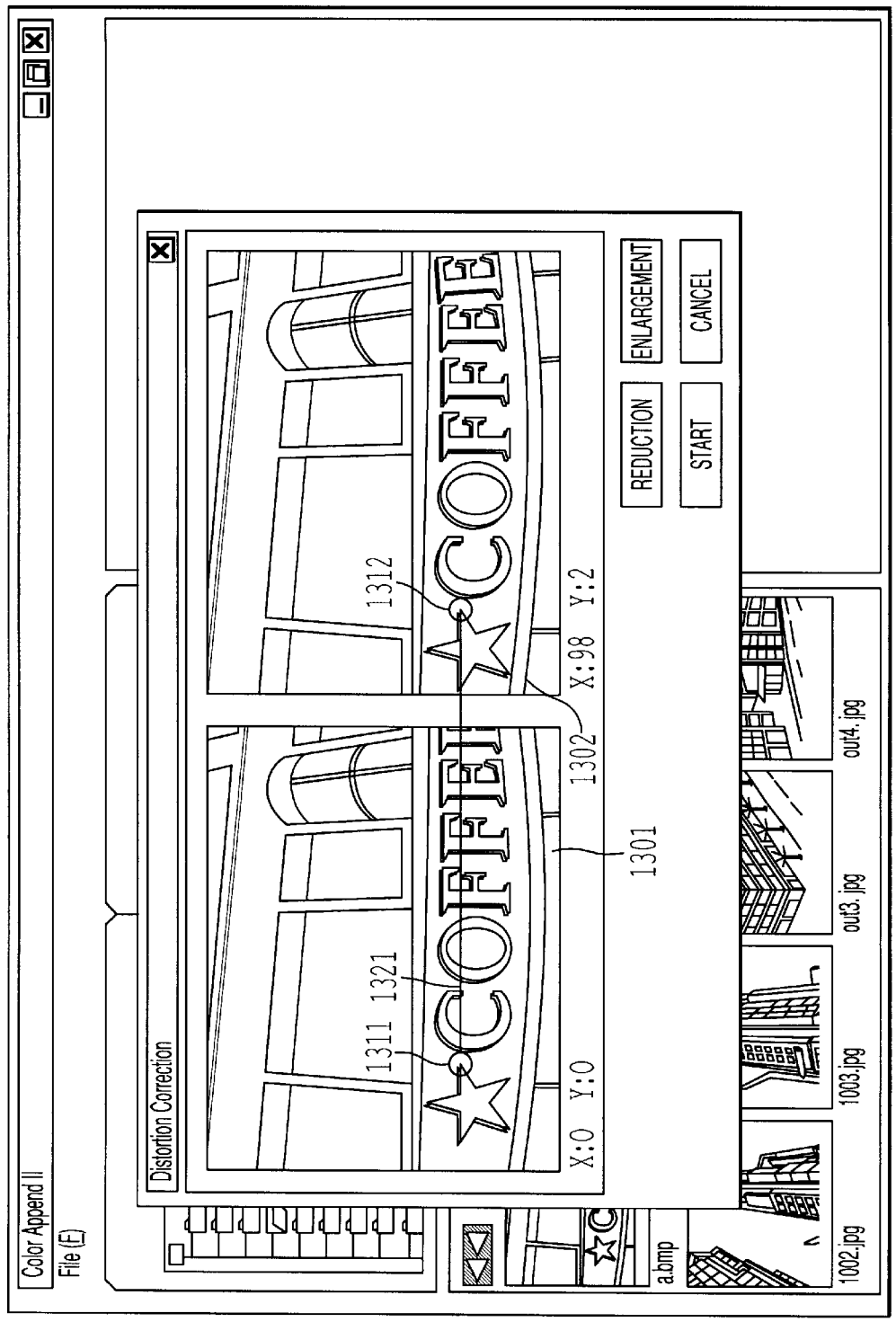
FIG. 42 is an illustration showing an example of a display screen on a display part of the image processing apparatus according to the seventh embodiment of the present invention during the operation of correcting distortion of images.

The display control part 307 controls the display part 308 to display not only images arranged by the arranging part 2502, but also a connection line 1321 drawn by the connection line drawing part 2505 as shown in FIG. 42.

Next, description is made to specification processing of identical points and drawing processing of a connection line executed by the identical point specifying part 2503 and the connection line drawing part 2505. FIG. 42 is an illustration showing an example of a display screen on the display part 308 of the image processing apparatus according to the seventh embodiment. In FIG. 42, images 1301 and 1302 are compared to specify a characteristic point in common image patterns appearing on both images. In the example illustrated in FIG. 42, the operator first moves the cursor to one point 1311 on the image 1301.

The operator then presses the button of the mouse 212 or the like. and moves (drags) the cursor to the other point 1312 on the image 1302 by moving the mouse 212 with maintaining pressed state of the button. The connection line drawing part 2505 is synchronized with the movement of the cursor to draw the connection line 1321 on the coordinates identical to the cursor path on the screen. When the cursor reaches the point 1312, the operator releases (drops) the pressed state of the button. The connection line 1321 drawn by the connection line drawing part 2505 is thus fixed.

The identical points are thus specified. Coordinate data of the identical points specified are saved (stored) in a storage provided inside the identical point specifying part 2503. After completion of the specification processing of identical points, the operator can press the start button to start execution of distortion correction processing.

Thus, the identical points can be specified by the simplest way in operation to move the cursor to a point in one image by operating the mouse or the like, press the button of the mouse or the like, move the cursor while pressing the button to a corresponding position in the another image, and then release the pressed button. The connection line 1321 is preferably drawn by a method such as one described in the second embodiment for joining plural images.

Figure 43:
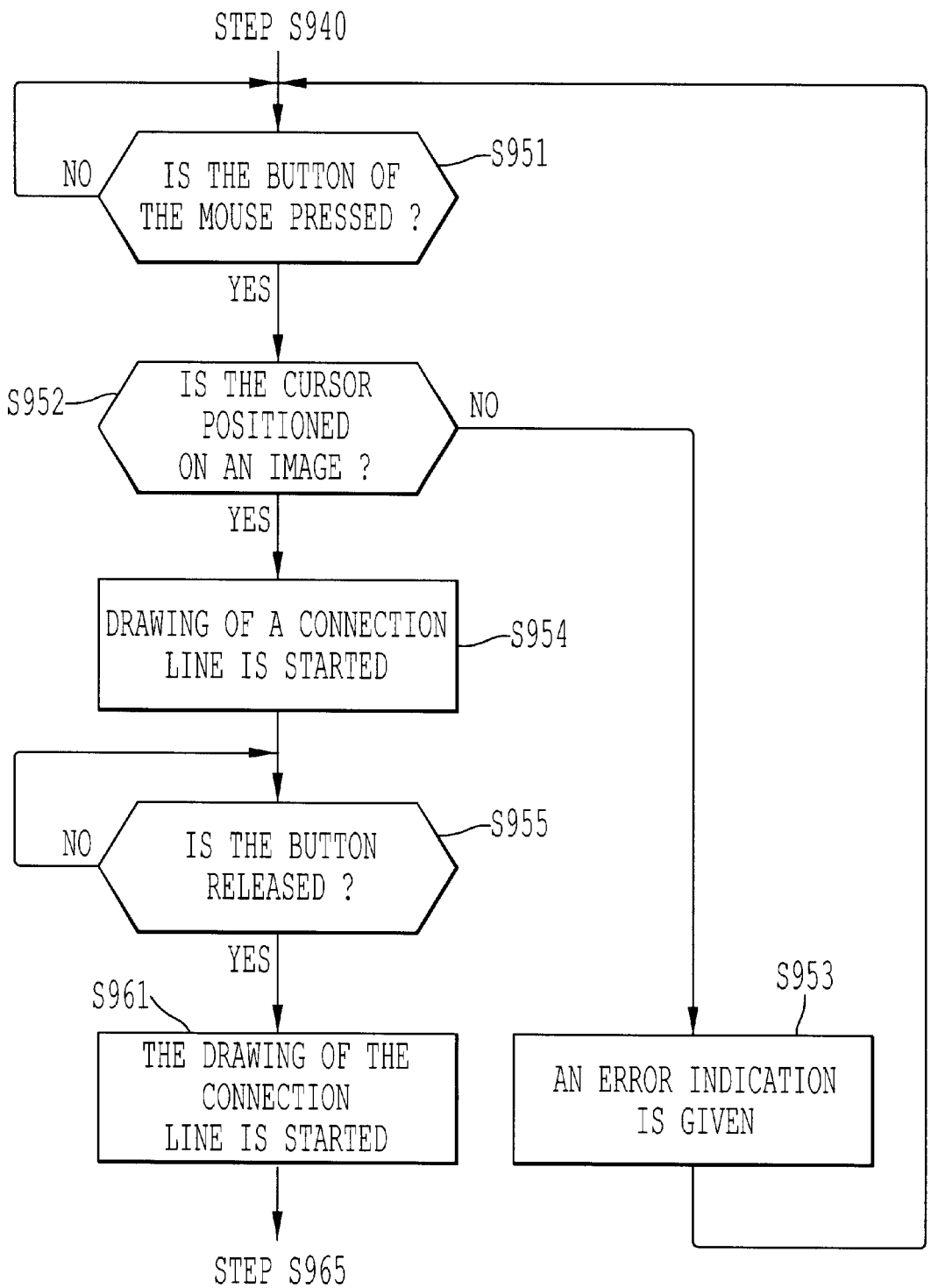
FIG. 43 is a flowchart showing part of processing steps executed by the image altering part and a display control part of the image processing apparatus according to the seventh embodiment of the present invention during the operation of correcting distortion of images.

Next, description is made to a sequence of processing steps executed by the image altering part 304 and the display control part 307 according to the seventh embodiment. FIG. 43 is a flowchart showing part of processing steps executed by the image altering part 304 and the display control part 307 of the image processing apparatus 100 according to the seventh embodiment. Since the flowchart of FIG. 43 executes substantially the same processing steps as those from S901 to S940 and those from S965 to S990 in the flowchart of FIG. 38 according to the sixth embodiment, the common steps and their description are omitted.

In step S940 of the flowchart of FIG. 38 according to the sixth embodiment, if alteration in image arrangement is not required (step S940 is negative), determination is made in the flowchart of FIG. 43 as to whether the button of the mouse 212 or the like is pressed or not (step S951). If the button is pressed (step S951 is affirmative), it is determined whether the cursor is positioned on an image or not (step S952). If the cursor is not positioned on any image (step S952 is negative), an error indication is given (step S953) and the procedure returns to step S951. On the other hand, if the cursor is positioned on an image (step S953 is affirmative), drawing of a connection line is started at the point (step S954).

After that, the operation remains in step S955 until the button of the mouse 212 or the like is released. When the button is released (step S955 becomes affirmative), the drawing of the connection line is ended (step S961). After that, the procedure goes to step S965 of FIG. 38 according to the sixth embodiment.

As discussed above, according to the sixth embodiment, a connection line is drawn between identical points specified, so that the operator can not only specify the identical points as if he or she drew a line by hand, but also recognize instantaneously whether the identical points are specified or not.

Eighth Embodiment

Although the above sixth and seventh embodiments do not describe a case where a set of identical points once specified is altered, the set of identical points already specified may be released when a set of identical points is specified for images for which another set of identical points has already been specified, as described in the following eighth embodiment.

Since the general structure of the illustrated-document creating system including an image processing apparatus according to the eighth embodiment of the present invention and the hardware configuration of the image processing apparatus 100 arc substantially the same as those of the sixth embodiment, description thereof is omitted here. Further, since the image processing apparatus 100 includes substantially the same parts as those of the sixth embodiment except the image altering part 304, the parts common to those of the sixth embodiment are also not described here.

Figure 44:
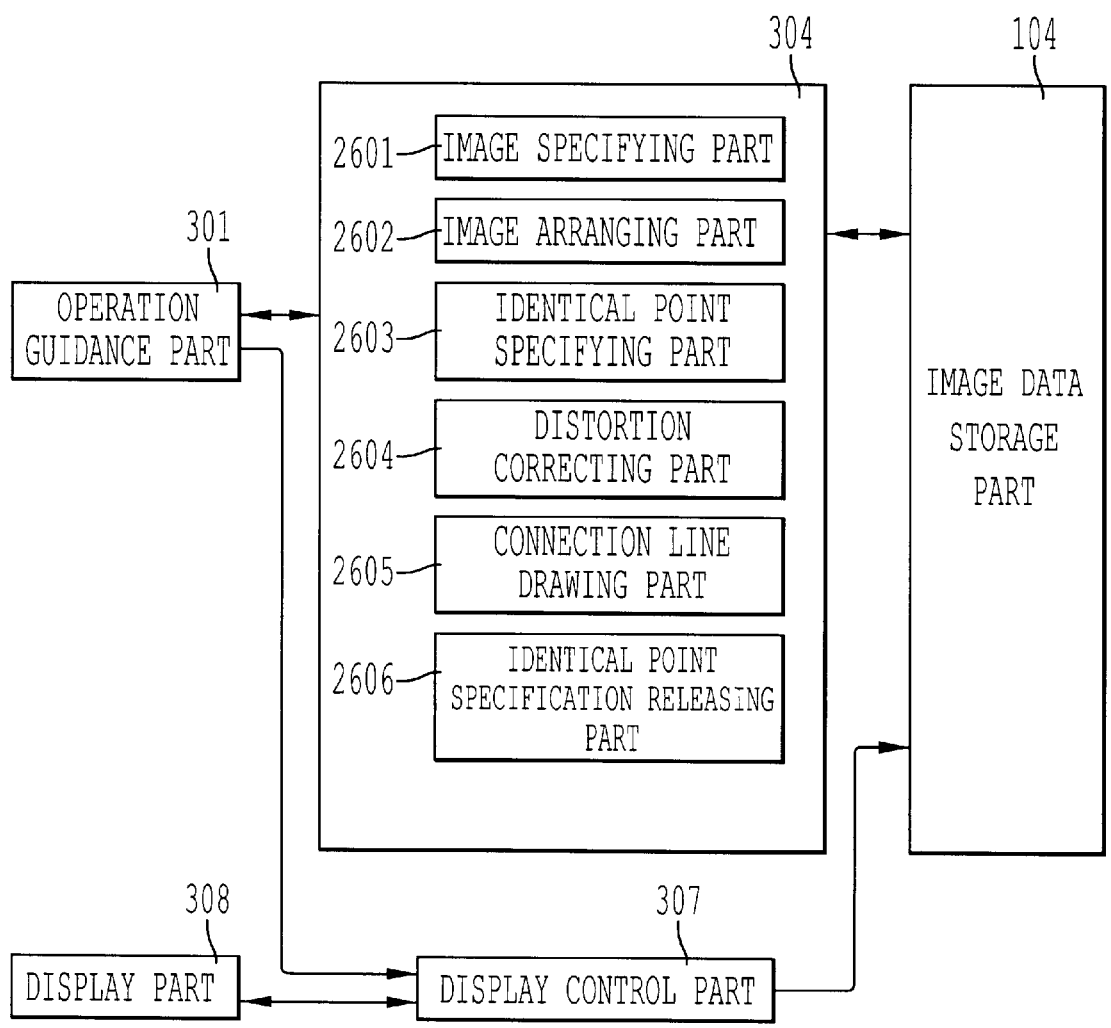
FIG. 44 is a functional block diagram showing the arrangement of an image altering part and the surroundings in an image processing apparatus according to the eighth embodiment of the present invention during the operation of correcting distortion of images.

Next, the image altering part 304 is described. FIG. 44 is a functional block diagram showing the arrangement of the image altering part 304 and the surroundings in the image processing apparatus 100 according to the eighth embodiment of the present invention. As shown in FIG. 44, the image altering part 304 includes an image specifying part 2601, an image arranging part 2602, an identical point specifying part 2603, a distortion correcting part 2604, a connection line drawing part 2605 and an identical point specification releasing part 2606.

Since parts other than the identical point specifying part 2603, the connection line drawing part 2605 and the identical point specification releasing part 2606 are substantially the same as those of the sixth embodiment, and the connection line drawing part 2605 is substantially the same as that of the seventh embodiment, description thereof is omitted.

The identical point specifying part 2603 may be either the identical point specifying part 2403 of the sixth embodiment, or the identical point specifying part 2503 of the seventh embodiment. The identical point specification releasing part 2606 releases specification of the previous set of identical points when a set of identical points is specified for a pair of images for which another set of identical points has already been specified. The processing contents of the identical point specification releasing part 2606 will be described in detail later.

The image specifying part 2601, the image arranging part 2602, the identical point specifying part 2603. the distortion correcting part 2604, the connection line drawing part 2605 and the identical point specification releasing part 2606 are embodied, respectively, by the CPU 201 or the like executing command processing according to commands written in programs such as an OS and an application program recorded on recording media such as the ROM 202, the RAM 203. the hard disk 205 or the floppy disk 207.

Next, description is made to releasing processing of a set of identical points executed by the identical point specification releasing part 2606. When a set of identical points is specified for a pair of images, the identical point specification releasing part 2606 recognizes whether another set of identical points has already been specified for the images by referring to whether or not coordinate data of the corresponding identical points are stored in a storage provided inside the identical point specifying part 2603.

When a new set of identical points is specified, the identical point specification releasing part 2606 releases the previous identical points by deleting corresponding coordinate data stored, and stores the set of identical points newly specified. Thus, the identical points can be easily changed. The identical point specification releasing part 2606 also deletes a connection line 1321, if any, drawn between the identical points already specified.

Figure 45:
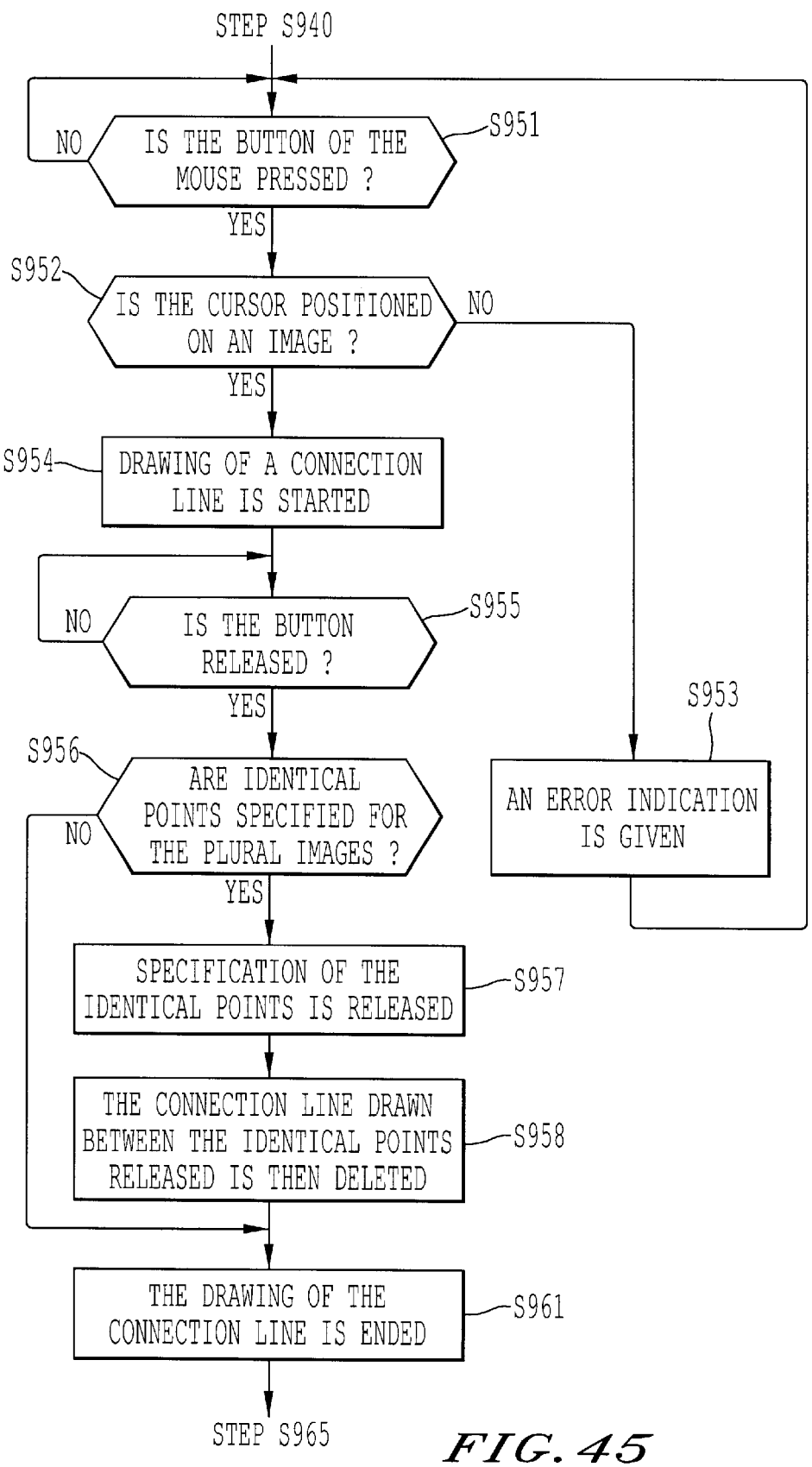
FIG. 45 is a flowchart showing part of processing steps executed by the image altering part and a display control part of the image processing apparatus according to the eighth embodiment of the present invention during the operation of correcting distortion of images.

Next, description is made to a sequence of processing steps executed by the image altering part 304 and the display control part 307 according to the eighth embodiment. FIG. 45 is a flowchart showing a part of processing steps executed by the image altering part 304 and the display control part 307 according to the eighth embodiment.

Since the flowchart of FIG. 45 executes substantially the same processing steps as those from S901 to S940 and those from S965 to S990 in the flowchart of FIG. 38 according to the sixth embodiment, the common steps and their description are omitted. Further, the flowchart of FIG. 45 also executes substantially the same processing steps as those from S951 to S956 and S965 in the flowchart of FIG. 43, and therefore description thereof is omitted as well.

The operation remains in step S955 until the button of the mouse 212 or the like is released. If the button is released (step S955 becomes affirmative, it is then determined whether identical points are specified for the plural images or not (step S956). If the identical points are not specified for the plural images (step S956 is negative), the procedure shifts to step S961 without execution of any processing.

On the other hand, if the identical points are specified (step S956 is affirmative), the identical points arc released (step S957). The connection line drawn between the identical points released is then deleted (step S958), and the procedure goes to step S1361.

As discussed above, according to the eighth embodiment, when a set of identical points is specified for images for which another set of identical points has already been specified, the identical point specification releasing part 2606 releases the previous set of identical points already specified, so that when specifying a new set of identical points, the operator can change the specification of identical points easily and efficiently in the same operation when specifying a set of identical points for the first time without the need to release the specification of the previous set of identical points.

Ninth Embodiment

Although the above sixth to eighth embodiments for correcting image distortion have been made for images photographed with a digital still camera 213 having a fixed focal length, i.e., the above embodiments assume that the focal length is invariable, when the images for correcting image distortion are those photographed with a digital still camera 213 having variable focal lengths, the focal length may be set for proper distortion correction of images, as discussed in the following ninth embodiment.

Since the general structure of the illustrated-document creating system including an image processing apparatus according to the ninth embodiment of the present invention and the hardware configuration of the image processing apparatus 100 are substantially the same as those of the sixth embodiment, description thereof is omitted here. Further, since the image processing apparatus 100 includes substantially the same parts as those of the sixth embodiment except the image altering part 304, the parts common to those of the sixth embodiment are also not described here.

Figure 46:
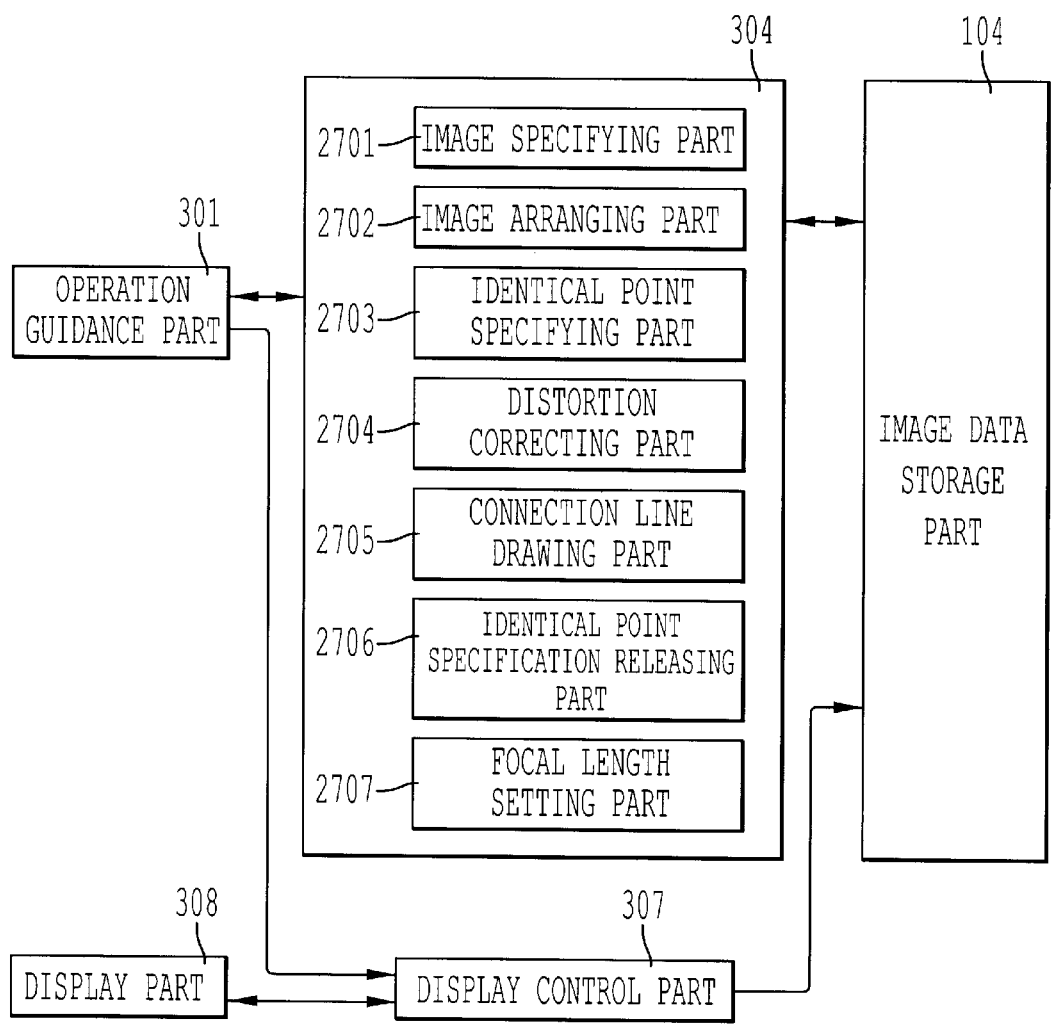
FIG. 46 is a functional block diagram showing the arrangement of an image altering part and the surroundings in an image processing apparatus according to the ninth embodiment of the present invention during the operation of correcting distortion of images.

Next, the image altering part 304 is described. FIG. 46 is a functional block diagram showing the arrangement of the image altering part 304 and the surroundings in the image processing apparatus 100 according to the ninth embodiment of the present invention. As shown in FIG. 46, the image altering part 304 includes an image specifying part 2701, an image arranging part 2702, an identical point specifying part 2703. a distortion correcting part 2704, a connection line drawing part 2705, an identical-point specification releasing part 2706 and a focal length setting part 2707.

The image specifying part 2701, the image arranging part 2702, the identical point specifying part 2703, the connection line drawing part 2705 have substantially the same structure as those of the image specifying parts 2401, 2501 and 2601, the image arranging parts 2402, 2502 and 2602, the identical point specifying parts 2403, 2503 and 2603, and the connection line drawing part 2405, 2505 and 2605 according to the sixth to eighth embodiments, respectively. Such common parts are not described here.

The focal length setting part 2707 sets the focal length of an image, photographed with a digital still camera 213 or the like, in accordance with an operating instruction from the operation guidance part 301. The focal length may be set by directly inputting a numerical value for the focal length, or otherwise, from a table related to camera types and their focal lengths, which is pre-stored, by inputting information regarding the camera type, whether a zooming lens is used and the like. The processing contents of the focal length setting part 2707 will be described in detail later.

The image specifying part 2701, the image arranging part 2702, the identical point specifying part 2703, the distortion correcting part 2704, the connection line drawing part 2705, the identical point specification releasing part 2706 and the focal length setting part 2707 are embodied, respectively, by the CPU 201 or the like executing command processing according to commands written in programs such as an OS and an application program recorded on recording media Such as the ROM 202, the RAM 203, the hard disk 205 or the floppy disk 207.

Figure 47:
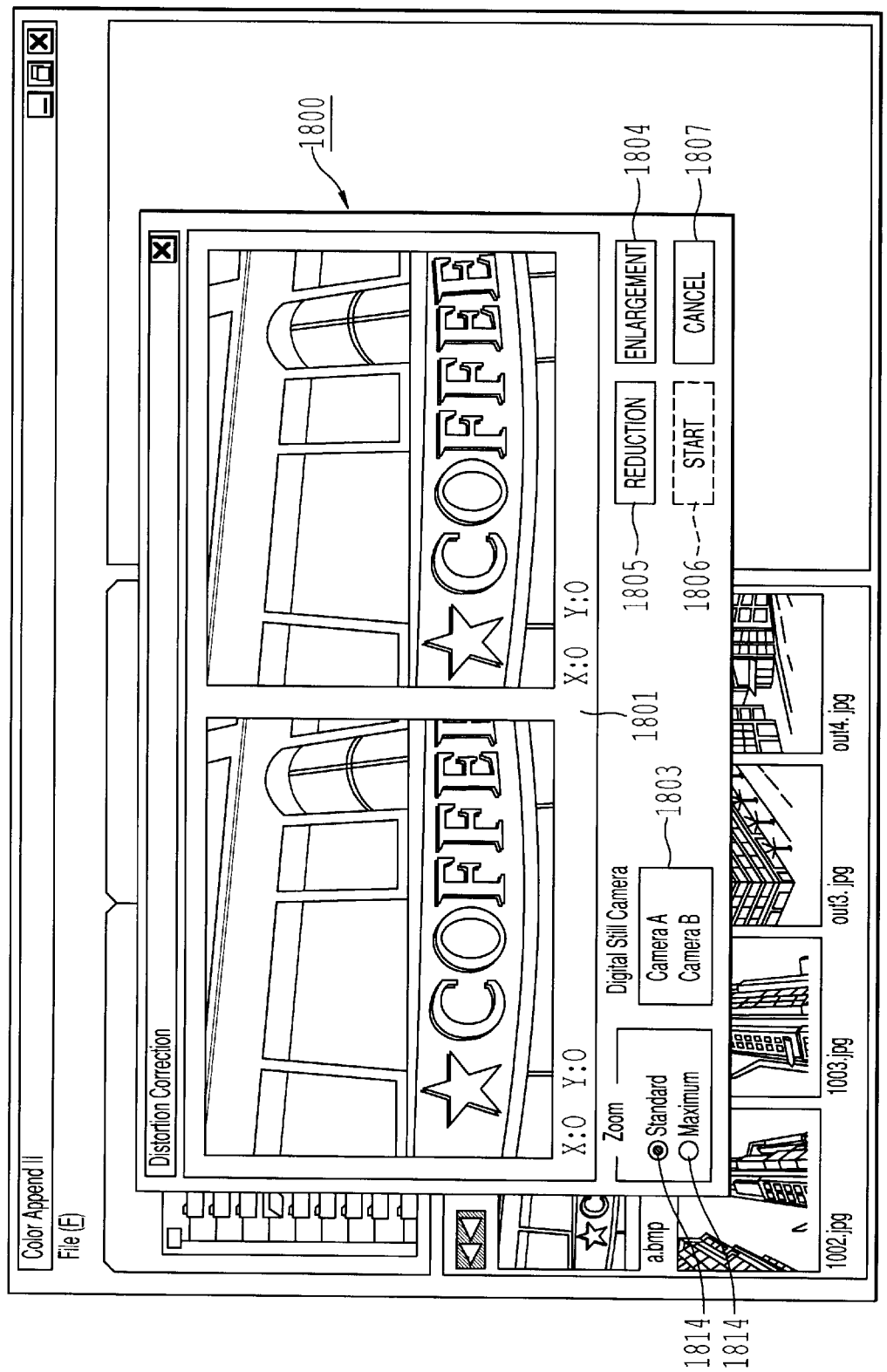
FIG. 47 is an illustration showing an example of a display screen on a display part of the image processing apparatus according to the ninth embodiment of the present invention during the operation of correcting distortion of images.

Next, description is mad e to focal-length setting processing executed by the focal length setting part 2707. FIG. 47 is an illustration showing an example of a display screen on the display part 308 of the image processing apparatus 100 according to the ninth embodiment. In FIG. 47, a distortion correcting window 1800 includes a distortion correcting work are a 1801, a zoom switching part 1802, a camera switching part 1803, a scale-up button 1804, a scale-down button 1805, a start button 1806 and a cancel button 1807.

The distortion correcting work area 1801, the scale-up button 1804, the scale-down button 1805, the start button 1806 and the cancel button 1807 have substantially the same structure as those of the distortion correcting work area 701, the scale-up button 704, the scale-down button 705, the start button 706 and the cancel button 707 according to the sixth embodiment, respectively. Such common parts are not described here.

The zoom switching part 1802 displays selectable zoom switching, alternatives related to whether an image to be joined with another has been photographed in the zoom mode or not. When no zoom is used for the image, the mode is switched to "standard" S1813. On the other hand, when the zoom is used for the image, the mode is switched to "maximum" 1814. The zoom mode is thus switched.

Although in the embodiment switching is enabled by selecting one switching alternative out of two kinds of switching alternatives, more than two zoom modes may be used for switching over among them depending on the types of digital still cameras and the kinds of zooms. In some types of digital still cameras, these information related to setting of the focal length may be added to respective image data. In this case, the focal length may be automatically set by reading the information related to setting, of the focal length, which is added to respective image data.

The camera switching part 1803 displays a list of the names of selectable digital still cameras. The operator can select, out of the listed names, the name of a digital still camera with which an image to be joined with other images has been photographed. The camera switching is thus performed.

Figure 48:
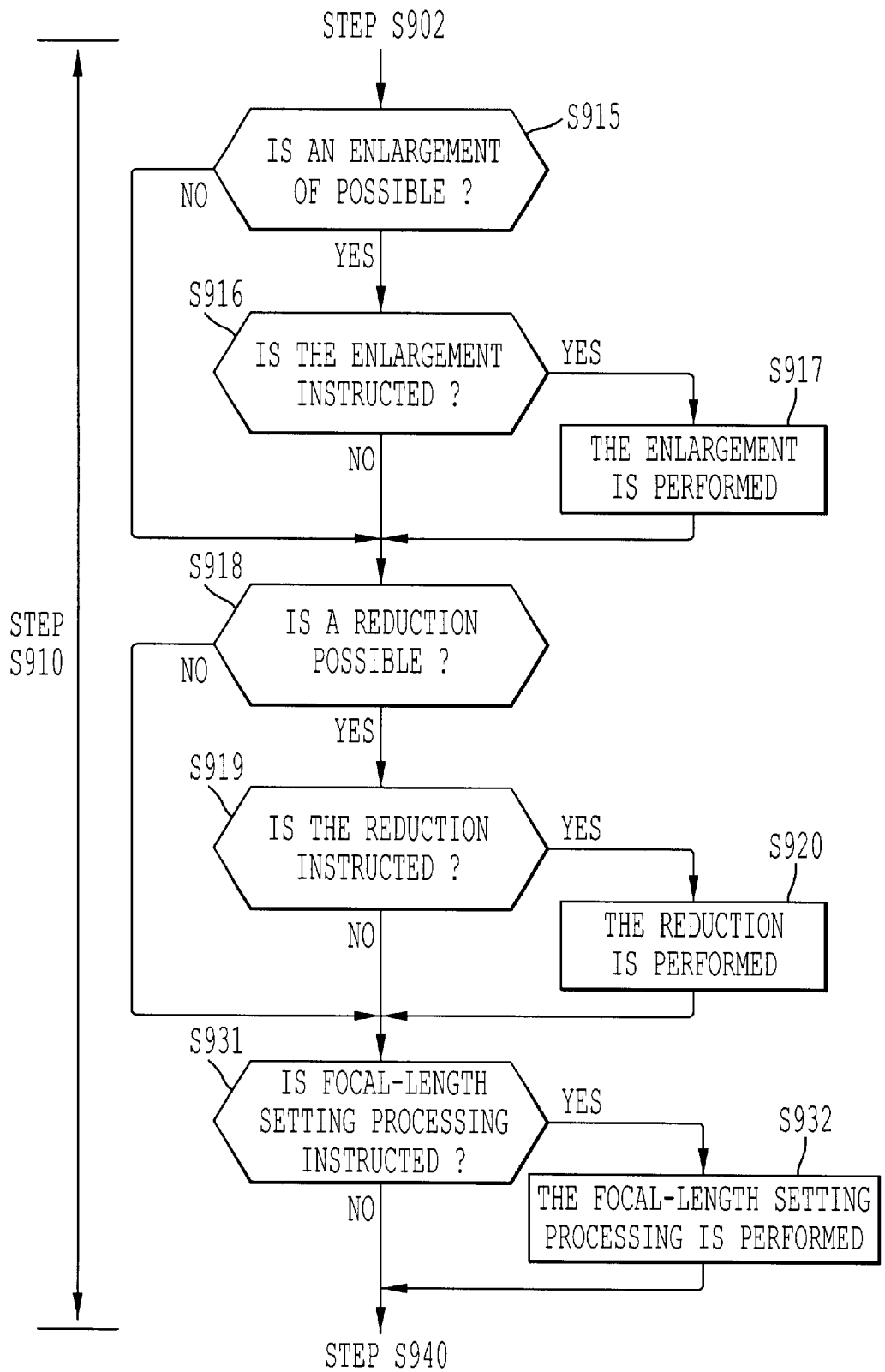
FIG. 48 is a flowchart showing part of processing steps executed by the image altering part and a display control part of the image processing apparatus according to the ninth embodiment of the present invention during the operation of correcting distortion of images.

Next, description is made to a sequence of processing steps executed by the image altering part 304 and the display control part 307 according to the ninth embodiment. FIG. 48 is a flowchart showing a part of processing steps executed by the image altering part 304 and the display control part 307 of the image processing apparatus 100 according to the ninth embodiment.

Since the flowchart of FIG. 48 executes substantially the same processing steps as those from S901 to S910 and those from S940 to S990 in the flowchart of FIG. 38 according to the sixth embodiment, the marks of the common steps and their description are omitted. The flowchart of FIG. 48 also executes substantially the same processing, steps as those from S911 to S920 in the flowchart of FIG. 40 according to the sixth embodiment and therefore description thereof is omitted as well.

In the flowchart of FIG. 48, if step S919 is negative or after completion of step S920, determination is made as to whether focal-length setting processing is instructed or not (step S931). If instructed (step S938 is affirmative), the focal-length setting processing is performed (step S932). On the other hand, if not instructed (step S931 is negative), the procedure goes to the next step, i.e., step S940, without execution of any processing.

As discussed above, according to the ninth embodiment, the focal length setting part 2707 sets the focal length with which an image has been input, while the distortion correcting part 2704 corrects distortion of the image based on the focal length set for use in distortion correction processing of the image. This makes it possible to edit images without occurrence of distortion even if the images have been input by an input device (an image pick-up device) with different focal lengths.

Numerous additional modifications and variations of the present invention are possible in light of the above teachings. It is therefore to be understood that within the scope of the appended claims, the present invention may be practiced otherwise than as specifically described herein.

This document claims priority and contains subject matter related to Japanese patent applications No. 10-14413, No. 10-196278, and No. 10-196280 filed in the Japanese Patent Office on Apr. 10, 1998, Jul. 10, 1998 and Jul. 10, 1998, respectively, and the entire contents of which are hereby incorporated by reference.

What is claimed is:

1. An image processing apparatus, comprising:
   a display device configured to display images on a display screen such that the images can be edited and processed;
   image specifying means for specifying at least two images to be joined together;
   image arranging means for arranging the images specified by said image specifying means in a desired order;
   display control means for controlling said display device to display the images arranged by said image arranging means;
   joining point specifying means for specifying respective joining points for at least two of said specified images;
   connection line drawing means for drawing a connection line between joining points specified by said joining point specifying means, and
   joining means for joining the at least two specified images by referring to the joining points specified by said joining point specifying means;
   wherein said display control means controls said display device to display both the images arranged by said image arranging means and the connection line drawn by said connection line drawing means.

2. An image processing apparatus, comprising:
   a display device configured to display images on a display screen such that the images can be edited and processed;
   image specifying means for specifying at least two images to be joined together;
   image arranging means for arranging the images specified by said image specifying means in a desired order;
   display control means for controlling said display device to display the images arranged by said image arranging means;
   joining point specifying means for specifying respective joining points for at least two of said specified images;
   joining means for joining the at least two specified images by referring to the joining points specified by said joining point specifying means; and
   joining-point specification releasing means for releasing specification of a previous specified set of joining points for a pair of images when a new set of joining points is specified for the pair of images.

3. The image processing apparatus as set forth in claim 1, further comprising:
   focal length setting means for setting a focal length of an image to be specified; and
   image correcting means for correcting a specified image based on the focal length set by said focal length setting means.

4. The image processing apparatus as set forth in claim 1, wherein said display control means controls the display device to display the images vertically.

5. The image processing apparatus as set forth in claim 1, wherein said display control means controls the display device to display the images horizontally.

6. A method for controlling an image processing apparatus, comprising steps of:
   displaying images on a display screen;
   specifying at least two images to be joined together;
   arranging the images specified in said specifying step in a desired order;
   displaying the specified images arranged in said arranging step;
   specifying respective joining points for at least two of the specified images;
   drawing a connection line between the joining points specified in said joining point specifying step; and
   joining the at least two images by referring to the joining points specified in said joining points specifying step;
   wherein said arranged images displaying step displays both the images arranged in said arranging step and the connection line drawn in said connection line drawing step.

7. A method for controlling an image processing apparatus, comprising steps of:
   displaying images on a display screen;
   specifying at least two images to be joined together;
   arranging the images specified in said specifying step in a desired order;

displaying the specified images arranged in said arranging step;

specifying respective joining points for at least two of the specified images;

joining the at least two images by referring to the joining points specified in said joining points specifying step; and releasing specification of a previous specified set of joining points for a pair of images when the specifying step is performed for the pair of images.

8. The method as set forth in claim 6, further comprising steps of:

setting a focal length of an image to be specified; and correcting the specified image based on the focal length set in said focal length setting step.

9. The method as set forth in claim 6, wherein said step of displaying the arranged images comprises displaying the images vertically.

10. The method as set forth in claim 6, wherein said step of displaying the arranged images comprises displaying the images horizontally.

11. A computer-readable recording medium storing computer instructions for controlling an image processing apparatus to perform the steps of:

displaying images to be specified on a display screen;

arranging specified images in a desired order;

displaying the images arranged in said arranging step;

joining at least two of the images by referring to respective user specified joining points of the images; and drawing a connection line between the joining points;

wherein said arranged image displaying step displays of the images arranged in said arranging steps and the connection line.

12. A computer-readable recording medium storing computer instructions for controlling an image processing apparatus to perform the steps of:

displaying images to be specified on a display screen;

arranging specified images in a desired order;

displaying the images arranged in said arranging step;

joining at least two of the images by referring to respective user specified joining points of the images; and releasing specification of a previous specified set of joining points for a pair of images when the specifying step is performed for the pair of images.

13. The computer readable recording medium as set forth in claim 11, the computer instructions further controlling an image processing apparatus to perform the step of:

correcting a specified image based on a focal length of the specified image.

14. The computer readable recording medium as set forth in claim 11, wherein said step of displaying the arranged images comprises displaying the images horizontally.

15. The computer readable recording medium as set forth in claim 11, wherein said step of displaying the arranged images comprises displaying the images vertically.

16. An image processing apparatus, comprising:

a display device configured to display images on a display screen such that the images can be edited and processed;

image specifying means for specifying at least two images photographed at different photographing positions;

image arranging means for arranging the images specified by said image specifying means;

display control means for controlling said display device to display the specified images arranged by said image arranging means;

point specifying means for specifying respective points for at least two of the specified images displayed by said display control means;

connection line drawing means for drawing a connection line between the points specified by said point specifying means;

distortion correcting means for correcting distortion of the at least two images by referring to the points specified by said point specifying means; and wherein said display control means controls said display device to display both the images arranged by said image arranging means and the connection line drawn by said connection line drawing means.

17. An image processing apparatus, comprising:

a display device configured to display images on a display screen such that the images can be edited and processed;

image specifying means for specifying at least two images photographed at different photographing positions;

image arranging means for arranging the images specified by said image specifying means;

display control means for controlling said display device to display the specified images arranged by said image arranging means;

point specifying means for specifying respective points for at least two of the specified images displayed by said display control means;

distortion correcting means for correcting distortion of the at least two images by referring to the points specified by said point specifying means; and point specification releasing means for releasing specification of a previous specified set of points for a pair of images when a new set of points is specified for the pair of images.

18. The image processing apparatus as set forth in claim 16, further comprising:

focal length setting means for setting the focal length of the images to be specified;

wherein said distortion correcting means corrects distortion of the specified images based on the focal length set by said focal length setting means.

19. A method for controlling an image processing apparatus, comprising:

displaying images on a display screen;

specifying at least two images photographed at different photographing positions;

arranging the images specified in said image specifying step;

controlling display of the images arranged in said image arranging step;

specifying respective points for at least two of the images displayed in said display control step:

drawing a connection line between the points specified in said point specifying step; and correcting distortion of the at least two images by referring to the points specified in said point specifying step;

wherein said control step controls display of both the images arranged in said image arranging step and the connection line drawn in said connection line drawing step.

20. A method for controlling an image processing apparatus, comprising:

displaying images on a display screen;

specifying at least two images photographed at different photographing positions; arranging the images specified in said image specifying step;

controlling display of the images arranged in said image arranging step;

specifying respective points for at least two of the images displayed in said display control step;

correcting distortion of the at least two images by referring to the points specified in said point specifying step; and releasing specification of a previous specified set of points for a pair of images when a given set of points is specified for the pair of images in said point specifying step.

21. The method as set forth in claim 19, further comprising a step of:

setting a focal length of an image to be specified, wherein said distortion correcting step corrects distortion of the specified image based on the focal length set in said focal length setting step.

22. A computer-readable recording medium storing computer instructions for controlling an image processing apparatus to perform the steps of:

displaying images to be specified on a display screen;

arranging specified images in a desired order;

displaying the images arranged in said arranging step;

correcting distortions of least two of the images by referring to respective user specified points of the images; and drawing a connection line between the specified points, wherein said display control step controls display of both the images arranged in said image arranging step and the connection line drawn in said connection line drawing step.

23. A computer-readable recording medium storing computer instructions for controlling an image processing apparatus to perform the steps of:

displaying images to be specified on a display screen;

arranging specified images in a desired order;

displaying the images arranged in said arranging step;

correcting distortions of least two of the images by referring to respective user specified points of the images; and releasing specification of a previous selected set of points for a pair of images when a new set of points is specified for the pair of images.

24. The computer readable recording medium as set forth in claim 22, the computer instructions further controlling an image processing apparatus to perform the step of:

correcting distortion of a specified image based on the focal length of the image.

25. A computer-readable recording medium storing computer instructions for controlling an image processing apparatus to perform the steps of:

specifying respective joining points for at least two images displayed on a display device;

joining the at least two images by referring to the joining points; and connection line drawing means for drawing on the display device, a connection line between joining points specified by said joining point specifying means.

26. A computer-readable recording medium storing computer instructions for controlling an image processing apparatus to perform the steps of:

specifying respective joining points for at least two images displayed on a display device;

joining the at least two images by referring to the joining points; and releasing specification of a previous specified set of joining, points for a pair of images when a new set of joining points is specified for the pair of images.

27. A computer-readable recording medium storing computer instructions for controlling an image processing apparatus to perform the steps of:

specifying respective points for at least two images displayed on a display device;

correcting distortion of the at least two images by referring to the points specified by said point specifying means; and drawing, on the display device, a connection line between the points specified by said point specifying means.

28. A computer-readable recording medium storing computer instructions for controlling an image processing apparatus to perform the steps of:

specifying respective points for at least two images displayed on a display device;

correcting distortion of the at least two images by referring to the points specified by said point specifying means; and point specification releasing means for releasing specification of a previous specified set of points for a pair of images when a new set of points is specified for the pair of images.

29. A computer-readable recording medium storing computer instructions for controlling an image processing apparatus to perform the steps of:

displaying images to be specified on a display screen;

displaying the specified images in both a horizontal and a vertical arrangement on the display screen;

displaying the specified images only in a user selected one of the horizontal and vertical arrangements of the specified images;

drawing, on the display screen, a connection line between user specified joining points; and joining least two of the images displayed in said step of displaying the specified images only in a user selected arrangement, by referring to respective said user specified joining points of the images.

30. A computer-readable recording medium storing computer instructions for controlling an image processing apparatus to perform the steps of:

displaying images to be specified on a display screen;

displaying the specified images in both a horizontal and a vertical arrangement on the display screen;

displaying the specified images only in a user selected one of the horizontal and vertical arrangements of the specified images;

drawing, on the display screen, a connection line between user specified points; and correcting distortion of least two of the images displayed in said step of displaying the specified images only in a user selected arrangement, by referring to respective said user specified points of the images.

31. The image processing apparatus as set forth in claim 1, further comprising:
   means for standardizing the brightness of the specified images by reference to the brightest one of the specified images.

32. The image processing apparatus as set forth in claim 1, further comprising:
   means for standardizing the brightness of the specified images by reference to the first specified one of the specified images.

33. The method as set forth in claim 6, further comprising the step of:
   standardizing the brightness of the specified images by reference to the brightest one of the specified images.

34. The method as set forth in claim 6, further comprising the step of:
   standardizing the brightness of the specified images by reference to the first specified one of the specified images.

35. The computer readable recording medium as set forth in claim 11, the computer instructions further controlling the image processing apparatus to perform the step of:
   standardizing the brightness of the specified images by reference to the brightest one of the specified images.

36. The computer readable recording medium as set forth in claim 11, the computer instructions further controlling the image processing apparatus to perform the step of:
   standardizing the brightness of the specified images by reference to the first specified one of the specified images.

37. The image processing apparatus as set forth in claim 16, further comprising:
   means for standardizing the brightness of the specified images by reference to the brightest one of the specified images.

38. The image processing apparatus as set forth in claim 16, further comprising:
   means for standardizing the brightness of the specified images by reference to the first specified one of the specified images.

39. The method as set forth in claim 19, further comprising the step of:
   standardizing the brightness of the specified images by reference to the brightest one of the specified images.

40. The method as set forth in claim 19, further comprising the step of:
   standardizing the brightness of the specified images by reference to the first specified one of the specified images.

41. The computer readable recordings medium as set forth in claim 22, the computer instructions further controlling the image processing apparatus to perform the step of:
   standardizing the brightness of the specified images by reference to the brightest one of the specified images.

42. The computer readable recording medium as set forth in claim 22, the computer instructions further controlling the image processing apparatus to perform the step of:
   standardizing the brightness of the specified images by reference to the first specified one of the specified images.

43. The image processing apparatus as set forth in claim 1, wherein said connection line has a characteristic such that it can be readily discriminated from the remainder of the image.

44. The image processing apparatus as set forth in claim 43, wherein said characteristic is color.

45. The image processing apparatus as set forth in claim 43, wherein said characteristic is line thickness.

46. The image processing apparatus as set forth in claim 43, wherein said characteristic is operator selectable.

47. The image processing apparatus as set forth in claim 43, wherein said characteristic is automatically selected by taking into account a color used in the image.

48. The method as set forth in claim 14, wherein said connection line has a characteristic such that it can be readily discriminated from the remainder of the image.

49. The method as set forth in claim 48, wherein said characteristic is color.

50. The method as set forth in claim 48, wherein said characteristic is line thickness.

51. The method as set forth in claim 48, wherein said characteristic is operator selectable.

52. The method as set forth in claim 48, wherein said characteristic is automatically selected by taking into account a color used in the image.

53. The computer readable recording medium as set forth in claim 22, wherein said connection line has a characteristic such that it can be readily discriminated from the remainder of the image.

54. The computer readable recording medium as set forth in claim 53, wherein said characteristic is color.

55. The computer readable recording medium as set forth in claim 53, wherein said characteristic is line thickness.

56. The computer readable recording medium as set forth in claim 53, wherein said characteristic is operator selectable.

57. The computer readable recording medium as set forth in claim 53, wherein said characteristic is automatically selected by taking into account a color used in the image.

58. The image processing apparatus as set forth in claim 1, wherein said image arranging means comprises means for displaying options for arranging the specified images in one or more arrangements, and means for displaying the images arranged according to a selected one of said options.

59. The method as set forth in claim 6, wherein said image arranging step comprises displaying options for arranging the specified images in one or more arrangements, and then displaying the images arranged according to a selected one of said options.

60. The computer readable recording medium as set forth in claim 11, wherein said image arranging step comprises displaying options for arranging the specified images in one or more arrangements, and then displaying the images arranged according to a selected one of said options.

61. The image processing apparatus as set forth in claim 16, wherein said image arranging means comprises means for displaying options for arranging the specified images in one or more arrangements, and means for displaying the images arranged according to a selected one of said options.

62. The method as set forth in claim 19, wherein said image arranging step comprises displaying options for arranging the specified images in one or more arrangements, and then displaying the images arranged according to a selected one of said options.

63. The computer readable recording medium as set forth in claim 22, wherein said image arranging step comprises displaying options for arranging the specified images in one or more arrangements, and then displaying the images arranged according to a selected one of said options.

* * * * *